(12) United States Patent
Nakagami et al.

(10) Patent No.: US 10,587,876 B2
(45) Date of Patent: Mar. 10, 2020

(54) DECODING DEVICE AND DECODING METHOD, AND ENCODING DEVICE AND ENCODING METHOD

(71) Applicant: SONY CORPORATION, Tokyo (JP)

(72) Inventors: Ohji Nakagami, Tokyo (JP); Hironari Sakurai, Tokyo (JP); Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 15/978,711

(22) Filed: May 14, 2018

(65) Prior Publication Data

US 2018/0262755 A1    Sep. 13, 2018

Related U.S. Application Data

(63) Continuation of application No. 14/382,034, filed as application No. PCT/JP2013/059133 on Mar. 27, 2013, now Pat. No. 9,998,734.

(30) Foreign Application Priority Data

Apr. 6, 2012    (JP) ................ 2012-087869

(51) Int. Cl.
    *H04N 19/117*    (2014.01)
    *H04N 19/44*    (2014.01)
    (Continued)

(52) U.S. Cl.
    CPC ......... *H04N 19/117* (2014.11); *H04N 19/174* (2014.11); *H04N 19/436* (2014.11);
    (Continued)

(58) Field of Classification Search
    CPC .................................................. H04N 19/117
    (Continued)

(56) References Cited

U.S. PATENT DOCUMENTS

| 2010/0111193 A1 | 5/2010 | Pandit et al. |
| 2010/0226440 A1 | 9/2010 | Miyoshi et al. |

(Continued)

FOREIGN PATENT DOCUMENTS

| EP | 2355529 A2 | 8/2011 |
| JP | 10-234043 | 9/1998 |

(Continued)

OTHER PUBLICATIONS

Nov. 15, 2018, Japanese Office Action issued for related JP application No. 2017-215273.

(Continued)

*Primary Examiner* — Yulin Sun
(74) *Attorney, Agent, or Firm* — Paratus Law Group, PLLC

(57) ABSTRACT

The present technique relates to a decoding device and a decoding method, and an encoding device and an encoding method, capable of performing encoding and decoding independently in the time direction for each tile. A decoding unit generates a prediction image by performing, for each of tiles, motion compensation of a reference image within a co-located tile based on tile splittable information indicating that decoding is allowed for each of the tiles and motion vector information representing a motion vector used for generating encoded data of a decoding target current image when a picture of the current image is split into the tiles and decoded. The decoding unit decodes the encoded data using the prediction image. The present technique is applicable to a decoding device, for example.

20 Claims, 39 Drawing Sheets

(51) Int. Cl.
H04N 19/436 (2014.01)
H04N 19/70 (2014.01)
H04N 19/174 (2014.01)
H04N 19/82 (2014.01)
H04N 19/55 (2014.01)

(52) U.S. Cl.
CPC ............ H04N 19/44 (2014.11); H04N 19/55 (2014.11); H04N 19/70 (2014.11); H04N 19/82 (2014.11)

(58) Field of Classification Search
USPC ...................................................... 375/240.16
See application file for complete search history.

(56) References Cited

U.S. PATENT DOCUMENTS

| 2012/0106921 A1* | 5/2012 | Sasaki | H04N 21/2362 386/230 |
| 2012/0170648 A1* | 7/2012 | Chen | H04N 19/70 375/240.03 |
| 2012/0183074 A1 | 7/2012 | Fuldseth | |
| 2012/0207227 A1* | 8/2012 | Tsai | H04N 19/136 375/240.29 |
| 2013/0136371 A1* | 5/2013 | Ikai | G06T 5/001 382/224 |

FOREIGN PATENT DOCUMENTS

| JP | 2001-285876 | 10/2001 |
| JP | 2006-033851 | 2/2006 |
| JP | 2006-332985 | 12/2006 |
| JP | 2010-206664 A | 9/2010 |
| JP | 6241504 B2 | 12/2017 |
| KR | 10-2011-0090511 A | 8/2011 |
| WO | WO2013/008942 | 1/2013 |
| WO | WO2013/063094 | 5/2013 |

OTHER PUBLICATIONS

Aug. 30, 2018, Japanese Office Action issued for related JP application No. 2017-215273.
Wang et al., Dependency and loop filtering control over tile boundaries, Joint Collaborative Team on Video Coding (JCT-VC) of ITU-T SG16 WP3 and ISO/IEC JTC1/SC29/WG11, Nov. 21-30, 2011, pp. 1-7, 7$^{th}$ Meeting: Geneva, CH.
Nakagami et al., Bitstream restriction flag to enable tile split, Joint Collaborative Team on Video Coding (JCT-VC) of ITU-T SG16 WP3 and ISO/IEC JTC 1/SC 29/WG 11, Apr. 27-May 7, 2012, pp. 1-3, 9$^{th}$ Meeting: Geneva, CH.
Oct. 1, 2018, European Search Report issued for related EP application No. 18175751.9.
Fuldseth et al., Tiles, Joint Collaborative Team on Video Coding (JCT-VC) of ITU-T SG16 WP3 and ISO/IEC JTC1/SC29/WG11, Jul. 14-22, 2011, pp. 1-15, 6$^{th}$ Meeting: Torino, IT.
ITU-T, Video coding for low bit rate communication, Series H: Audiovisual and Multimedia Systems, Infrastructure of audiovisual services—Coding of moving video, Recommendation ITU-T H.263, Jan. 2005, pp. 143 and 144, International Telecommunication Union.

Benjamin Bross, et al., High-efficiency video coding (HEVC) text specification draft 6, Joint Collaborative Team on Video Coding (JCT-VC) of ITU-T SG16 WP3 and ISO/IEC JTC1/SC29/WG11, Feb. 1-10, 2012, pp. 1-259, 8$^{th}$ Meeting: San José, CA.
Kazuo Sugimoto, et al., Parolell processing of ALF and SAO for tiles, Joint Collaborative Team on Video Coding (JCT-VC) of ITU-T SG16 WP3 and ISO/IEC JTC1/SC29/WG11, Nov. 21-30, 2011, pp. 1-4, 7$^{th}$ Meeting: Geneva, CH.
Chia-Yang Tsai, et al., AHG4: Non-cross-tiles loop filtering for independent tiles, Joint Collaborative Team on Video Coding (JCT-VC) of ITU-T SG16 WP3 and ISO/IEC JTC1/SC29/WG11, Nov. 21-30, 2011, pp. 1-6, 7$^{th}$ Meeting: Geneva, CH.
Arild Fuldseth, Tiles, Joint Collaborative Team on Video Coding (JCT-VC) of ITU-T SG16 WP3 and ISO/IEC JTC1/SC29/WG11, Mar. 16-23, 2011, pp. 1-14, 5$^{th}$ Meeting: Geneva, CH.
Aug. 6, 2015, SG communication issued for related SG application No. 11201406086U.
Ye-Kui Wang, et al., Flexible tile dependency and loop filtering control, Joint Collaborative Team on Video Coding (JCT-VC) of ITU-T SG16 WP3 and ISO/IEC JTC1/SC29/WG11, Feb. 1-10, 2012, pp. 1-7, 8$^{th}$ Meeting: San Jose, CA, USA.
Oct. 1, 2015, EP communication issued for related EP application No. 13772509.
Cor Meenderinck, et al., Parallel Scalability of Video Decoders, J Sign Process Syst, Jul. 23, 2008, pp. 1-22.
Miska M. Hannuksela, et al., Isolated Regions in Video Coding, IEEE Transactions on Multimedia, vol. 6, No. 2, Apr. 2004, pp. 1-9.
Series H: Audiovisual and Multimedia Systems, Infrastructure of audiovisual services—Coding of moving video, Video coding for low bit rate communication, ITU-T: Telecommunication Standardization Sector of ITU, Jan. 2005, pp. 143-144.
Oct. 22, 2015, JP communication issued for related JP application No. 2014-509124.
Feb. 16, 2016, Japanese Office Action for related JP Application No. 2014-509124.
Mar. 1, 2017, CN communication issued for related CN application No. 201380018010.1.
Mar. 3, 2017, EP communication issued for related EP application No. 13772509.9.
Jul. 20, 2017, JP communication issued for JP related application No. 2016-115922.
Nakagami, et al., "Bitstream restriction flag to enable tile split", Joint Collaborative Team on Video Coding (JCT-VC) of ITU-T SG16 WP 3 and ISO/IEC JTC 1/SC 29/WG 11, 9$^{th}$ Meeting, Apr. 27-May 7, 2012, pp. 13, Geneva, CH.
Wang, et al., "Dependency and loop filtering control over tile boundaries", Joint Collaborative Team on Video Coding (JCT-VC) of ITU-T SG16 WP3 and ISO/IEC JTC1/SC29/WG11, 7$^{th}$ Meeting, Nov. 21-30, 2011, pp. 1-7, Geneva, CH.
Fuldseth, et al., "Tiles", Joint Collaborative Team on Video Coding (JCT-VC) of ITU-T SG16 WP3 and ISO/IEC JTC1/SC2/WG11, 6$^{th}$ Meeting, Jul. 14-22, 2011 pp. 1-15, Torino, IT.
Jun. 5, 2019, Korean Office Action issued for related KR application No. 10-2014-7026605.
Fuldseth et al., Tiles, Joint Collaborative Team on Video Coding (JCT-VC) of ITU-T SG16 WP3 and ISO/IEC JTC1/SC29/WG11, Mar. 16-23, 2011, pp. 1-14, 5$^{th}$ Meeting: Geneva, CH.
Oct. 14, 2019, European Communication issued for related EP application No. 18175751.9.
Bross et al., High Efficiency Video Coding (HEVC) text specification draft 6, Joint Collaborative Team on Video Coding (JCT_VC) of ITU-T SG16 WP3 and ISO/IEC JTC1/SC29/WG11, Nov. 21-30, 2011, pp. 1-250, 7$^{th}$ Meeting: Geneva, CH.

* cited by examiner

FIG. 8

| | | Descriptor |
|---|---|---|
| 1 | seq_parameter_set_rbsp() { | |
| 2 | profile_idc | u(8) |
| 3 | reserved_zero_8bits /* equal to 0 */ | u(8) |
| 4 | level_idc | u(8) |
| 5 | seq_parameter_set_id | ue(v) |
| 6 | chroma_format_idc | ue(v) |
| 7 | if( chroma_format_idc == 3 ) | |
| 8 | separate_colour_plane_flag | u(1) |
| 9 | max_temporal_layers_minus1 | u(3) |
| 10 | pic_width_in_luma_samples | ue(v) |
| 11 | pic_height_in_luma_samples | ue(v) |
| 12 | pic_cropping_flag | u(1) |
| 13 | if( pic_cropping_flag ) { | |
| 14 | pic_crop_left_offset | ue(v) |
| 15 | pic_crop_right_offset | ue(v) |
| 16 | pic_crop_top_offset | ue(v) |
| 17 | pic_crop_bottom_offset | ue(v) |
| 18 | } | |
| 19 | bit_depth_luma_minus8 | ue(v) |
| 20 | bit_depth_chroma_minus8 | ue(v) |
| 21 | pcm_enabled_flag | u(1) |
| 22 | if( pcm_enabled_flag ) { | |
| 23 | pcm_bit_depth_luma_minus1 | u(4) |
| 24 | pcm_bit_depth_chroma_minus1 | u(4) |
| 25 | } | |
| 26 | qpprime_y_zero_transquant_bypass_flag | u(1) |
| 27 | log2_max_pic_order_cnt_lsb_minus4 | ue(v) |
| 28 | for( i = 0; i <=max_temporal_layers_minus1; i++) { | |
| 29 | max_dec_pic_buffering[ i ] | ue(v) |
| 30 | num_reorder_pics[ i ] | ue(v) |
| 31 | max_latency_increase[ i ] | ue(v) |
| 32 | } | |
| 33 | restricted_ref_pic_lists_flag | u(1) |
| 34 | if( restricted_ref_pic_lists_flag ) | |
| 35 | lists_modification_present_flag | u(1) |
| 36 | log2_min_coding_block_size_minus3 | ue(v) |
| 37 | log2_diff_max_min_coding_block_size | ue(v) |
| 38 | log2_min_transform_block_size_minus2 | ue(v) |
| 39 | log2_diff_max_min_transform_block_size | ue(v) |
| 40 | if( pcm_enabled_flag ) { | |
| 41 | log2_min_pcm_coding_block_size_minus3 | ue(v) |
| 42 | log2_diff_max_min_pcm_coding_block_size | ue(v) |
| 43 | } | |
| 44 | max_transform_hierarchy_depth_inter | ue(v) |
| 45 | max_transform_hierarchy_depth_intra | ue(v) |
| 46 | scaling_list_enable_flag | u(1) |
| 47 | chroma_pred_from_luma_enabled_flag | u(1) |

FIG. 9

| 1 | deblocking_filter_in_aps_enabled_flag | u(1) |
|---|---|---|
| 2 | seq_loop_filter_across_slices_enabled_flag | u(1) |
| 3 | asymmetric_motion_partitions_enabled_flag | u(1) |
| 4 | non_square_quadtree_enabled_flag | u(1) |
| 5 | sample_adaptive_offset_enabled_flag | u(1) |
| 6 | adaptive_loop_filter_enabled_flag | u(1) |
| 7 | if( adaptive_loop_filter_enabled_flag ) | |
| 8 |    alf_coef_in_slice_flag | u(1) |
| 9 | if( pcm_enabled_flag ) | |
| 10 |    pcm_loop_filter_disable_flag | u(1) |
| 11 | temporal_id_nesting_flag | u(1) |
| 12 | if( log2_min_coding_block_size_minus3 == 0 ) | |
| 13 |    inter_4x4_enabled_flag | u(1) |
| 14 | num_short_term_ref_pic_sets | ue(v) |
| 15 | for( i = 0; i < num_short_term_ref_pic_sets; i++) | |
| 16 |    short_term_ref_pic_set(i) | |
| 17 | long_term_ref_pics_present_flag | u(1) |
| 18 | tiles_or_entropy_coding_sync_idc | u(2) |
| 19 | if( tiles_or_entropy_coding_sync_idc == 1 ) { | |
| 20 |    num_tile_columns_minus1 | ue(v) |
| 21 |    num_tile_rows_minus1 | ue(v) |
| 22 |    uniform_spacing_flag | u(1) |
| 23 |    if( !uniform_spacing_flag ) { | |
| 24 |      for( i = 0; i < num_tile_columns_minus1; i++ ) | |
| 25 |        column_width[ i ] | ue(v) |
| 26 |      for( i = 0; i < num_tile_rows_minus1; i++ ) | |
| 27 |        row_height[ i ] | ue(v) |
| 28 |    } | |
| 29 |    loop_filter_across_tiles_enabled_flag | u(1) |
| 30 | } | |
| 31 | vui_parameters_present_flag | u(1) |
| 32 | if( vui_parameters_present_flag ) | |
| 33 |    vui_parameters() | |
| 34 | sps_extension_flag | u(1) |
| 35 | if( sps_extension_flag ) | |
| 36 |    while( more_rbsp_data() ) | |
| 37 |      sps_extension_data_flag | u(1) |
| 38 | rbsp_trailing_bits() | |
| 39 | } | |

FIG. 10

| 1 | pic_parameter_set_rbsp( ) { | Descriptor |
|---|---|---|
| 2 | pic_parameter_set_id | ue(v) |
| 3 | seq_parameter_set_id | ue(v) |
| 4 | sign_data_hiding_flag | u(1) |
| 5 | if( sign_data_hiding_flag ) | |
| 6 | sign_hiding_threshold | u(4) |
| 7 | cabac_init_present_flag | u(1) |
| 8 | num_ref_idx_l0_default_active_minus1 | ue(v) |
| 9 | num_ref_idx_l1_default_active_minus1 | ue(v) |
| 10 | pic_init_qp_minus26 | se(v) |
| 11 | constrained_intra_pred_flag | u(1) |
| 12 | enable_temporal_mvp_flag | u(1) |
| 13 | slice_granularity | u(2) |
| 14 | max_cu_qp_delta_depth | ue(v) |
| 15 | cb_qp_offset | se(v) |
| 16 | cr_qp_offset | se(v) |
| 17 | weighted_pred_flag | u(1) |
| 18 | weighted_bipred_idc | u(2) |
| 19 | output_flag_present_flag | u(1) |
| 20 | if( tiles_or_entropy_coding_sync_idc == 1 ) { | |
| 21 | tile_info_present_flag | u(1) |
| 22 | tile_control_present_flag | u(1) |
| 23 | if( tile_info_present_flag ) { | |
| 24 | num_tile_columns_minus1 | ue(v) |
| 25 | num_tile_rows_minus1 | ue(v) |
| 26 | uniform_spacing_flag | u(1) |
| 27 | if( !uniform_spacing_flag ) { | |
| 28 | for( i = 0; i < num_tile_columns_minus1; i++ ) | |
| 29 | column_width[ i ] | ue(v) |
| 30 | for( i = 0; i < num_tile_rows_minus1; i++ ) | |
| 31 | row_height[ i ] | ue(v) |
| 32 | } | |
| 33 | } | |
| 34 | if( tile_control_present_flag ) | |
| 35 | loop_filter_across_tiles_enabled_flag | u(1) |
| 36 | } else if( tiles_or_entropy_coding_sync_idc == 2 ) | |
| 37 | num_substreams_minus1 | ue(v) |
| 38 | deblocking_filter_control_present_flag | u(1) |
| 39 | if(slice_type == P || slice_type == B) | |
| 40 | log2_parallel_merge_level_minus2 | ue(v) |
| 41 | pps_extension_flag | u(1) |
| 42 | if( pps_extension_flag ) | |
| 43 | while( more_rbsp_data( ) ) | |
| 44 | pps_extension_data_flag | u(1) |
| 45 | rbsp_trailing_bits( ) | |
| 46 | } | |

FIG. 11

| 1 | bitstream_restriction_flag | u(1) |
|---|---|---|
| 2 | if( bitstream_restriction_flag) { | |
| 3 | motion_vectors_over_pic_boundaries_flag | u(1) |
| 4 | tile_splittable_flag | u(1) |
| 5 | max_bytes_per_pic_denom | ue(v) |
| 6 | max_bits_per_mincu_denom | ue(v) |
| 7 | log2_max_mv_length_horizontal | ue(v) |
| 8 | log2_max_mv_length_vertical | ue(v) |
| 9 | } | |
| 10 | } | |

FIG. 24

| | | |
|---|---|---|
| 1 | bitstream_restriction_flag | u(1) |
| 2 | if( bitstream_restriction_flag ) { | |
| 3 | motion_vectors_over_pic_boundaries_flag | u(1) |
| 4 | if( tiles_or_entropy_coding_sync_idc == 1 ) | |
| 5 | for( j = 0, tileId = 0; j <= num_tile_columns_minus1; j++ ) | |
| 6 | for( i = 0; i <= num_tile_rows_minus1; i++, tileId++ ) | |
| 7 | tile_splittable_flag | u(1) |
| 8 | max_bytes_per_pic_denom | ue(v) |
| 9 | max_bits_per_mincu_denom | ue(v) |
| 10 | log2_max_mv_length_horizontal | ue(v) |
| 11 | log2_max_mv_length_vertical | ue(v) |
| 12 | } | |
| 13 | } | |

DECODING DEVICE AND DECODING METHOD, AND ENCODING DEVICE AND ENCODING METHOD

CROSS REFERENCE TO PRIOR APPLICATION

This application is a continuation of U.S. patent application Ser. No. 14/382,034 (filed on Aug. 29, 2014), which is a National Stage Patent Application of PCT International Patent Application No. PCT/JP2013/059133 (filed on Mar. 27, 2013) under 35 U.S.C. § 371, which claims priority to Japanese Patent Application No. 2012-087869 (filed on Apr. 6, 2012), which are all hereby incorporated by reference in their entirety.

TECHNICAL FIELD

The present technique relates to a decoding device and a decoding method, and an encoding device and an encoding method, and more particularly to a decoding device and a decoding method, and an encoding device and an encoding method capable of performing encoding and decoding independently in the time direction for each tile.

BACKGROUND ART

Currently, standardization of encoding system called High Efficiency Video Coding (HEVC) is promoted by Joint Collaboration Team-Video Coding (JCTVC), a joint standardization organization of ITU-T and ISO/IEC, aiming at further improvement of H. 264/AVC in encoding efficiency. Concerning HEVC standards, a committee draft as the initial draft version is issued in February, 2012 (e.g., see Non Patent Literature 1).

According to HEVC standards, a picture can be split into units of tiles or slices for encoding. In decoding an encoded stream split into these units and encoded, no correlation exists between the split units in the process of creating information about Context-based Adaptive Binary Arithmetic Coding (CABAC), intra prediction modes, quantization values, and the like.

However, according to inter prediction, no restriction is set to motion vectors. In this case, an encoded image of a different tile at a different time can be used as a reference image. Accordingly, independent encoding and decoding in the time direction for each tile is not allowed.

More specifically, as shown in FIG. 1, for example, each of a frame #t having a Picture Order Count (POC) of t and a frame #t-1 having a POC of t-1 is split into four tiles and inter-predicted, all the encoded images within the four tiles of the frame #t-1 can be determined as possible reference images for a CU (Coding Unit) of the frame #t.

Accordingly, there is a case when a decoded image 12 within a tile #2 having a specific ID (hereinafter referred to as a tile ID) of 2 and contained in the frame #t-1 is determined as a reference image for a CU 11 of a tile #1 having a tile ID of 1 and contained in the frame #t, for example. In other words, there is a case when a vector which has an initial point of a CU 11 and a terminal point of an area 12A of the frame #t corresponding to the decoded image 12 is detected as a motion vector 13. In this case, reference to the decoded image 12 of the tile #2 different from the tile #1 containing the CU 11 is needed; therefore, independent encoding and decoding in the time direction for each tile is not allowed.

Accordingly, a decoding device needs to have a common decoding Decoded Picture Buffer (DPB) which retains decoded images for all tiles.

FIG. 2 is a block diagram showing a constitution example of a decoding device of this type.

A decoding device 30 in FIG. 2 is constituted by decoding units 31-1 through 31-N, DPB 32-1 through 32-N, and a common DPB 33.

An encoded stream containing split N tiles (N is an arbitrary positive number) and encoded for each unit of tiles is inputted to the decoding device 30. Encoded data of each tile is supplied to the corresponding decoding units 31-1 through 31-N.

Each of the decoding units 31-1 through 31-N decodes the encoded data of the corresponding tile by using the corresponding image of decoded images stored in the common DPB 33 for all tiles contained in the corresponding frame as a reference image.

More specifically, the decoding unit 31-1 decodes encoded data of a tile #1 having a tile ID of 1 using a reference image, and supplies a decoded image of the tile #1 obtained as a result of the decoding to the DPB 32-1. Similarly, the decoding units 31-2 through 31-N decode data of a tile #2 having a tile ID of 2, a tile #3 having a tile ID of 3, and up to a tile #N having a tile ID of N using reference images, respectively. Then, the decoding units 31-2 through 31-N supply the decoded images of the tile #2, tile #3, and up to tile #N obtained by decoding to the DPB 32-2, DPB 32-3, and up to DPB 32-N, respectively.

The DPB 32-1 through 32-N store the decoded images supplied by the corresponding decoding units 31-1 through 31-N. The DPB 32-1 through 32-N supply the stored decoded images to the common DPB 33 and allow these decoded images to be stored in the common DPB 33.

The common DPB 33 stores the decoded images of the tile #1 through the tile #N at the same time supplied by the DPB 32-1 through 32-N as decoded images of one frame. The common DPB 33 outputs the stored decoded images for each unit of frames as decoded results.

In addition, though not shown in the figures, a common DPB needs to be provided on an encoding device for inter prediction similarly to the DPB on the decoding device 30.

CITATION LIST

Non Patent Document

Non Patent Document 1: Benjamin Bross, Woo-Jin Han, Jens-Rainer Ohm, Gary J. Sullivan, Thomas Wiegant, "High efficiency video coding (HEVC) text specification draft 6" JCTVC-H10003 ver 21, Feb. 2, 2012

SUMMARY OF THE INVENTION

Problems to be Solved by the Invention

As described above, according to HEVC standards, no restriction is set to motion vectors in inter prediction. In this case, a decoded image of a different tile at a different time can be used as a reference image. Accordingly, independent encoding and decoding in the time direction for each tile is not allowed.

The present technique has been developed in consideration of these situations, and is provided as a technique capable of performing encoding and decoding in the time direction independently for each tile.

Solutions to Problems

According to a first aspect of the present technique, there is provided a decoding device, including: a motion compensation unit generating a prediction image by performing, for each of tiles, motion compensation of a reference image within a co-located tile based on tile splittable information indicating that decoding is allowed for each of the tiles and motion vector information representing a motion vector used for generating encoded data of a decoding target current image when a picture of the current image is split into the tiles and decoded; and a decoding unit decoding the encoded data using the prediction image generated by the motion compensation unit.

The decoding method according to the first aspect of the present technique corresponds to the decoding device according to the first aspect of the present technique.

According to the first aspect of the present technique, a prediction image is generated by performing, for each of tiles, motion compensation of a reference image within a co-located tile based on tile splittable information indicating that decoding is allowed for each of the tiles and motion vector information representing a motion vector used for generating encoded data of a decoding target current image when a picture of the current image is split into the tiles and decoded. The encoded data is decoded using the prediction image.

According to a second aspect of the present technique, there is provided an encoding device, including: a motion compensation unit generating a prediction image by performing motion compensation of a reference image at a time different from the time of an encoding target current image based on a motion vector detected within a tile when a picture of the current image is split into the tiles and encoded; an encoding unit encoding the current image and generating encoded data using the prediction image generated by the motion compensation unit; a setting unit setting tile splittable information indicating that decoding is allowed for each unit of the tiles; and a transmission unit transmitting the encoded data generated by the encoding unit, and the tile splittable information set by the setting unit.

The encoding method according to the second aspect of the present technique corresponds to the encoding device according to the second aspect of the present technique.

According to the second aspect of the present technique, a prediction image is generated by performing motion compensation of a reference image at a time different from the time of an encoding target current image based on a motion vector detected within a tile when a picture of the current image is split into the tiles and encoded. Encoded data is generated by encoding the current image using the prediction image. Tile splittable information indicating that decoding is allowed for each unit of the tiles is set. The encoded data and the tile splittable information are transmitted.

Further, the decoding device of the first aspect and the encoding device of the second aspect can be realized by making a computer execute a program.

Moreover, the program executed by the computer for realizing the decoding device of the first aspect and the encoding device of the second aspect can be provided by transmitting the program via a transmission medium, or by recording the program on a recording medium.

In addition, the decoding device of the first aspect and the encoding device of the second aspect may be separate devices, or may be inside blocks constituting one device.

Effects of the Invention

According to the first aspect of the present technique, independent decoding in the time direction for each tile is allowed.

Moreover, according to the second aspect of the present technique, independent encoding in the time direction for each tile is allowed.

BRIEF DESCRIPTION OF DRAWINGS

FIG. 8 is a diagram showing an example of syntax of SPS.

FIG. 9 is a diagram showing an example of syntax of SPS.

FIG. 10 is a diagram showing an example of syntax of PPS.

FIG. 11 is a diagram showing an example of syntax of VUI.

FIG. 24 is a diagram showing another example of syntax of VUI.

MODE FOR CARRYING OUT THE INVENTION

First Embodiment (Constitution Example of Encoding Device in First Embodiment)

Figure 1:
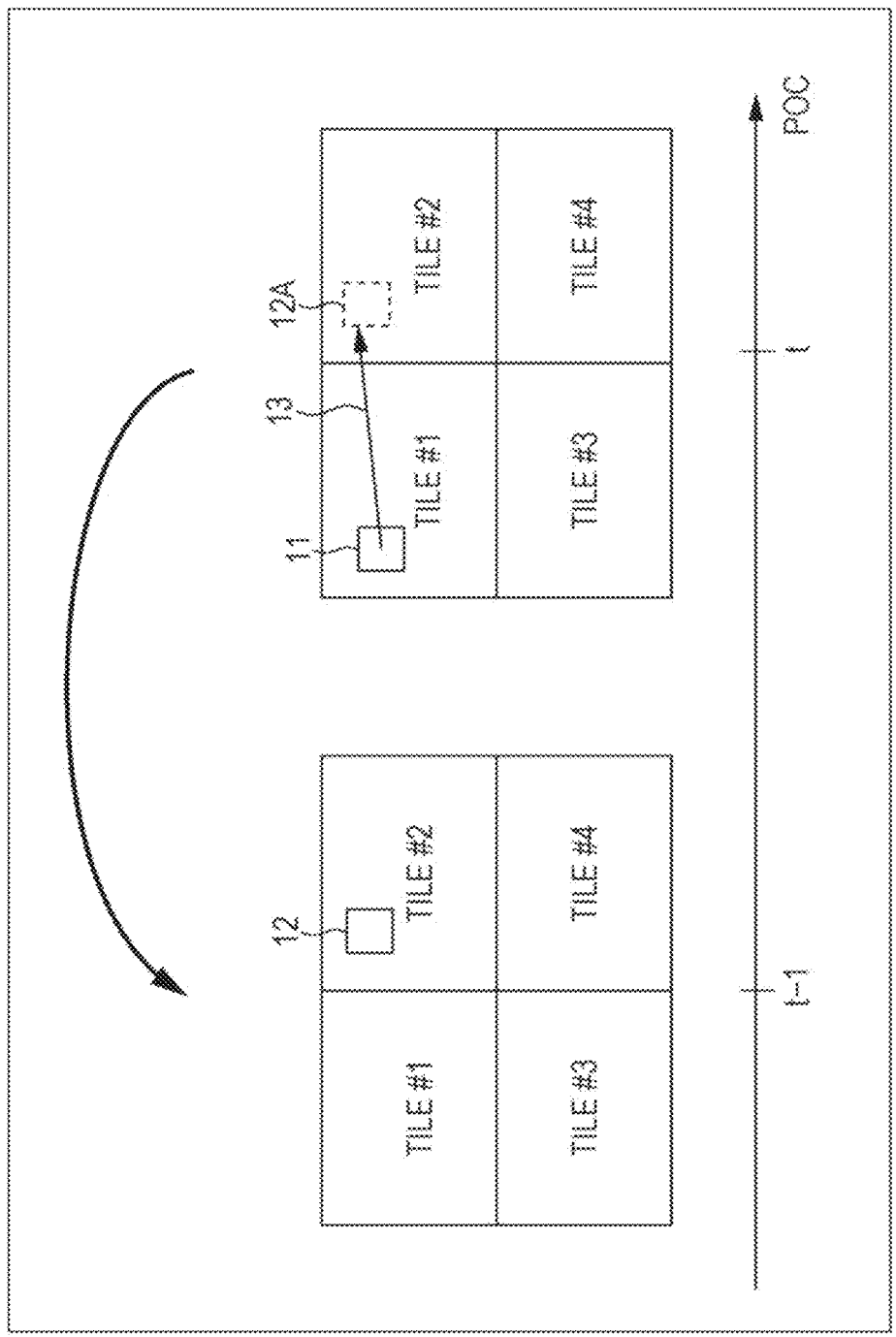
FIG. 1 is a diagram describing a reference image for conventional inter prediction.
Figure 2:
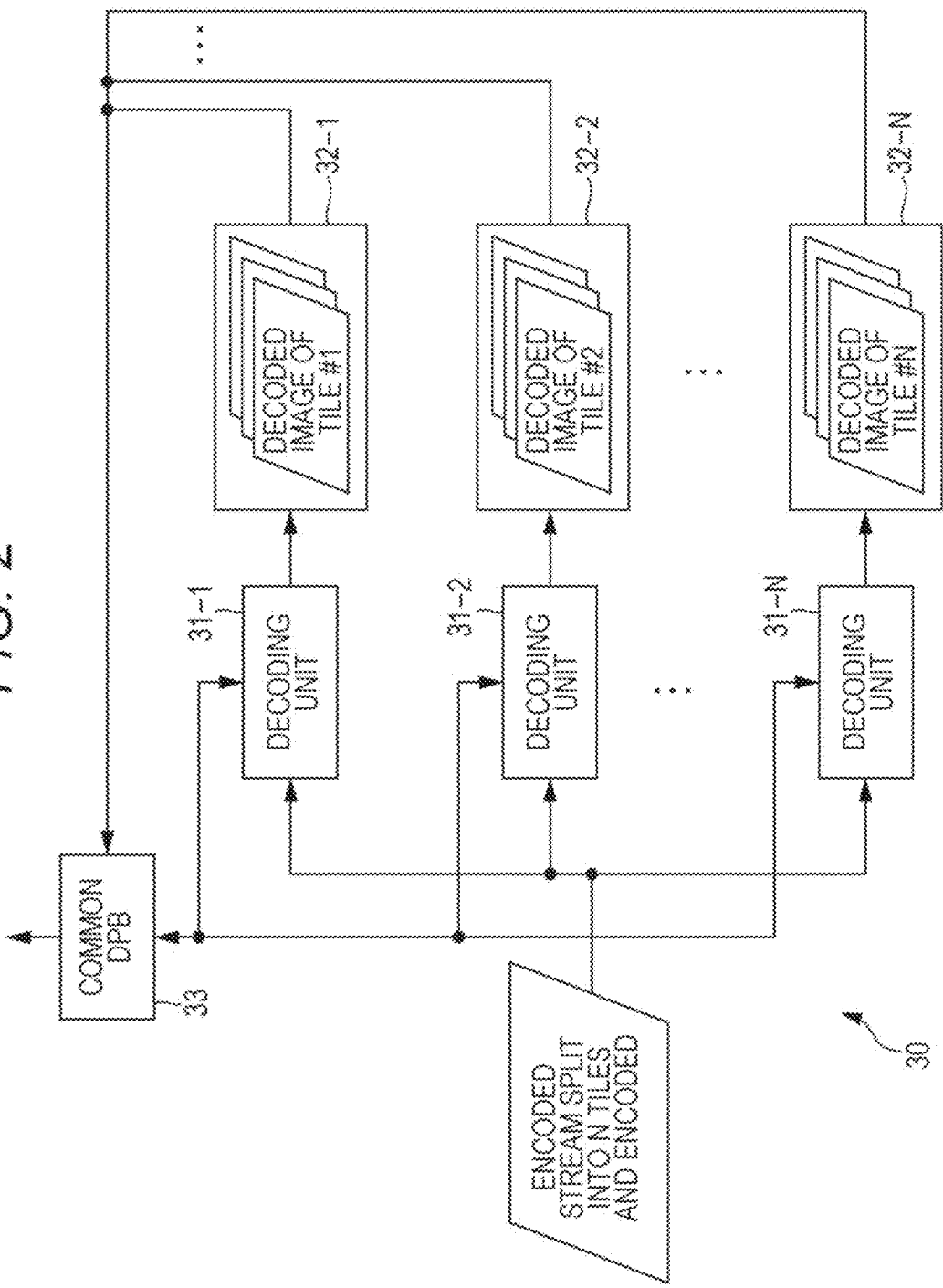
FIG. 2 is a block diagram showing a constitution example of a conventional decoding device.
Figure 3:
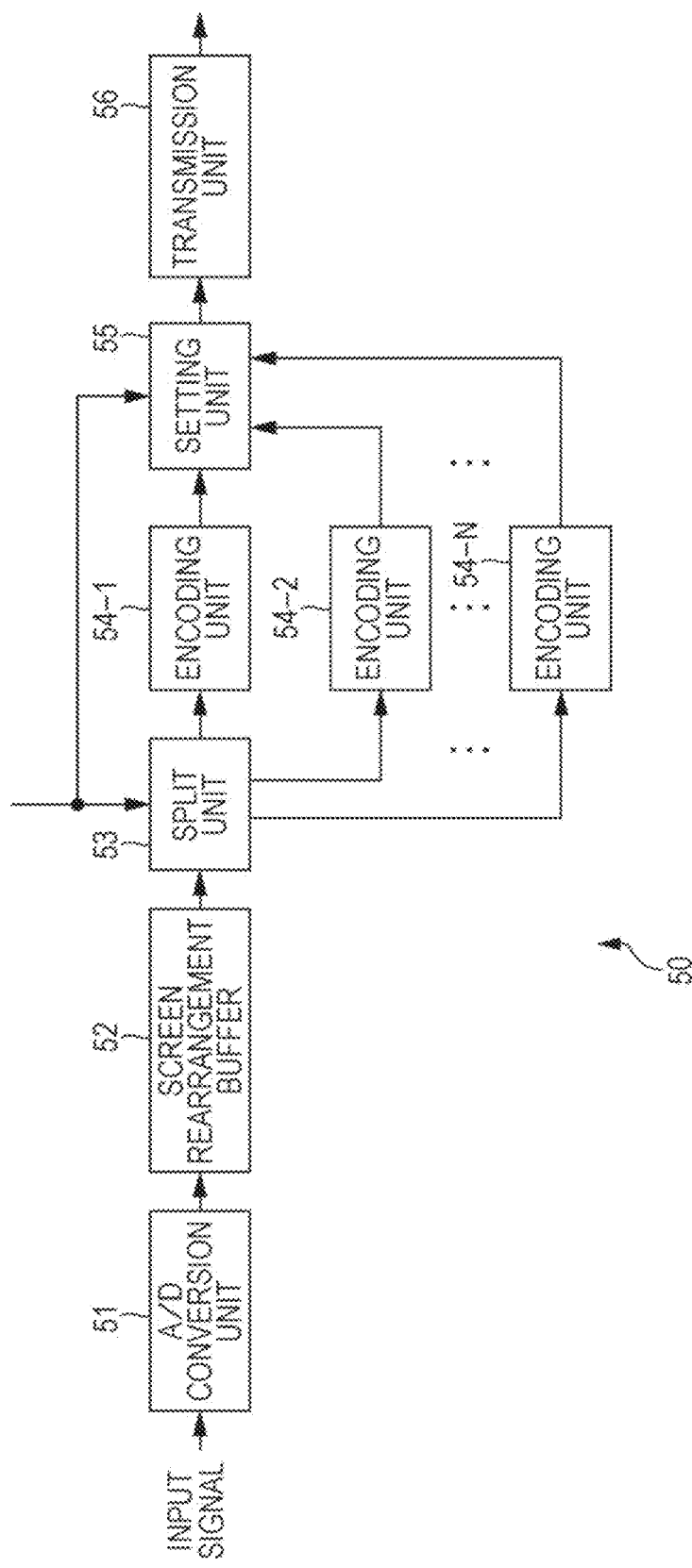
FIG. 3 is a block diagram showing a constitution example of an encoding device to which the present technique is applied according to a first embodiment.

FIG. 3 is a block diagram showing a constitution example of an encoding device to which the present technique is applied according to a first embodiment.

An encoding device 50 in FIG. 3 is constituted by an A/D conversion unit 51, a screen rearrangement buffer 52, a split unit 53, encoding units 54-1 through 54-N, a setting unit 55, and a transmission unit 56. The encoding device 50 performs, for each tile, compression-encoding of an image in each unit of frames inputted as input signals by a system corresponding to HEVC system.

More specifically, the A/D conversion unit 51 of the encoding device 50 performs A/D conversion of images in each unit of frames inputted as input signals, and outputs the converted images to the screen rearrangement buffer 52 and allows the screen rearrangement buffer 52 to store the images. The screen rearrangement buffer 52 rearranges the stored images in the respective units of frames located in the order of display in such positions that the images are located in the order of encoding in accordance with Group of Picture (GOP) structure, and supplies the rearranged images to the split unit 53.

The split unit 53 splits each of the images supplied by the screen rearrangement buffer 52 into N tiles based on information indicating split positions of tiles and a split number N specified for each unit of sequences in correspondence with operation of a not-shown input unit operated by a user (hereinafter referred to as tile split information). The split unit 53 supplies the images of the N tiles to the encoding units 54-1 through 54-N, respectively, as encoding target images.

The encoding units 54-1 through 54-N perform compression-encoding of the images of the corresponding tiles supplied by the split unit 53 independently in the time direction by a system corresponding to HEVC system. The encoding units 54-1 through 54-N supply encoded data of the respective tiles obtained as a result of the compression encoding to the setting unit 55. Further, in the following description, the encoding units 54-1 through 54-N are collectively referred to as the encoding units 54 when distinction between the encoding units 54-1 through 54-N is not particularly needed.

The setting unit 55 synthesizes the encoded data of the respective tiles supplied by the encoding units 54-1 through 54-N based on the tile split information. In addition, the setting unit 55 sets Sequence Parameter Set (SPS), Picture Parameter Set (PPS), Video Usability Information (VUI), Adaption Parameter Set (APS), and the like based on the tile split information. The setting unit 55 generates an encoded stream by adding SPS, PPS, VUI, APS and the like to the synthesized encoded data, and supplies the generated encoded stream to the transmission unit 56.

The transmission unit 56 transmits the encoded stream supplied by the setting unit 55 to a decoding device described later.

(Constitution Example of Encoding Unit)

Figure 4:
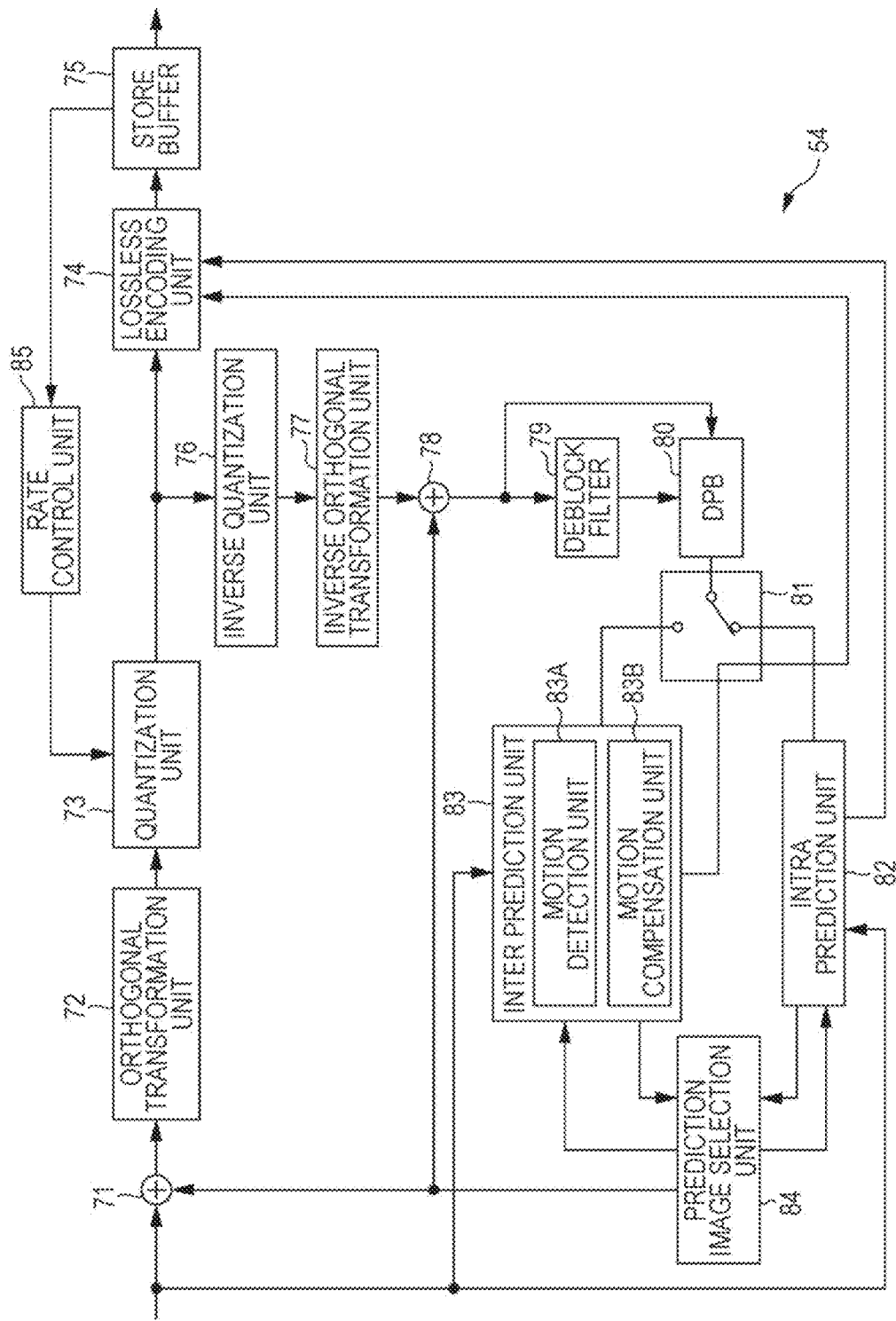
FIG. 4 is a block diagram showing a constitution example of an encoding unit in FIG. 3.

FIG. 4 is a block diagram showing a constitution example of the encoding unit 54 in FIG. 3.

The encoding unit 54 in FIG. 4 is constituted by a calculation unit 71, an orthogonal transformation unit 72, a quantization unit 73, a lossless encoding unit 74, a store buffer 75, an inverse quantization unit 76, an inverse orthogonal transformation unit 77, an addition unit 78, a deblock filter 79, a DPB 80, a switch 81, an intra prediction unit 82, an inter prediction unit 83, a prediction image selection unit 84, and a rate control unit 85.

An image of a corresponding tile is inputted from the split unit 53 in FIG. 3 to the encoding unit 54 as an encoding target image, and is supplied to the calculation unit 71, the intra prediction unit 82, and the inter prediction unit 83.

The calculation unit 71 functions as an encoding unit, and calculates the difference between a prediction image supplied by the prediction image selection unit 84 and the encoding target image to encode the encoding target image. More specifically, the calculation unit 71 subtracts the prediction image from the encoding target image to encode the encoding target image. The calculation unit 71 outputs the image obtained as a result of the calculation to the orthogonal transformation unit 72 as residual information. When the prediction image is not supplied by the prediction image selection unit 84, the calculation unit 71 outputs the encoding target image to the orthogonal transformation unit 72 as it is as residual information.

The orthogonal transformation unit 72 performs orthogonal transformation of the residual information received from the calculation unit 71, and supplies coefficients obtained as a result of the orthogonal transformation to the quantization unit 73.

The quantization unit 73 quantizes the coefficients supplied by the orthogonal transformation unit 72. The quantized coefficients are inputted to the lossless encoding unit 74.

The lossless encoding unit 74 obtains information indicating the optimum intra prediction mode (hereinafter referred to as intra prediction mode information) from the intra prediction unit 82. Instead, the lossless encoding unit 74 obtains information indicating the optimum inter prediction mode (hereinafter referred to as inter prediction mode information), a motion vector, information for specifying a reference image, and the like from the inter prediction unit 83.

The lossless encoding unit 74 performs lossless encoding of the quantized coefficients supplied by the quantization unit 73, such as variable codeword length encoding (such as Context-Adaptive Variable Length Coding (CAVLC), and arithmetic encoding (such as CABAC).

In addition, the lossless encoding unit 74 performs differential encoding of intra prediction mode information supplied by the intra prediction unit 82 using intra prediction mode information of a prediction block positioned adjacent to the prediction block of the intra prediction mode information and contained within the same tile. Instead, the lossless encoding unit 74 functions as a motion vector generation unit which predicts a motion vector supplied by the inter prediction unit 83 within the range of a predetermined restriction based on Advanced Motion Vector Prediction (AMVP) or the like, and generates the difference between the corresponding prediction vector and the actual motion vector as motion vector information.

More specifically, according to AMVP or the like, motion vectors of a prediction block adjacent to the prediction block of the motion vector information in the spatial direction, a co-located block (detailed below), a prediction block adjacent to the co-located block in the spatial direction, and the like are determined as prediction vectors.

Further, according to this specification, the condition "co-located" refers to a condition so disposed as to have the same positional relationship (positioned at the same place) in different pictures (frames, fields) Accordingly, the co-located block refers to a block having the same positional relationship (positioned at the same place) in different pictures (frame, fields). Also, co-located pixels are pixels having the same positional relationship (positioned at the same place) in different pictures (frame, fields).

In addition, according to this specification, the adjacent (neighboring) condition refers to such a condition as to have a positional relationship allowing reference from a current picture (frame, field). It is preferable that this positional relationship corresponds to the position immediately before or immediately after in view of time. However, this relationship is not required as long as the effects of the present technique can be offered. Further, the adjacent condition in the time direction and the adjacent condition in the spatial direction are collectively referred to as an adjacent condition when distinction therebetween is not particularly needed. The adjacent condition in the time direction represents a positional relationship allowing reference in the time direction. The adjacent condition in the spatial direction represents to a positional relationship allowing reference within the same picture.

The lossless encoding unit 74 restricts the prediction block of the motion vector defined as the prediction vector to the prediction blocks within the same tile as the tile of the prediction block of the motion vector information. In this case, the decoding device is not required to refer to motion vectors of other tiles. Accordingly, the encoded data after inter prediction encoding can be decoded independently in the time direction for each tile.

In addition, merging information may be used as the motion vector information. The merging information is information indicating whether a prediction block of a motion vector is to be merged with another prediction block, and which prediction block the motion vector is to be merged with at the time of merging. Possible prediction blocks for merging involve a prediction block adjacent to the prediction block of the motion vector in the spatial direction, a co-located block, and a prediction block adjacent to the co-located block in the spatial direction, for example.

In this case, however, the possible prediction blocks for merging are restricted to the prediction blocks within the same tile as the tile of the prediction block of the motion vector information. Accordingly, the decoding device is not required to refer to motion vectors of other tiles; therefore, the encoded data after inter prediction encoding can be independently decoded in the time direction for each tile.

The lossless encoding unit 74 determines whether the motion vector supplied by the inter prediction unit 83 is identical to any of the motion vectors of the possible prediction blocks for merging when the merging information is used as the motion vector information. When determining as identical, the lossless encoding unit 74 generates, as motion vector information, merging information indicating that merging is performed with the possible prediction block for merging determined as a vector identical block. On the other hand, when determining as not identical, the lossless encoding unit 74 generates, as motion vector information, merging information indicating that merging is not performed.

The lossless encoding unit 74 performs lossless encoding of the intra prediction mode information after differential encoding, or the inter prediction mode information, motion vector information, information for specifying a reference image, and the like, and determines the information after lossless encoding as encoded information about encoding. The lossless encoding unit 74 supplies the coefficients and encoded information after lossless encoding to the store buffer 75 as encoded data and allows the store buffer 75 to store the encoded data. Further, the encoded information may be determined as header information of the coefficients after lossless encoding.

The store buffer 75 temporarily stores the encoded data supplied by the lossless encoding unit 74. In addition, the store buffer 75 supplies the stored encoded data to the setting unit 55 in FIG. 3.

Furthermore, the quantized coefficients outputted from the quantization unit 73 are also inputted to the inverse quantization unit 76, and inversely quantized and supplied to the inverse orthogonal transformation unit 77.

The inverse orthogonal transformation unit 77 performs inverse orthogonal transformation of the coefficients supplied by the inverse quantization unit 76, and supplies residual information obtained as a result of the inverse orthogonal transformation to the addition unit 78.

The addition unit 78 adds the residual information as a decoding target image supplied by the inverse orthogonal transformation unit 77 to the prediction image supplied by the prediction image selection unit 84, and obtains a decoded image locally decoded for each unit of tiles. When the prediction image is not supplied by the prediction image selection unit 84, the addition unit 78 determines the residual information supplied by the inverse orthogonal transformation unit 77 as a decoded image locally decoded for each unit of tiles. The addition unit 78 supplies the decoded image locally decoded for each unit of tiles to the deblock filter 79, and supplies the decoded image to the DPB 80 and allows the DPB 80 to store the decoded image.

The deblock filter 79 performs, for each unit of tiles, filtering of the decoded image locally decoded for each unit of tiles supplied by the addition unit 78. The filtering includes deblock filtering for removing block distortion, sample adaptive offset (SAO) processing for suppressing ringing, and adaptive loop filter (ALF) processing using class grouping or the like. The deblock filter 79 supplies the decoded image for each unit of tiles obtained as a result of the filtering to the DPB 80, and allows the DPB 80 to store the decoded image. The decoded image for each unit of tiles stored in the DPB 80 is outputted via the switch 81 to the intra prediction unit 82 or the inter prediction unit 83 as a reference image.

The intra prediction unit 82 performs intra prediction of all possible intra prediction modes by using a reference image read from the DPB 80 via the switch 81 and not filtered by the deblock filter 79.

Moreover, the intra prediction unit 82 calculates cost function values (detailed later) for all the possible intra prediction modes based on the encoding target image supplied by the split unit 53, and the prediction image generated as a result of the intra prediction. Then, the intra prediction unit 82 determines the intra prediction mode where the cost function value becomes the minimum as the optimum intra prediction mode, and supplies the prediction image generated in the optimum intra prediction mode, and the corresponding cost function value to the prediction image selection unit 84. When notified by the prediction image selection unit 84 about selection of the prediction image generated in the optimum intra prediction mode, the intra prediction unit 82 supplies the intra prediction mode information to the lossless encoding unit 74.

It is noted herein that the cost function value is also called an Rate Distortion (RD) cost, and calculated based on either High Complexity mode or Low Complexity mode defined in Joint Model (JM) as reference software in H. 264/AVC system, for example.

More specifically, when High Complexity mode is selected as a calculation method of the cost function value, steps up to lossless encoding are temporarily performed for all the possible prediction modes. Then, the cost function value represented by the following equation (1) is calculated for each prediction mode.

[Equation 1]

$$\text{Cost (Mode)}=D+\lambda \cdot R \qquad (1)$$

D is the difference (distortion) between the original image and the decoded image. R is the generated amount of codes up to the coefficients of orthogonal transformation. $\lambda$ is a Lagrange multiplier given as a function of a quantization parameter QP.

On the other hand, when Low Complexity mode is selected as the calculation method for the cost function value, generation of the decoded image, and calculation of the header bits of information indicating the prediction modes and the like are performed for all the possible prediction modes. Then, the cost function represented by the following equation (2) is calculated for each prediction mode.

[Equation 2]

$$\text{Cost (Mode)}=D+\text{QPtoQuant (QP)} \cdot \text{Header\_Bit} \qquad (2)$$

D is the difference (distortion) between the original image and the decoded image. Header_Bit is header bits for a prediction mode. QPtoQuant is a function given as a function of a quantization parameter QP.

In Low Complexity mode, generation of decoded images for all the prediction modes is only needed, and the necessity of performing lossless encoding is eliminated. Accordingly, the amount of calculation decreases.

The inter prediction unit 83 is constituted by a motion detection unit 83A and a motion compensation unit 83B, and performs motion prediction and compensation processing of all the possible inter prediction modes. More specifically, the motion detection unit 83A performs motion prediction within the tile of the encoding target image by using the encoding target image supplied by the split unit 53, and a reference image read from the DPB 80 via the switch 81, positioned at a time different from the time of the corresponding encoding target image, and filtered by the deblock filter 79.

More specifically, the motion detection unit 83A detects motion vectors for all the possible inter prediction modes by using the encoding target image, and a reference image filtered, contained within the same tile as the tile of the encoding target image, and positioned in a frame different from the frame of the encoding target image. The motion compensation unit 83B performs inter prediction by performing motion compensation of the reference image filtered by the deblock filter 79 based on the motion vectors detected by the motion detection unit 83A, and generates a prediction image.

At this time, the inter prediction unit 83 calculates the cost function values for all the possible inter prediction modes based on the encoding target image and the prediction image, and determines the inter prediction mode where the cost function value becomes the minimum as the optimum inter measurement mode. Then, the inter prediction unit 83 supplies the cost function value for the optimum inter prediction mode, and the corresponding prediction image to the prediction image selection unit 84. In addition, the inter prediction unit 83 outputs the inter prediction mode information, the corresponding motion vector, the information for specifying a reference image, and the like to the lossless encoding unit 74 when notified from the prediction image selection unit 84 about selection of the prediction image generated in the optimum inter prediction mode.

The prediction image selection unit 84 selects the prediction mode where the corresponding cost function value is smaller from the optimum intra prediction mode and the optimum inter prediction mode based on the cost function values supplied by the intra prediction unit 82 and the inter prediction unit 83, and determines the selected prediction mode as the optimum prediction mode. Then, the prediction image selection unit 84 supplies the prediction image in the optimum prediction mode to the calculation unit 71 and the addition unit 78. Moreover, the prediction image selection unit 84 notifies the intra prediction unit 82 or the inter prediction unit 83 about selection of the prediction image in the optimum prediction mode.

The rate control unit 85 controls the rate of the quantizing operation of the quantization unit 73 based on the encoded data stored in the store buffer 75 such that neither overflow nor underflow occurs.

(Description of Tile)

Figure 5:
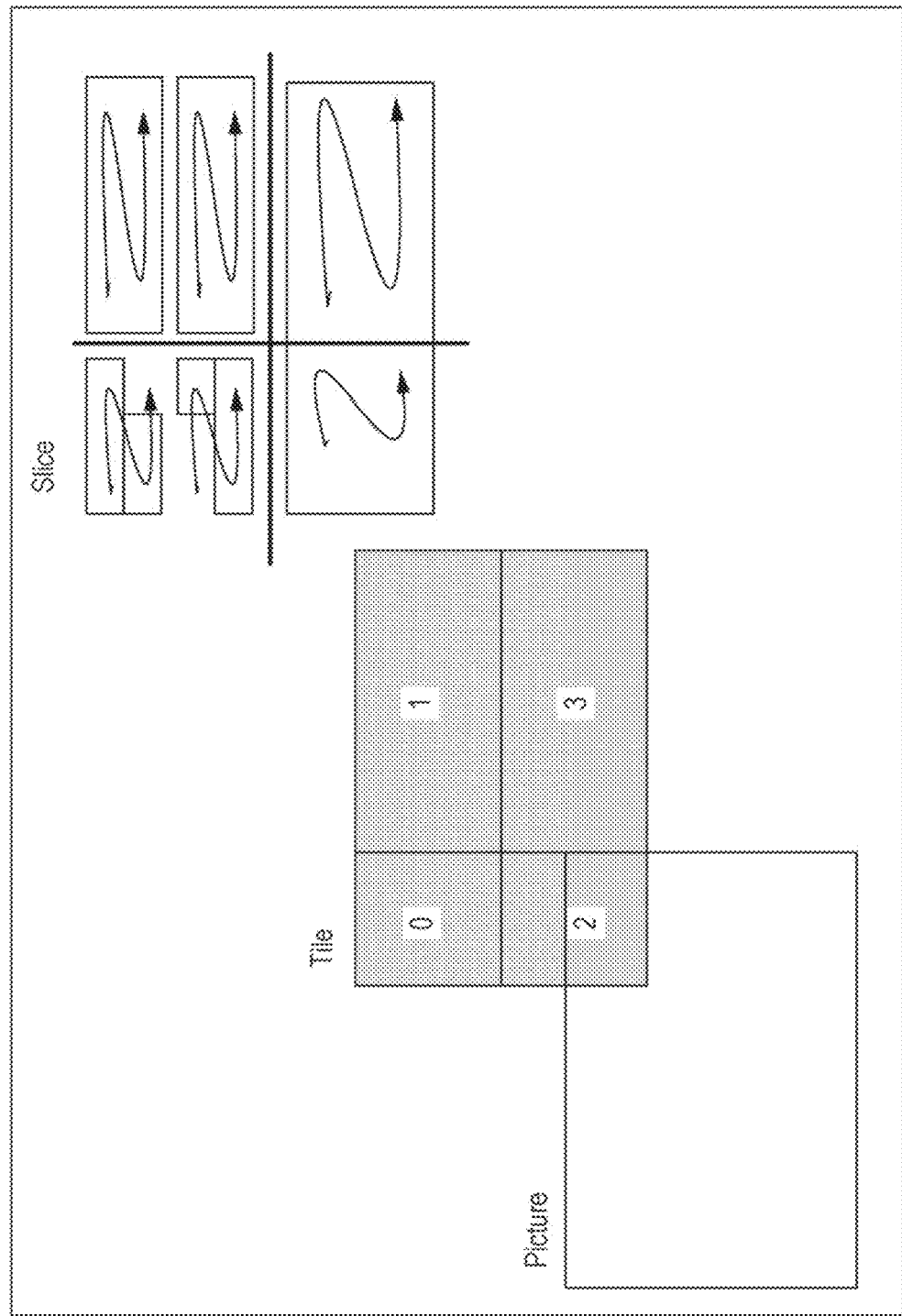
FIG. 5 is a diagram describing tiles.

FIG. 5 is a diagram showing tiles.

As shown in FIG. 5, one picture (frame) can be split into a plurality of tiles and encoded. According to the example in FIG. 5, one picture is split into four tiles. Each tile is given a tile ID starting from 0 in the order of raster scan. Further, Largest Coding Units (LCUs) within a tile are encoded in the order of raster scan.

Moreover, one picture can also be split into a plurality of slices. The boundaries between the respective tiles may be either identical to or different from the boundaries between the respective slices. According to the example in FIG. 5, each of a tile #0 having a tile ID of 0 and a tile #1 having a tile ID of 1 is constituted by two slices. Also, each of a tile #3 having a tile ID of 3 and a tile #4 having a tile ID of 4 constitutes one slice. According to this embodiment, however, a plurality of tiles does not constitute one slice. In other words, a tile contains at least one slice. Accordingly, encoded data of each tile always contains a slice header; therefore, encoding can be performed for each unit of tiles. Furthermore, when one tile contains a plurality of slices, the slices within the corresponding tile are encoded in the order of raster scan.

(Description of Restriction on Motion Vector Detection)

Figure 6:
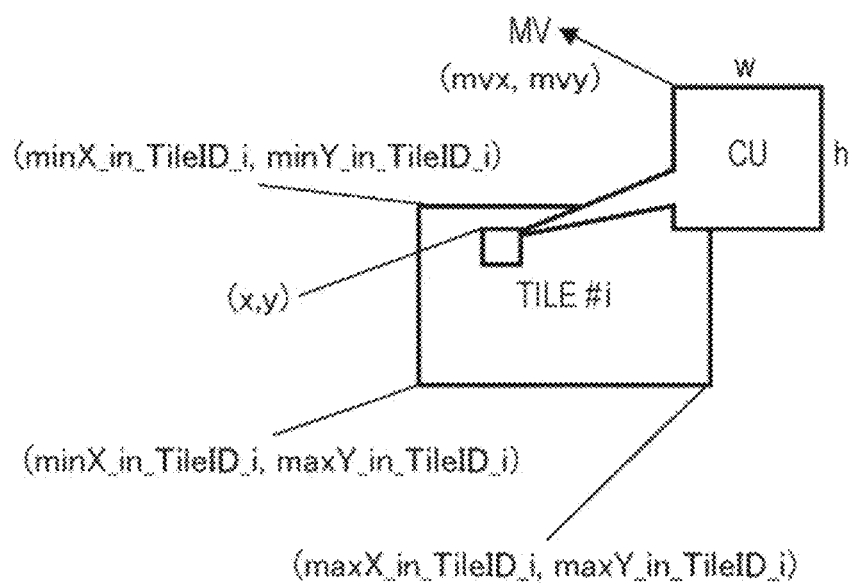
FIG. 6 is a diagram describing a restriction set when a motion vector is detected.

FIG. 6 is a diagram showing a restriction set when the motion detection unit 83A in FIG. 4 detects motion vectors.

As shown in FIG. 6, the motion detection unit 83A performs motion prediction within a tile by setting such a restriction that possible reference images of a CU within a tile #i having a tile ID of i are only images within the tile #i. Accordingly, a motion vector MV (mvx, mvy) (unit: pixel) satisfies the following equation (3).

[Equation 3]

$$x+mvx \geq minX\_in\_TileID\_i$$

$$y+mvy \geq minY\_in\_TileID\_i$$

$$x+w+mvx < maxX\_in\_TileID\_i$$

$$y+h+mvy < maxY\_in\_TileID\_i \quad (3)$$

Further, in the equation (3), (x, y) are coordinates of a pixel unit corresponding to a pixel located at the upper left of the CU, and each of w and h is a length of a pixel unit in the horizontal width and the vertical width, respectively. Moreover, minX_in_TileID_i corresponds to the x coordinate value of the pixel at the upper left of the tile #i, and minY_in_TileID_i corresponds to the y coordinate value of the pixel at the upper left of the tile #i. Furthermore, maxX_in_TileID_i corresponds to the x coordinate value of the pixel at the lower right of the tile #i, and maxY_in_TileID_i corresponds to the y coordinate value of the pixel at the lower right of the tile #i.

Figure 7:
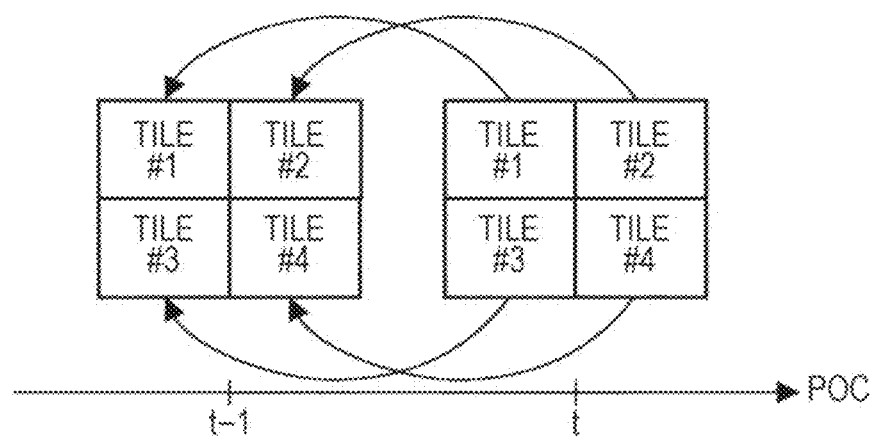
FIG. 7 is a diagram describing a reference image for inter prediction.

The restriction established at the time of detection of the motion vector as discussed above eliminates the necessity of using a decoded image of another tile, as shown in FIG. 7, as a reference image in the time direction at the time of inter prediction.

More specifically, as shown in FIG. 7, inter prediction of the CU within the tile #1 of the frame #t is performed by using an image within the tile #1 of the frame #t−1 as a reference image when each of the frame #t having a POC of t and the frame #t−1 having a POC of t−1 is split into four tiles. Similarly to the tile #1, inter prediction is performed for the respective CUs of tiles #2 through #4 by using images within their own tile #2, tile #3, and tile #4 as reference images. Accordingly, independent inter prediction in the time direction for each tile is allowed.

(Example of SPS)

FIGS. 8 and 9 show an example of syntax of SPS set by the setting unit 55 in FIG. 3.

As shown in lines 19 through 28 in FIG. 9, tile split information for each unit of sequences is set for SPS. The tile split information includes num_tile_columns_minus1 shown in line 20, num_tile_rows_minus1 shown in line 21, column_width[i] shown in line 25, row_height[i] shown in line 27, and the like.

Num_tile_columns_minus1 represents the number of tiles in the column direction (horizontal direction), while num_tile_rows_minus1 represents the number of tiles in the row direction (vertical direction). Also, column_width[i] represents the length of a pixel unit in the horizontal direction of each tile, while row_height[i] represents the length of a pixel unit in the vertical direction of each tile.

Moreover, as shown in line 29 in FIG. 9, deblock filter information (filter information) (loop_filter_across_tiles_enabled_flag) representing whether filtering is performed across plural tiles in a reference image is set for each unit of sequences in SPS. The deblock filter 79 of the encoding device 50 performs filtering for each unit of tiles; therefore, the setting unit 55 sets the deblock filter information to false (0).

(Example of PPS)

FIG. 10 shows an example of syntax of PPS set by the setting unit 55 in FIG. 3.

As shown in line 21 in FIG. 10, tile_info_present_flag representing whether tile split information is controlled for each unit of pictures is set for PPS. The setting unit 55 sets tile_info_present_flag to false (0). In this case, the fixed tile diving method is maintained within a sequence for the encoding device 50, and is not changed between pictures.

In addition, when the tile split information for each unit of pictures as described later is identical between images within the same sequence, tile_info_present_flag may be set to true (1).

Moreover, as shown in lines 23 through 33, tile split information for each unit of pictures is set for PPS similarly to the tile split information for each unit of sequences in FIG. 9. Furthermore, as shown in line 35, deblock filter information for each unit of pictures is set for PPS.

(Example of VUI)

FIG. 11 show an example of syntax of VUI set by the setting unit 55 in FIG. 3.

As shown in line 4 in FIG. 11, tile splittable information (tile_splittable_flag) is set for VUI. The tile_splittable information is information indicating whether decoding is allowed for each unit of tiles. The encoding device 50 allows decoding for each unit of tiles by performing motion prediction within a tile and setting various restrictions. Thus, the setting unit 55 sets the tile splittable information to true (1).

When bitstream_restriction_flag in line 1 is 0, the decoding side recognizes that decoding is not allowed for each tile based on the consideration that the tile splittable information is false (0).

(Description of Process Performed by Encoding Device)

Figure 12:
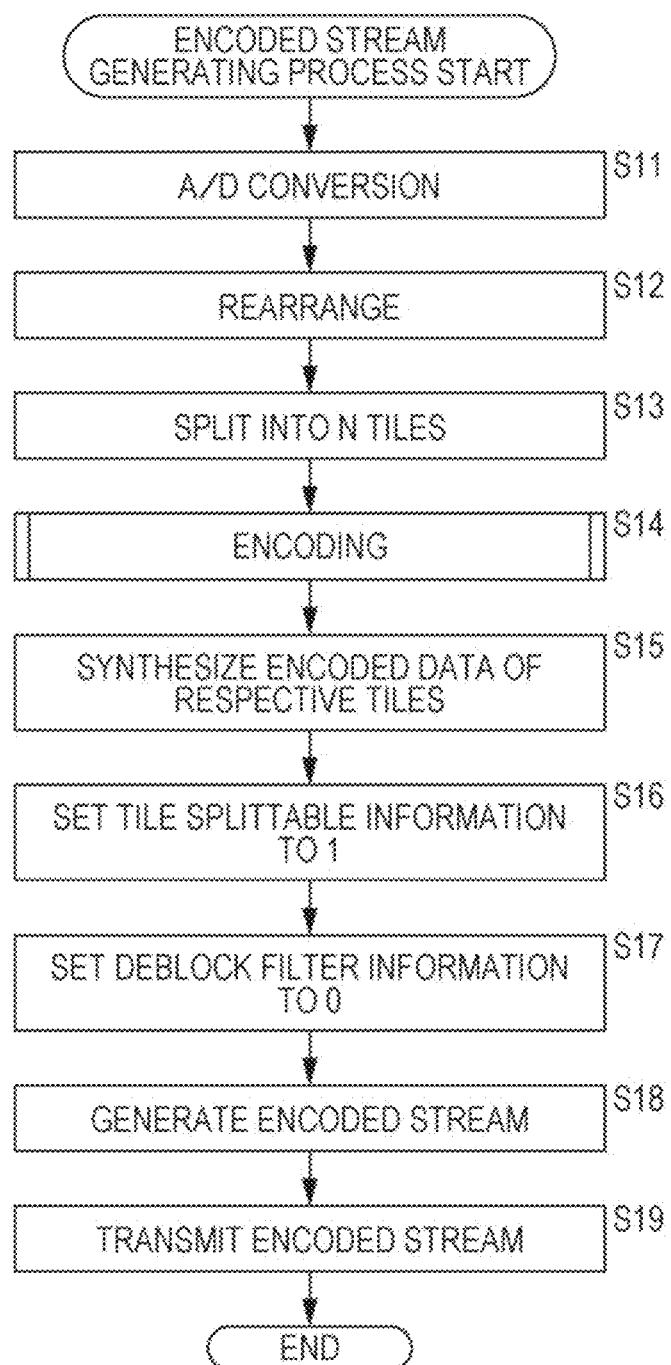
FIG. 12 is a flowchart describing an encoded stream generating process.

FIG. 12 is a flowchart describing an encoded stream generating process performed by the encoding device 50 in FIG. 3.

In step S11 in FIG. 12, the A/D conversion unit 51 performs A/D conversion of an image of each unit of frames inputted as input signals, and outputs the converted image to the screen rearrangement buffer 52 and allows the screen rearrangement buffer 52 to store the image.

In step S12, the screen rearrangement buffer 52 rearranges the stored images of the respective frames located in the display order in such positions that the images are located in the order of encoding in accordance with the GOP structure, and supplies the rearranged images to the split unit 53.

In step S13, the split unit 53 splits each of the images supplied by the screen rearrangement buffer 52 into N tiles based on the tile split information. The split unit 53 supplies each of the images containing the N tiles to the corresponding encoding units 54-1 through 54-N as an image of an encoding unit.

In step S14, the encoding units 54 perform an encoding process which compression-encodes the images of the corresponding tiles supplied by the split unit 53 independently in the time direction by a system corresponding to HEVC system. The details of the encoding process will be described with reference to FIGS. 13 and 14 discussed below.

In step S15, the setting unit 55 synthesizes encoded data of the respective tiles supplied by the encoding units 54-1 through 54-N based on the tile split information.

In step S16, the setting unit 55 sets the tile splittable information of VUI to 1. In step S17, the setting unit 55 sets the deblock filter information of SPS and PPS to 0. In addition, the setting unit 55 sets information on SPS, PPS, VUI, APS and the like other than the tile splittable information based on the tile split information and the like.

At this time, the setting unit 55 sets sao_repeat_row_flag and sao_merge_up_flag contained in APS and indicating whether SAO processing is performed using parameters of SAO processing of the adjacent image to false (0) when the adjacent image is an image of a different tile. Moreover, the setting unit 55 sets alf_repeat_row_flag and alf_merge_up_flag contained in APS and indicating whether ALF processing is performed using parameters of ALF processing of the adjacent image to false (0) when the adjacent image is an image of a different tile. In this case, parameters for SAO processing and parameters for ALF processing are not shared between different tiles. Accordingly, filtering is performed for each unit of tiles for encoding.

As discussed above, sao_repeat_row_flag, sao_merge_up_flag, alf_repeat_row_flag and alf_merge_up_flag are set to false (0) when the adjacent image is an image of a different tile. Accordingly, these sets of information are considered as parameter sharing information representing that parameters in filtering are not shared between tiles.

In step S18, the setting unit 55 generates an encoded stream by adding SPS, PPS, VUI, APS and the like to the synthesized encoded data, and supplies the encoded stream to the transmission unit 56.

In step S19, the transmission unit 56 transmits the encoded stream supplied by the setting unit 55 to the decoding device described later, and terminates the process.
(Description of Process Performed by Encoding Device)

Figure 13:
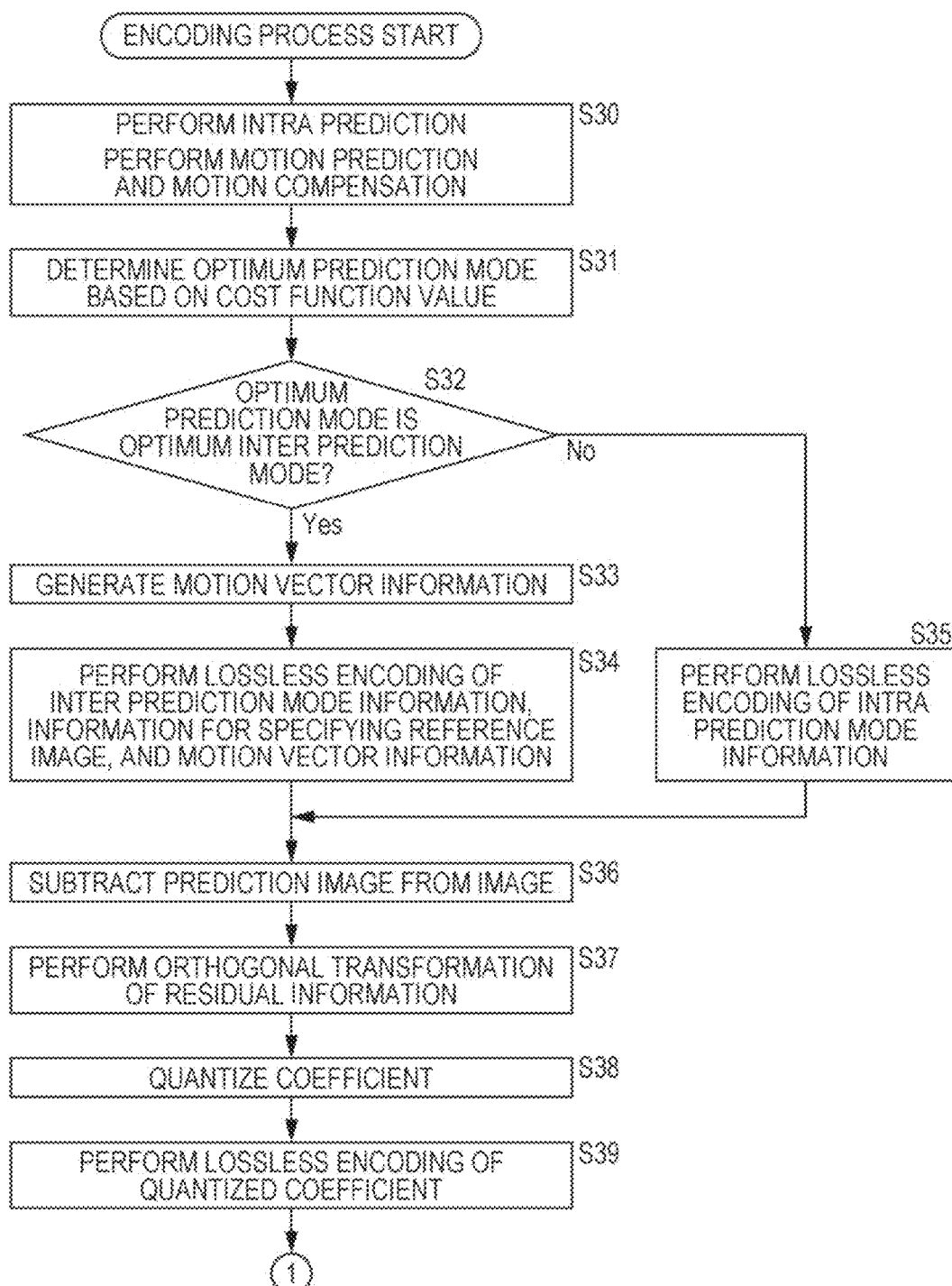
FIG. 13 is a flowchart describing an encoding process in FIG. 12.
Figure 14:
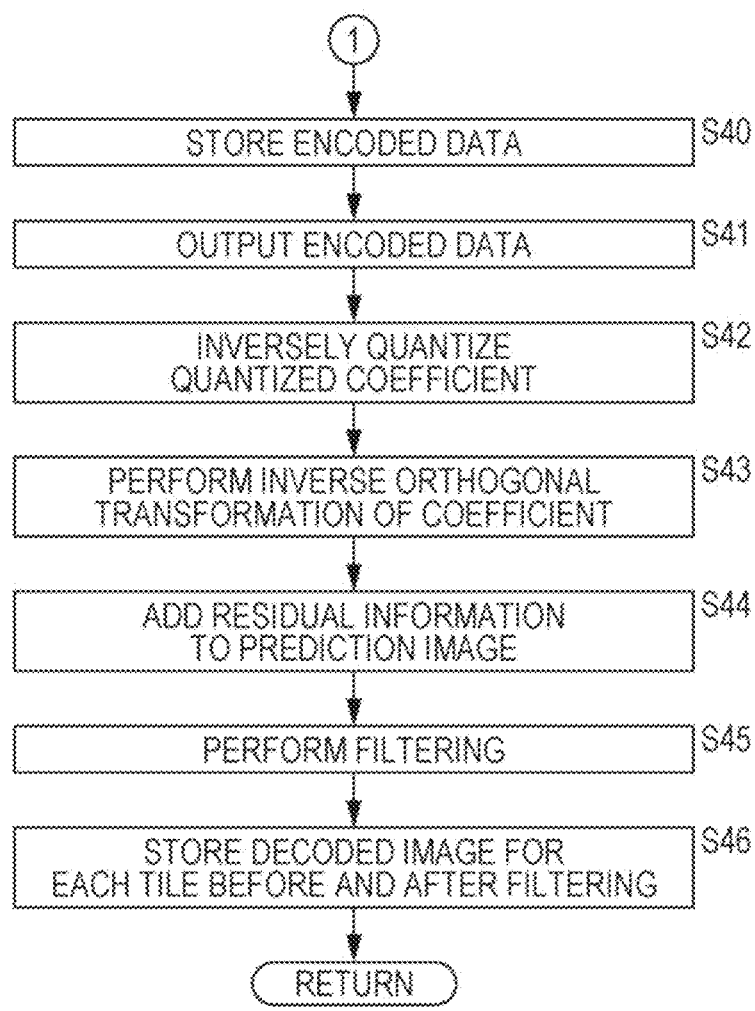
FIG. 14 is a flowchart describing the encoding process in FIG. 12.

FIGS. 13 and 14 are a flowchart describing step S14 of the encoding process in FIG. 12. This encoding process is performed for each unit of CUs, for example.

In step S30, the intra prediction unit 82 performs an intra prediction process for performing intra prediction for all possible intra prediction modes by using an image stored in the DPB 80, located in the same tile as the tile of the encoding target image, and not filtered as a reference image.

At this time, the intra prediction unit 82 calculates cost function values for all the possible intra prediction modes based on the encoding target image supplied by the split unit 53 and a prediction image generated as a result of the intra prediction. Then, the intra prediction unit 82 determines the intra prediction mode where the cost function value becomes the minimum as the optimum intra prediction mode, and supplies a prediction image generated in the optimum intra prediction mode and the corresponding cost function value to the prediction image selection unit 84.

In addition, the inter prediction unit 83 performs motion prediction and motion compensation within a tile for all the possible inter prediction modes by using a filtered image stored in the DPB 80, and located in the same tile as the tile of the encoding target image as a reference image. At this time, the inter prediction unit 83 calculates cost function values for all the possible inter prediction modes based on the encoding target image supplied by the split unit 53, and a prediction image generated as a result of the motion compensation. Then, the inter prediction unit 83 determines the inter prediction mode where the cost function values becomes the minimum as the optimum inter prediction mode, and supplies a prediction image generated in the optimum inter prediction mode and the corresponding cost function value to the prediction image selection unit 84.

In step S31, the prediction image selection unit 84 selects the prediction mode where the cost function value becomes the minimum from the optimum intra prediction mode and the optimum inter prediction mode based on the cost function values supplied by the intra prediction unit 82 and the inter prediction unit 83 by the processing in step S30, and determines the selected prediction mode as the optimum prediction mode. Then, the prediction image selection unit 84 supplies a prediction image in the optimum prediction mode to the calculation unit 71 and the addition unit 78.

In step S32, the prediction image selection unit 84 determines whether the optimum prediction mode is the optimum inter prediction mode or not. When it is determined that the optimum prediction mode is the optimum inter prediction mode in step S32, the prediction image selection unit 84 notifies the inter prediction unit 83 about selection of the prediction image generated in the optimum inter prediction mode. As a result, the inter prediction unit 83 outputs the inter prediction mode information, the corresponding motion vector, and the information for specifying a reference image to the lossless encoding unit 74.

Then, in step S33, the lossless encoding unit 74 predicts the motion vector supplied by the inter prediction unit 83 based on AMVP or the like, and generates the difference between the prediction vector and the actual motion vector as motion vector information. At this time, the prediction block of the motion vector determined as the prediction vector in AMVP is restricted to any of the prediction blocks within the same tile as the tile of the prediction block of the motion vector information.

In step S34, the lossless encoding unit 74 performs lossless encoding of the inter prediction mode information, the information for specifying a reference image, and the motion vector information supplied by the inter prediction unit 83, and determines the information thus obtained as encoded information. Then, the process proceeds to step S36.

On the other hand, when it is determined that the optimum prediction mode is not the optimum inter prediction mode in step S32, in other words, when the optimum prediction mode is the optimum intra prediction mode, the prediction image selection unit 84 notifies the intra prediction unit 82 about selection of the prediction image generated in the optimum intra prediction mode. As a result, the intra prediction unit 82 supplies the intra prediction mode information to the lossless encoding unit 74.

Then, in step S35, the lossless encoding unit 74 performs differential encoding of the intra prediction mode information supplied by the intra prediction unit 82, and further performs lossless encoding of the resultant information to provide the information thus obtained as encoded information. Then, the process proceeds to step S36.

In step S36, the calculation unit 71 subtracts the prediction image supplied by the prediction image selection unit 84 from the encoding target image supplied by the split unit 53. The calculation unit 71 outputs the image obtained as a result of the subtraction to the orthogonal transformation unit 72 as residual information.

In step S37, the orthogonal transformation unit 72 performs orthogonal transformation of the residual information received from the calculation unit 71, and supplies coefficients obtained as a result of the orthogonal transformation to the quantization unit 73.

In step S38, the quantization unit 73 quantizes the coefficients supplied by the orthogonal transformation unit 72. The quantized coefficients are inputted to the lossless encoding unit 74 and the inverse quantization unit 76.

In step S39, the lossless encoding unit 74 performs lossless encoding of the coefficients quantized and supplied by the quantization unit 73. The lossless encoding unit 74 generates encoded data from information obtained as a result of the lossless encoding and the encoded information generated by the processing in step S34 or S35.

In step S40 in FIG. 14, the lossless encoding unit 74 supplies the encoded data to the store buffer 75, and allows the store buffer 75 to store the data.

In step S41, the store buffer 75 outputs the stored encoded data to the setting unit 55 (FIG. 3).

In step S42, the inverse quantization unit 76 performs inverse quantization of the quantized coefficients supplied by the quantization unit 73.

In step S43, the inverse orthogonal transformation unit 77 performs inverse orthogonal transformation of the coefficients supplied by the inverse quantization unit 76, and supplies the residual information obtained as a result of the inverse orthogonal transformation to the addition unit 78.

In step S44, the addition unit 78 adds the residual information supplied by the inverse orthogonal transformation unit 77 to the prediction image supplied by the prediction image selection unit 84 to obtain a decoded image locally decoded for each unit of tiles. The addition unit 78 supplies the obtained decoded image for each unit of tiles to the deblock filter 79, and supplies the decoded image to the DPB 80.

In step S45, the deblock filter 79 performs, for each unit of tiles, filtering of the decoded image locally decoded for each unit of tiles and supplied by the addition unit 78. The deblock filter 79 supplies the decoded image obtained as a result of the filtering for each unit of tiles to the DPB 80.

In step S46, the DPB 80 stores the decoded images for each unit of tiles before and after the filtering. More specifically, the DPB 80 stores the decoded images for each unit of tiles supplied by the addition unit 78 and the decoded images for each unit of tiles supplied by the deblock filter 79. The decoded images for each unit of tiles stored in the DPB 80 are outputted via the switch 81 to the intra prediction unit 82 or the inter prediction unit 83 as reference images. Then, the process returns to step S14 in FIG. 12, and proceeds to step S15.

Further, according to the encoding process in FIG. 13 and FIG. 14, both the intra prediction, and motion prediction and motion compensation are always performed for simplification of the description. However, in practical cases, only either of these processes may be performed depending on picture types or other conditions.

As discussed herein, the encoding device 50 performs motion prediction within a tile, and generates a motion vector by using an encoding target image and a reference image at a time different from the time of the encoding target image. Accordingly, independent encoding in the time direction for each tile is allowed.

Further, while the encoding device 50 is provided with the N encoding units 54 for encoding images of respective tiles, the encoding device 50 may be provided with only one encoding unit. In this case, the encoding unit has a DPB storing a decoded image for each tile, and encodes images per tile in the order of the tile ID number in the direction from smaller number to larger number, that is, the order of raster scan.

(Constitution Example of Decoding Device in First Embodiment)

Figure 15:
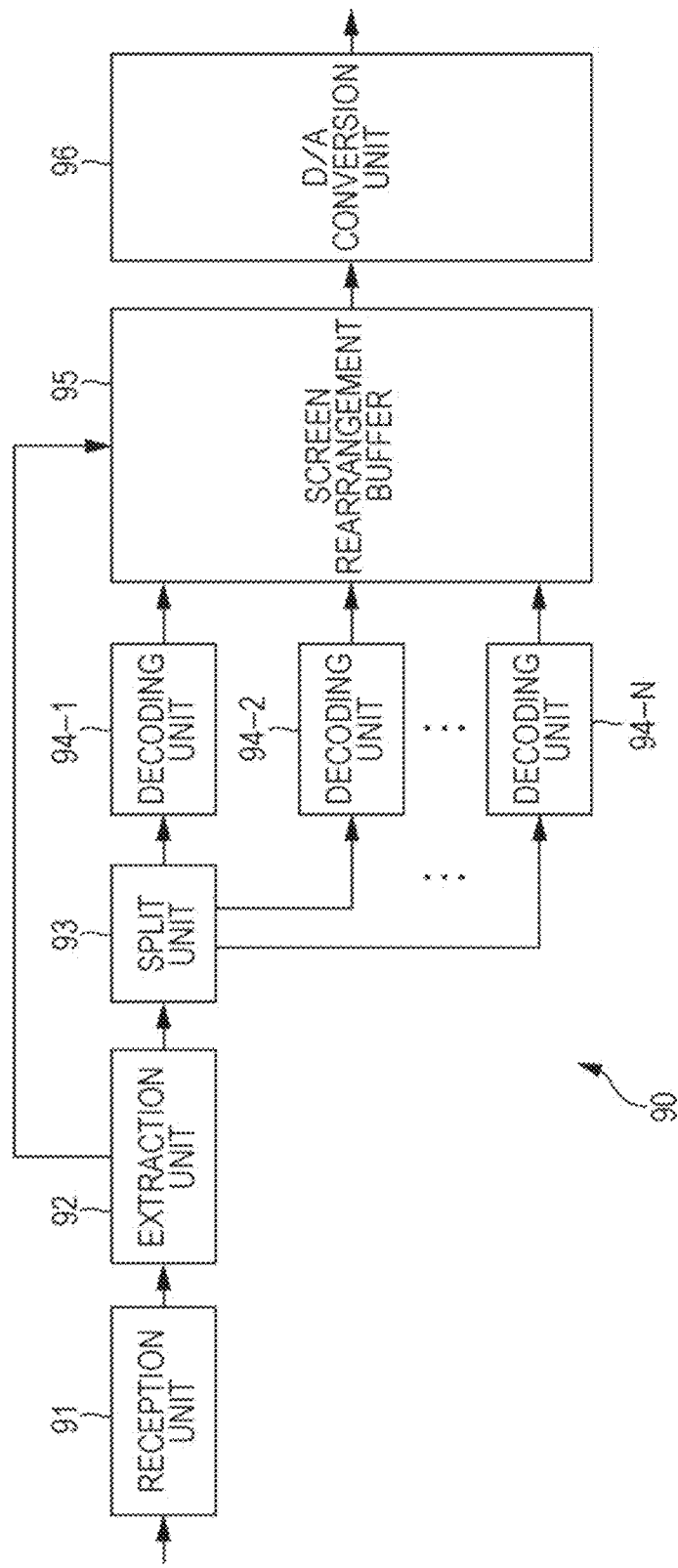
FIG. 15 is a block diagram showing a constitution example of a decoding device to which the present technique is applied according to the first embodiment.

FIG. 15 is a bock diagram showing a constitution example of a decoding device to which the present technique is applied according to the first embodiment. This decoding device decodes an encoded stream transmitted from the encoding device 50 in FIG. 3.

A decoding device 90 in FIG. 15 is constituted by a reception unit 91, an extraction unit 92, a split unit 93, decoding units 94-1 through 94-N, a screen rearrangement buffer 95, and a D/A conversion unit 96.

The reception unit 91 of the decoding device 90 receives an encoded stream transmitted from the encoding device 50, and supplies the encoded stream to the extraction unit 92.

The extraction unit 92 extracts SPS, PPS, VUI, APS, encoded data and the like from the encoded stream, and supplies the extraction to the split unit 93. In addition, the extraction unit 92 supplies tile split information contained in SPS and PPS to the screen rearrangement buffer 95.

The split unit 93 splits the encoded data into units of tiles based on tile splittable information contained in VUI supplied by the extraction unit 92, and the tile split information contained in SPS and PPS. The split unit 93 supplies the encoded data of N tiles obtained as a result of the split to the decoding units 94-1 through 94-N for each tile. In addition, the split unit 93 supplies SPS, PPS, APS and the like supplied by the extraction unit 92 to the decoding unit 94-N.

Each of the decoding units 94-1 through 94-N decodes encoded data of the corresponding tile supplied by the split unit 93 by a system corresponding to HEVC system while referring to SPS, PPS, APS and the like supplied by the split unit 93. In other words, the decoding units 94-1 through 94-N decode the encoded data independently in the time direction for each tile while referring to SPS, PPS, APS and the like. The decoding units 94-1 through 94-N supply the decoded images obtained as a result of the decoding to the screen rearrangement buffer 95. In the following description, the decoding units 94-1 through 94-N are collectively referred to as decoding units 94 when distinction therebetween is not particularly required.

The screen rearrangement buffer 95 synthesizes the decoded images of the respective tiles supplied by the decoding units 94-1 through 94-N by arranging the respective decoded images and storing the respective decoded images for each unit of frames based on the tile split information supplied by the extraction unit 92. The screen rearrangement buffer 95 rearranges the stored images for each unit of frames located in the order of encoding in such positions that the respective images are located in the order of the original display, and supplies the rearranged images to the D/A conversion unit 96.

The D/A conversion unit 96 performs D/A conversion of the images for each unit of frames supplied by the screen rearrangement buffer 95, and supplies the converted image as output signals.

(Constitution Example of Decoding Unit)

Figure 16:
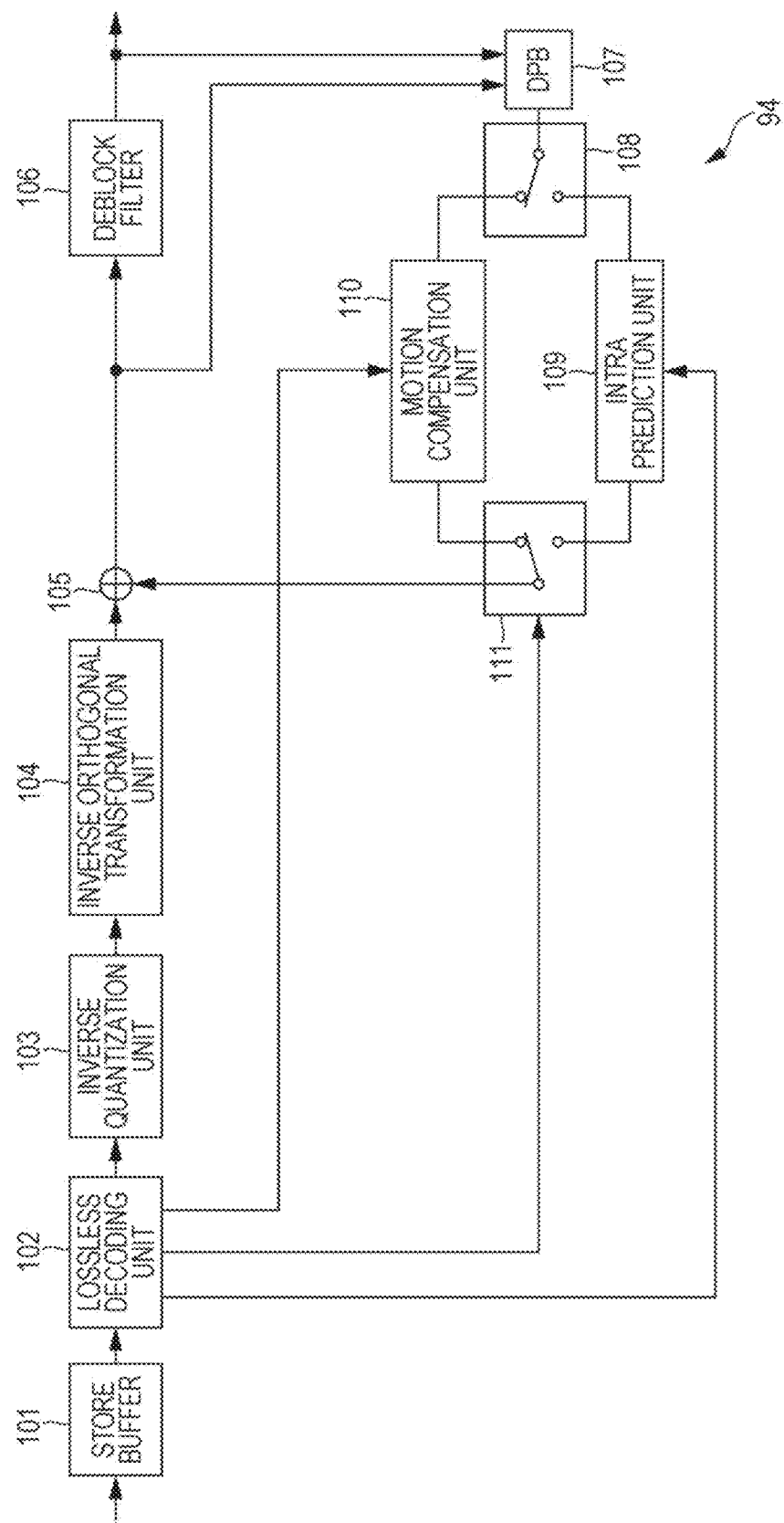
FIG. 16 is a block diagram showing a constitution example of a decoding unit in FIG. 15 according to the first embodiment.

FIG. 16 is a block diagram showing a constitution example of the decoding units 94 in FIG. 15 according to the first embodiment.

The decoding unit 94 in FIG. 16 is constituted by a store buffer 101, a lossless decoding unit 102, an inverse quantization unit 103, an inverse orthogonal transformation unit 104, an addition unit 105, a deblock filter 106, a DPB 107, a switch 108, an intra prediction unit 109, a motion compensation unit 110, and a switch 111.

The store buffer 101 of the decoding unit 94 receives encoded data of the corresponding tile supplied by the split unit 93 in FIG. 15, and stores the received data. The store buffer 101 supplies the stored encoded data to the lossless decoding unit 102.

The lossless decoding unit 102 performs lossless decoding, such as variable codeword length decoding and arithmetic decoding, for the encoded data received from the store buffer 101 to obtain quantized coefficients and encoded information. The lossless decoding unit 102 supplies the quantized coefficients to the inverse quantization unit 103.

In addition, the lossless decoding unit 102 obtains intra prediction mode information of the current prediction block by adding intra prediction mode information after differential encoding as encoded information to intra prediction mode information of a prediction block adjacent to the current prediction block within the same tile. The lossless decoding unit 102 supplies the current intra prediction mode information and the like to the intra prediction unit 109.

Moreover, the lossless decoding unit 102 functions as a motion vector generation unit, and calculates a motion vector of the current prediction block by adding motion vector information as encoded information to a motion vector of another prediction block within the same tile. The lossless decoding unit 102 supplies the obtained motion vector, information for specifying a reference image as encoded information, inter prediction mode information and the like to the motion compensation unit 110. Furthermore, the lossless decoding unit 102 supplies intra prediction mode information or inter prediction mode information to the switch 111.

The inverse quantization unit 103, the inverse orthogonal transformation unit 104, the addition unit 105, the deblock filter 106, the DPB 107, the switch 108, the intra prediction unit 109, and the motion compensation unit 110 perform operations similar to the corresponding operations of the inverse quantization unit 76, the inverse orthogonal transformation unit 77, the addition unit 78, the deblock filter 79, the DPB 80, the switch 81, the intra prediction unit 82, and the motion compensation unit 83 in FIG. 4. The images are decoded by these operations.

More specifically, the inverse quantization unit 103 performs inverse quantization of the quantized coefficients supplied by the lossless decoding unit 102, and supplies the coefficients obtained as a result of the inverse quantization to the inverse orthogonal transformation unit 104.

The inverse orthogonal transformation unit 104 performs inverse orthogonal transformation of the coefficients received from the inverse quantization unit 103, and supplies residual information obtained as a result of the inverse orthogonal transformation to the addition unit 105.

The addition unit 105 functions as a decoding unit, and adds residual information as the decoding target image supplied by the inverse orthogonal transformation unit 104 to the prediction image supplied by the switch 111 for decoding. The addition unit 105 supplies a decoded image obtained as a result of the decoding to the deblock filter 106, and supplies the decoded image to the DPB 107. When the prediction image is not supplied by the switch 111, the addition unit 105 supplies the image corresponding to the residual information supplied by the inverse orthogonal transformation unit 104 to the deblock filter 106 as a decoded image, and supplies the image to the DPB 107 and allows the DPB 107 to store the image.

The deblock filter 106 removes block distortion by performing filtering of the decoded image supplied by the addition unit 105 for each unit of tiles based on deblock filter information contained in SPS and PPS supplied by the split unit 93. The deblock filter 106 supplies a decoded image obtained as a result of the filtering to the DPB 107 and allows the DPB 107 to store the image, and supplies the image to the screen rearrangement buffer 95 in FIG. 15. The decoded image of the corresponding tile stored in the DPB 107 is read via the switch 108 as a reference image, and supplied to the motion compensation unit 110 or the intra prediction unit 109.

The intra prediction unit 109 performs intra prediction in the optimum intra prediction mode indicated by the intra prediction mode information by using a reference image read from the DPB 107 via the switch 108, not filtered by the deblock filter 106, and contained in the same tile as the tile of the decoding target image. The intra prediction unit 109 supplies a prediction image generated as a result of the intra prediction to the switch 111.

The motion compensation unit 110 reads, from the DPB 107 via the switch 108, a reference image contained in a frame different from the frame of the decoding target image, contained in the same tile as the tile of the decoding target image, and filtered by the deblock filter 106 based on information for specifying a reference image supplied by the lossless decoding unit 102. In other words, the motion compensation unit 110 reads a reference image contained in a co-located tile from the DPB 107 based on the information for specifying a reference image.

The motion compensation unit 110 performs inter prediction in the optimum inter prediction mode by performing motion compensation of the reference image in the optimum inter prediction mode indicated by the inter prediction mode information based on the motion vector. The motion compensation unit 110 supplies a prediction image generated as a result of the inter prediction to the switch 111.

The switch 111 supplies the prediction image supplied by the intra prediction unit 109 to the addition unit 105 when the intra prediction mode information is supplied by the lossless decoding unit 102. On the other hand, when the inter prediction mode information is supplied by the lossless decoding unit 102, the switch 111 supplies the prediction image supplied by the motion compensation unit 110 to the addition unit 105.

(Description of Outline of Process Performed by Decoding Device)

Figure 17:
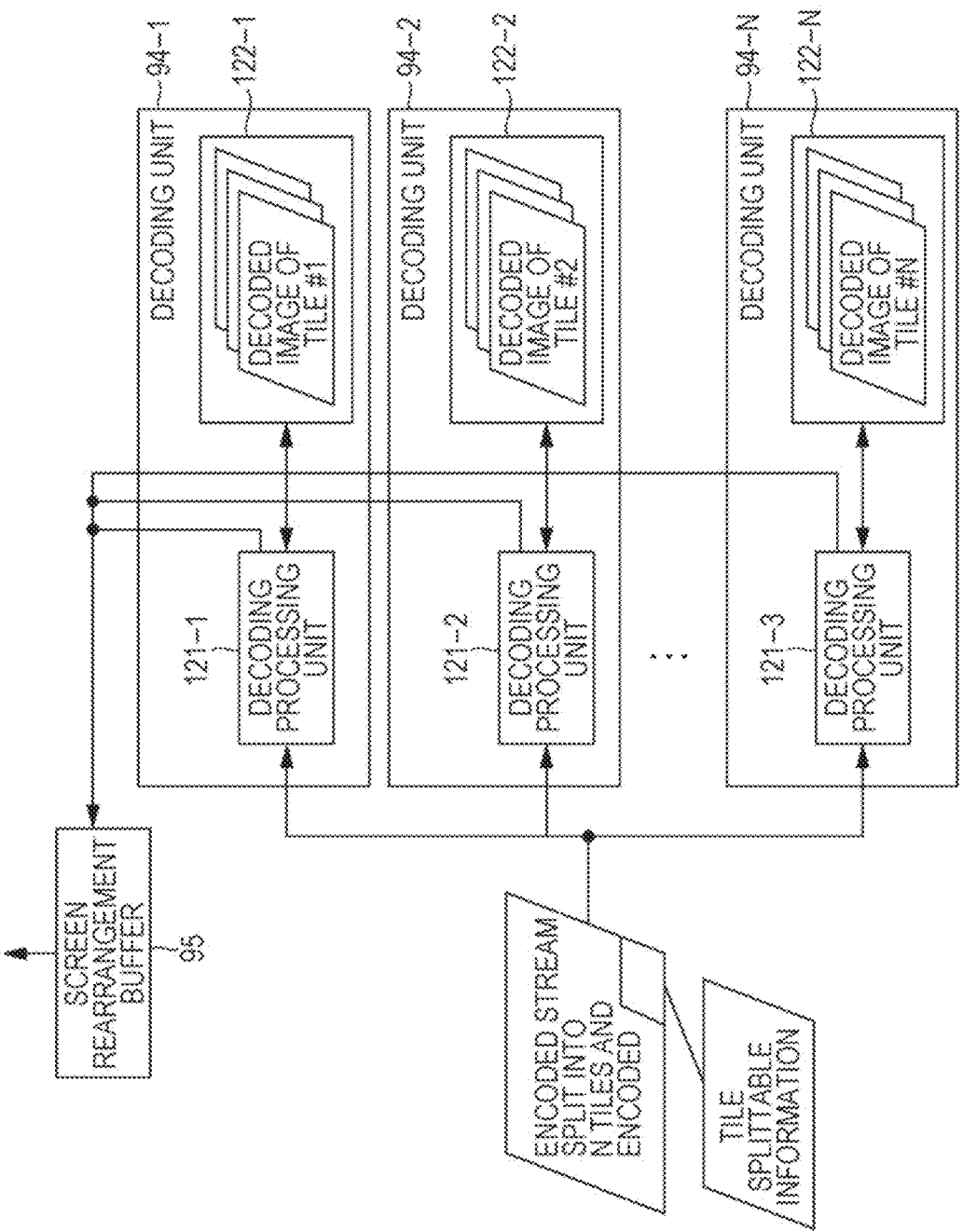
FIG. 17 is a diagram describing the outline of processing performed by the decoding device in FIG. 15.

FIG. 17 is a diagram describing the outline of a process performed by the decoding device 90 in FIG. 15.

As shown in FIG. 17, an encoded stream divided into N tiles and encoded is inputted to the decoding device 90 from the encoding device 50. Further, the tile splittable information is set to true (1) for this encoded stream.

The decoding device 90 receives the encoded stream, extracts SPS, PPS, VUI, APS, encoded data and the like from the encoded stream, and splits the encoded data into units of tiles based on tile split information contained in SPS and PPS. The encoded data for each tile obtained by split is supplied to the corresponding decoding units 94-1 through 94-N for each tile. More specifically, each of the encoded data of tile #1, tile #2, and up to tile #N is supplied to the corresponding decoding unit 94-1, decoding unit 94-2, and up to decoding unit 94-N.

The decoding unit 94-1 is constituted by a decoding processing unit 121-1 and a DPB 122-1. The decoding processing unit 121-1 is constituted by the store buffer 101, the lossless decoding unit 102, the inverse quantization unit 103, the inverse orthogonal transformation unit 104, the addition unit 105, the deblock filter 106, the DPB 107, the switch 108, the intra prediction unit 109, the motion compensation unit 110, and the switch 111 (FIG. 16) of the decoding unit 94-1. The decoding processing unit 121-1 decodes the encoded data of the tile #1.

Moreover, the DPB 122-1 is constituted by the DPB 107 of the decoding unit 94-1, and stores the decoded image of the tile #1 obtained as a result of the decoding by the decoding processing unit 121-1. The decoded image of the tile #1 stored in the DPB 122-1 is used for decoding by the decoding processing unit 121-1.

Each of the decoding units 94-2 through 94-N has a constitution similar to the structure of the decoding unit 94-1. Accordingly, the decoded images of the tile #2 through tile #N are stored in the DPB 122-2 through 122-N, respectively.

In addition, the decoded images of the tile #1 through tile #N obtained by the decoding processing unit 121-1 through 121-N are also supplied to the screen rearrangement buffer 95, synthesized by arrangement based on the tile split information, and stored for each unit of frames.

As discussed above, the encoded data for each tile is decoded independently by using the decoding image of the corresponding tile. Accordingly, the decoding device 90 is not required to include a common decoding DPB retaining decoded images for all tiles.

(Description of Process Performed by Decoding Device)

Figure 18:
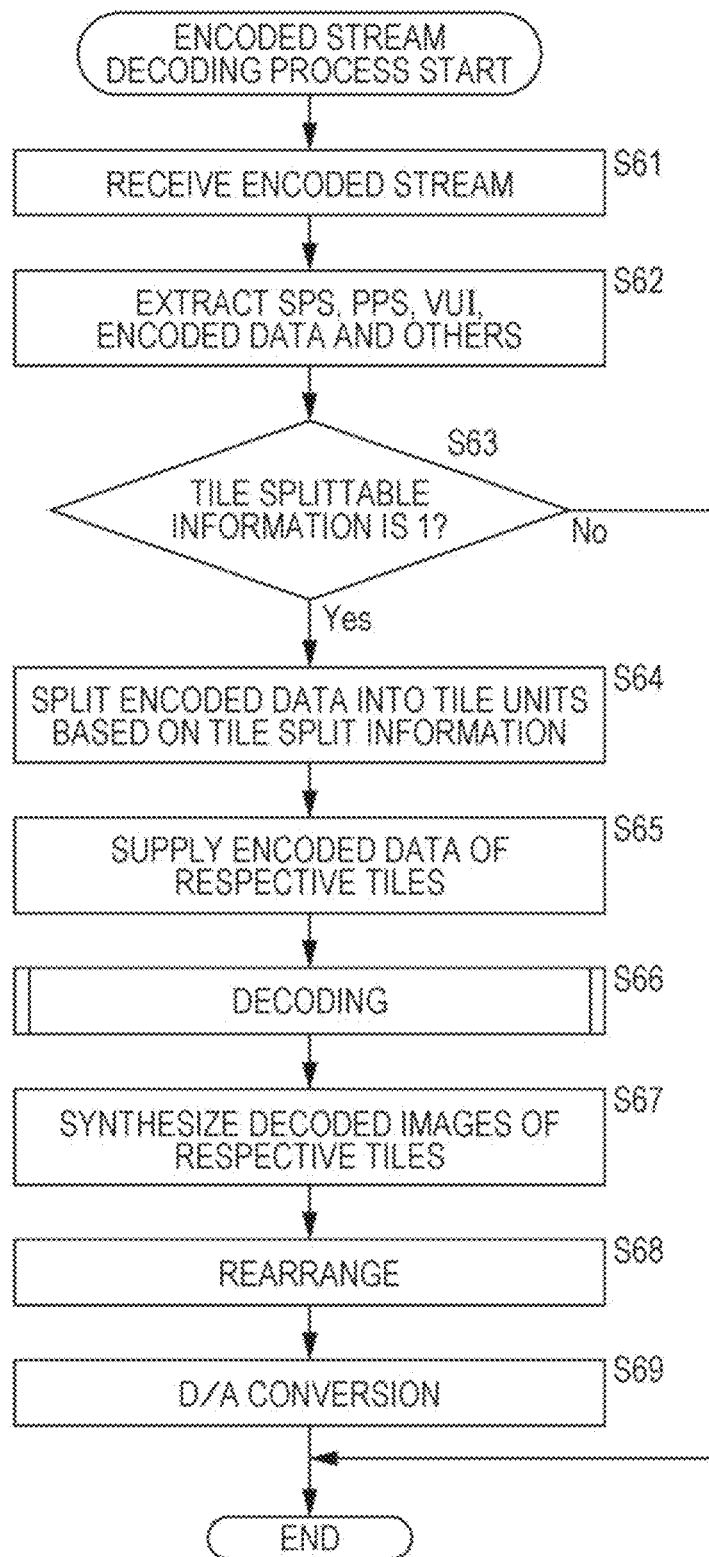
FIG. 18 is a flowchart describing an encoded stream decoding process performed by the decoding device in FIG. 15.

FIG. 18 is a flowchart describing an encoded stream decoding process performed by the decoding device 90 in FIG. 15.

In step S61 in FIG. 18, the reception unit 91 of the decoding device 90 receives an encoded stream transmitted from the encoding device 50, and supplies the encoded stream to the extraction unit 92.

In step S62, the extraction unit 92 extracts SPS, PPS, VUI, APS, encoded data and the like from the encoded stream, and supplies the extraction to the split unit 93. In addition, the extraction unit 92 supplies tile split information contained in SPS and PPS to the screen rearrangement buffer 95.

In step S63, the split unit 93 determines whether tile splittable information contained in VUI supplied by the extraction unit 92 is true (1) or not. When the tile splittable information is not true (1), that is, when the tile splittable information is false (0), the split unit 93 terminates the process.

On the other hand, when it is determined that the tile splittable information is true (1) in step S63, the split unit 93 splits the encoded data into units of tiles based on the tile split information contained in the split unit 93, SPS and PPS in step S64.

In step S65, the split unit 93 supplies the encoded data of the respective split N tiles to the corresponding decoding units 94-1 through 94-N. Moreover, the split unit 93 supplies SPS, PPS and the like supplied by the extraction unit 92 to the decoding unit 94-N.

In step S66, the decoding units 94 perform decoding of the encoded data of the corresponding tiles supplied by the split unit 93 by a system corresponding to HEVC system while referring to SPS, PPS and the like supplied by the split unit 93. The details of this decoding process will be described with reference to FIG. 19 discussed later.

In step S67, the screen rearrangement buffer 95 synthesizes the decoded images of the respective tiles supplied by the decoding units 94-1 through 94-N by arranging the respective decoding images and storing the respective decoding images for each unit of frames based on the tile split information supplied by the extraction unit 92.

In step S68, the screen rearrangement buffer 95 rearranges the stored images for each unit of frames located in the order for encoding in such positions that the respective images are located in the order of the original display, and supplies the rearranged images to the D/A conversion unit 96.

In step S69, the D/A conversion unit 96 performs D/A conversion of the images for each unit of frames supplied by the screen rearrangement buffer 95, and outputs the converted images as output signals.

Figure 19:
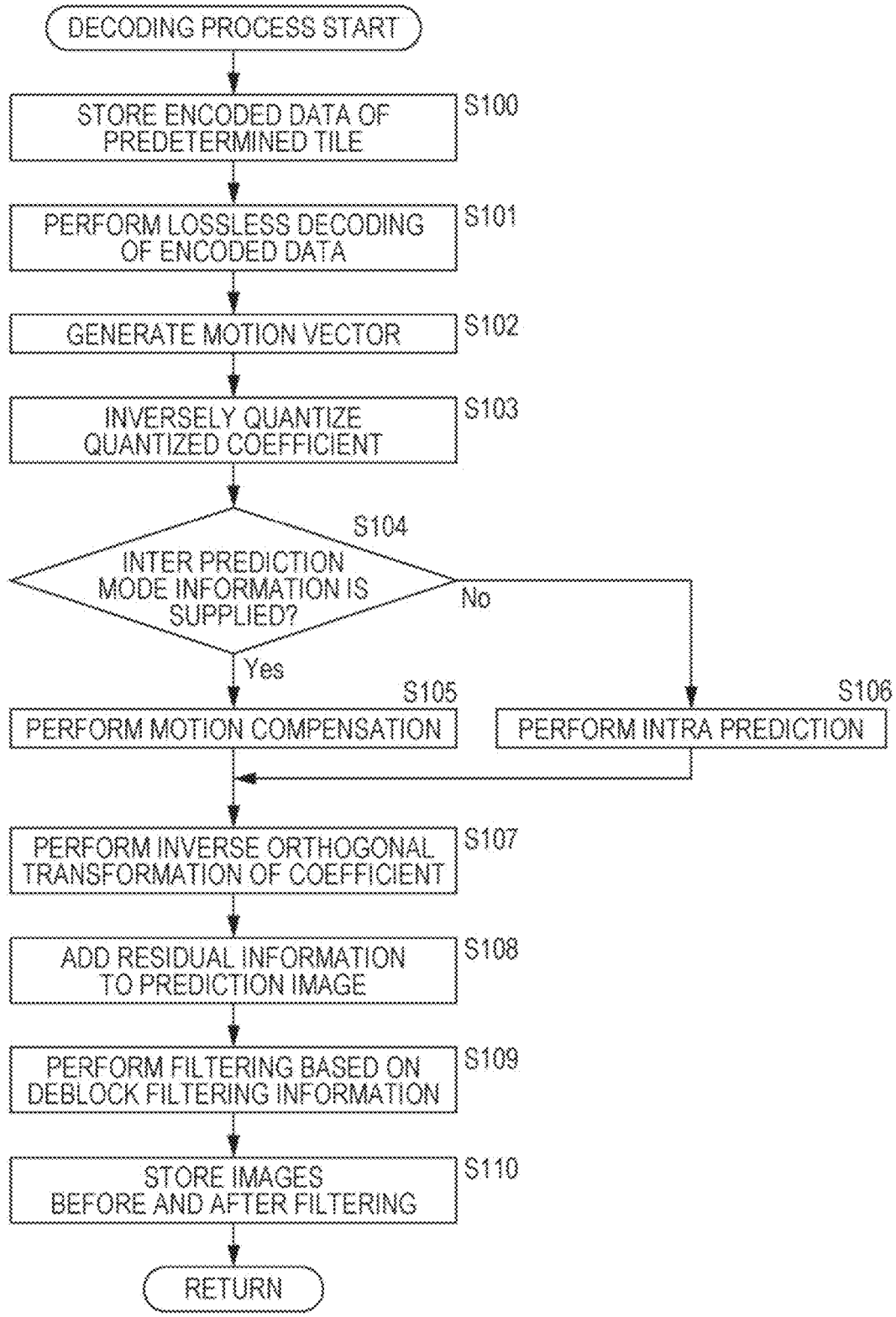
FIG. 19 is a flowchart describing a decoding process in FIG. 16.

FIG. 19 is a flowchart describing the decoding process performed in step S66 in FIG. 18.

In step S100 in FIG. 19, the store buffer 101 of the decoding unit 94 receives encoded data of the corresponding tile from the split unit 93 in FIG. 15, and stores the data. The store buffer 101 supplies the encoded data stored therein to the lossless decoding unit 102. Further, the following processes from S101 to S110 are performed for each unit of CUs, for example.

In step S101, the lossless decoding unit 102 performs lossless decoding of the encoded data received from the store buffer 101, and obtains quantized coefficients and encoded information. The lossless decoding unit 102 supplies the quantized coefficients to the inverse quantization unit 103.

In addition, the lossless decoding unit 102 obtains intra prediction mode information of the current prediction block by adding intra prediction mode information after differential encoding as encoded information to intra prediction mode information of a prediction block adjacent to the current block within the same tile. The lossless decoding unit 102 supplies intra prediction mode information of the current prediction block to the intra prediction unit 109 and the switch 111.

In step S102, the lossless decoding unit 102 generates a motion vector of the current prediction block by adding motion vector information as encoded information to a motion vector of another prediction block within the same tile. The lossless decoding unit 102 supplies the generated motion vector, information for specifying a reference image as encoded information, inter prediction mode information and the like to the motion compensation unit 110. In addition, the lossless decoding unit 102 supplies the inter prediction mode information to the switch 111.

In step S103, the inverse quantization unit 103 performs inverse quantization of the quantized coefficients received from the lossless decoding unit 102, and supplies the coefficients obtained as a result of the inverse quantization to the inverse orthogonal transformation unit 104.

In step S104, the motion compensation unit 110 determines whether the inter prediction mode information is supplied from the lossless decoding unit 102. When it is determined that the inter prediction mode information is supplied in step S104, the process proceeds to step S105.

In step S105, the motion compensation unit 110 performs motion compensation by using a reference image filtered by the deblock filter 106 and contained in the same tile as the tile of the decoding target image based on the motion vector, the inter prediction mode information, and the information for specifying a reference image supplied by the lossless decoding unit 102. The motion compensation unit 110 supplies a prediction image generated as a result of the motion compensation to the addition unit 105 via the switch 111, and allows the process to proceed to step S107.

On the other hand, when it is determined that the inter prediction mode information is not supplied in step S104, that is, when the intra prediction mode information is supplied to the intra prediction unit 109, the process proceeds to step S106.

In step S106, the intra prediction unit 109 performs intra prediction process which performs intra prediction of the intra prediction mode information by using a reference image read from the DPB 107 via the switch 108, not filtered by the deblock filter 106, and located within the same tile as the tile of the decoding target image. The intra prediction unit 109 supplies a prediction image generated as a result of the intra prediction to the addition unit 105 via the switch 111, and allows the process to proceed to step S107.

In step S107, the inverse orthogonal transformation unit 104 performs inverse orthogonal transformation of the coefficients received from the inverse quantization unit 103, and supplies residual information obtained as a result of the inverse orthogonal transformation to the addition unit 105.

In step S108, the addition unit 105 performs decoding by adding the residual information supplied by the inverse orthogonal transformation unit 104 as a decoding target image to the prediction image supplied by the switch 111. The addition unit 105 supplies a decoded image obtained as a result of the decoding to the deblock filter 106, and also supplies the decoded image to the DPB 107.

In step S109, the deblock filter 106 performs filtering of the decoded image supplied by the addition unit 105 for each unit of tiles based on deblock filter information contained in SPS and PPS supplied by the split unit 93. The deblock filter 106 supplies a decoded image after filtering to the DPB 107 and the screen rearrangement buffer 95 (FIG. 15).

In step S110, the DPB 107 stores the decoded image before filtering supplied by the addition unit 105, and the decoded image after filtering supplied by the deblock filter 106. The decoded image stored in the DPB 107 is supplied to the motion compensation unit 110 or to the intra prediction unit 109 via the switch 108. Then, the process returns to step S66 in FIG. 18, and proceeds to step S67.

As discussed above, the decoding device 90 performs motion compensation for each tile by using a reference image positioned at a time different from the time of the decoding target image and contained within the same tile as the tile of the decoding target image based on the tile splittable information and the motion vector information. Accordingly, independent decoding in the time direction for each tile is allowed. As a result, the decoding device 90 can reproduce only a predetermined tile of the N tiles at a high speed, for example.

Further, while the decoding device 90 is provided with the N decoding units 94 for decoding images of the respective tiles, the decoding device 90 may be provided with the one decoding unit 94. In this case, the decoding unit includes a DPB storing decoded images for each tile, and performs decoding of images for each tile in the order of tile ID number in the direction from smaller number to larger number, that is, in the order of raster scan.

Second Embodiment (Example of Encoding Target Image)

Figure 20:
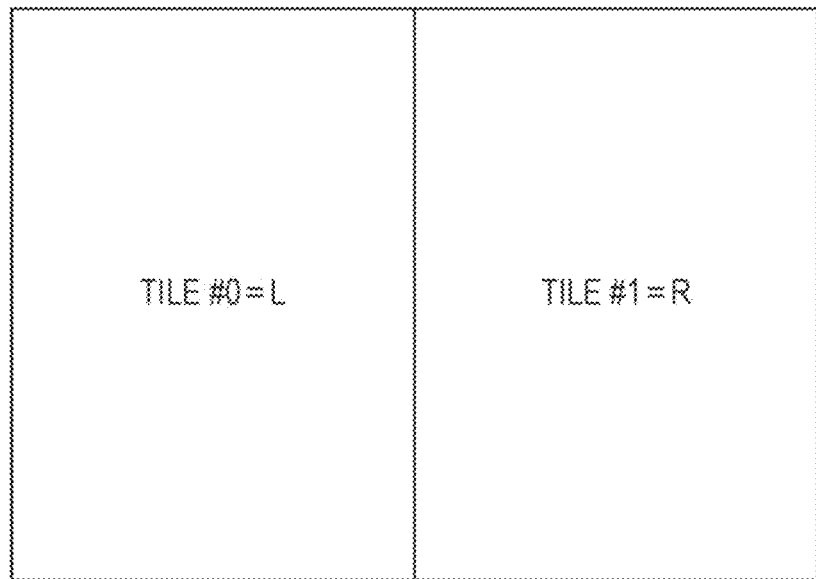
FIG. 20 is a diagram showing an example of an encoding target image of an encoding device to which the present technique is applied according to a second embodiment.

FIG. 20 is a diagram showing an example of an encoding target image of an encoding device to which the present technique is applied according to a second embodiment.

As shown in FIG. 20, the encoding target image is an image formed as a 3D image for 3D display, containing a left-eye image (hereinafter referred to as L image) disposed on the left half of the screen, and a right-eye image (hereinafter referred to as R image) disposed on the right half of the screen.

In addition, as shown in FIG. 20, the encoding target image is tile-split into different tiles for the L image and for the R image. As a result, the tile for L image becomes a tile #0, and the tile for the R image becomes a tile #1.

Further, the L image and the R image of the 3D image may be disposed on the upper half and the lower half of the screen, respectively.

(Constitution Example of Encoding Device in Second Embodiment)

The encoding device to which the present technique is applied according to the second embodiment is the encoding device 50 which sets N to 2. This encoding device independently encodes the L image and the R image, and transmits an encoded stream obtained as a result of the encoding.

(Constitution Example of Decoding Device for 2D Image in an Embodiment)

Figure 21:
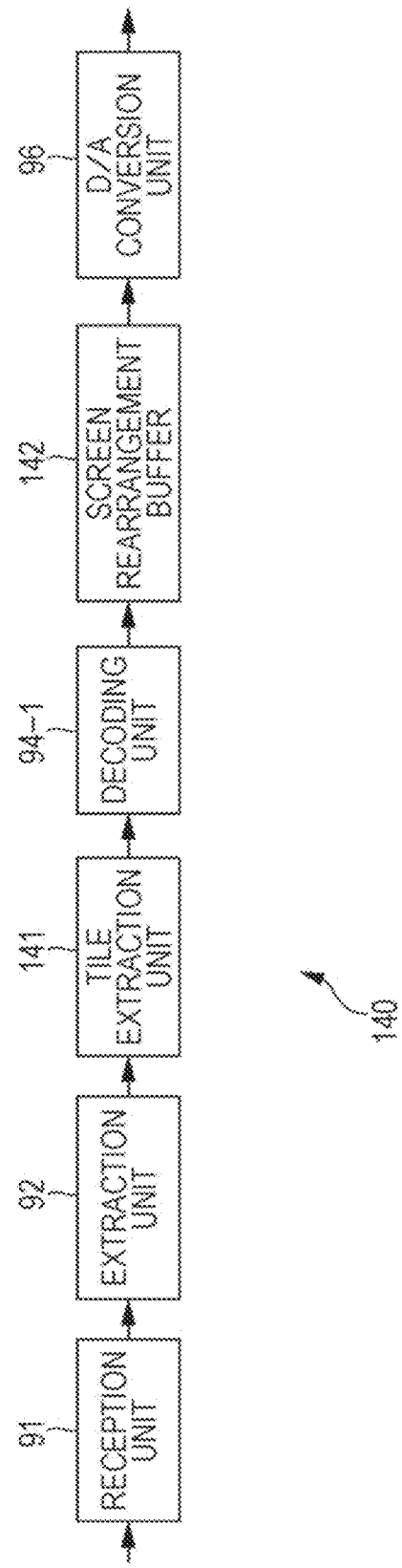
FIG. 21 is a block diagram showing a constitution example of a decoding device for 2D image according to an embodiment.

FIG. 21 is a block diagram showing a constitution example of a decoding device for a 2D image according to an embodiment. This device decodes an encoded stream of a 3D image encoded by the encoding device according to the second embodiment.

In the constitution shown in FIG. 21, constitutions similar to the constitutions in FIG. 15 are given similar reference numbers. The same explanation is omitted when appropriate.

The constitution of a decoding device 140 in FIG. 21 is different from the constitution in FIG. 15 in that a tile extraction unit 141 is provided instead of the split unit 93, and that a screen rearrangement buffer 142 is provided instead of the screen rearrangement buffer 95.

The tile extraction unit 141 splits encoded data into units of tiles based on tile splittable information contained in VUI supplied by the extraction unit 92, and tile split information contained in SPS and PPS. The tile extraction unit 141 supplies encoded data of the tile #1 included in encoded data of two tiles to the decoding unit 94-1. It is assumed herein that 2D display is performed by using the L image. However, the R image may be used for performing 2D display. In this case, not the encoded data of the tile #1, but the encoded data of the tile #2 is supplied to the decoding unit 94-1.

The screen rearrangement buffer 142 stores the decoded image of the tile #1 supplied by the decoding unit 94-1 for each unit of frames. The screen rearrangement buffer 142 rearranges the stored images for each unit of frames located in the order for encoding in such positions that the images are located in the order of the original display, and supplies the rearranged images to the D/A conversion unit 96.

(Description of Process Performed by Decoding Device for 2D Image)

Figure 22:
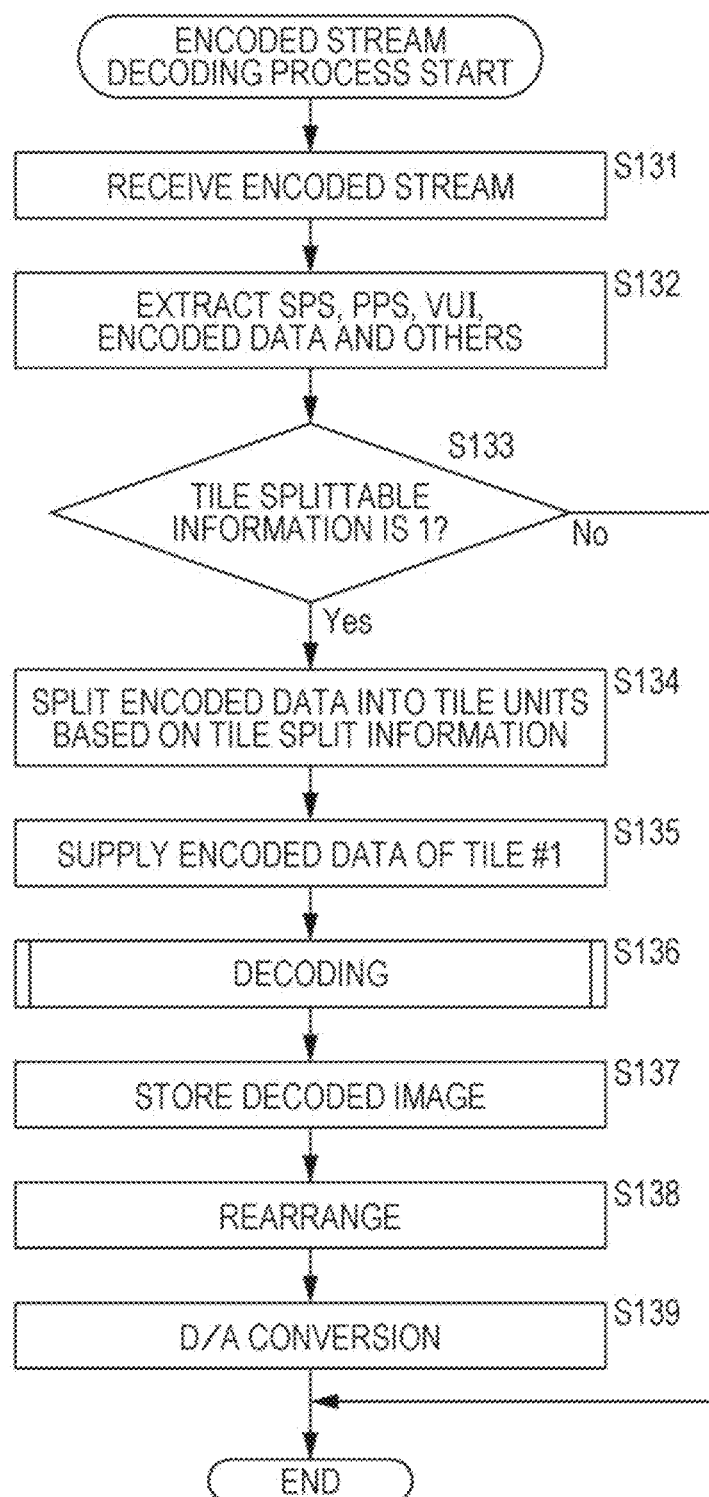
FIG. 22 is a flowchart describing an encoded stream decoding process performed by the decoding device in FIG. 21.

FIG. 22 is a flowchart describing an encoded stream decoding process performed by the decoding device 140 in FIG. 21.

The processing performed from steps S131 through S134 in FIG. 22 is similar to the corresponding processing from step S61 through S64 in FIG. 18; therefore, the explanation of these steps is omitted.

In step S135, the tile extraction unit 141 supplies the encoded data of the tile #1 included in the encoded data of the split two tiles to the decoding unit 94-1. In step S136, the decoding unit 94-1 performs decoding in FIG. 19.

In step S137, the decoded image of the tile #1 supplied by the decoding unit 94-1 is stored for each unit of frames.

The processing in steps S138 and S139 is similar to the processing in step S68 and S69 in FIG. 18; therefore, the explanation of these steps is omitted.

As discussed above, when the encoded stream is an encoded stream tile-split to provide different L image and R image and encoded, independent encoding of the L image and the R image is allowed. Accordingly, the decoding device 140 can decode only the encoded data of the L image of the tile #1 included in the decoding target encoded data. As a result, high-speed reproduction of a 2D image is realized. In addition, the decoding device 140 allows reduction of the capacity of the DPB, and reduction of power consumption at the time of decoding.

Similarly, when the encoded stream is an encoded stream tile-split into a central area within the screen and into the other area, high-speed reproduction of only the central area to which attention is given is allowed.

(Constitution Example of Decoding Device for 3D Image)

A decoding device for 3D image shown in FIG. 20 for decoding a 3D image encoded stream is a decoding device which sets N to 2 in FIG. 15. This 3D image decoding device obtains a 3D image by independently decoding encoded data for an L image and for an R image, and synthesizing the decoded data. Further, the decoding device for 3D image may be constituted to output the L image and the R image obtained as a result of the decoding without synthesizing these images.

In addition, while each of the L image and the R image is split into one tile according to the second embodiment, each of these images may be split into a plurality of tiles. In other words, tiles may be split in any ways as long as the tiles are so split as not to contain both the L image and R image.

Third Embodiment (Constitution Example of Television Conference System)

Figure 23:
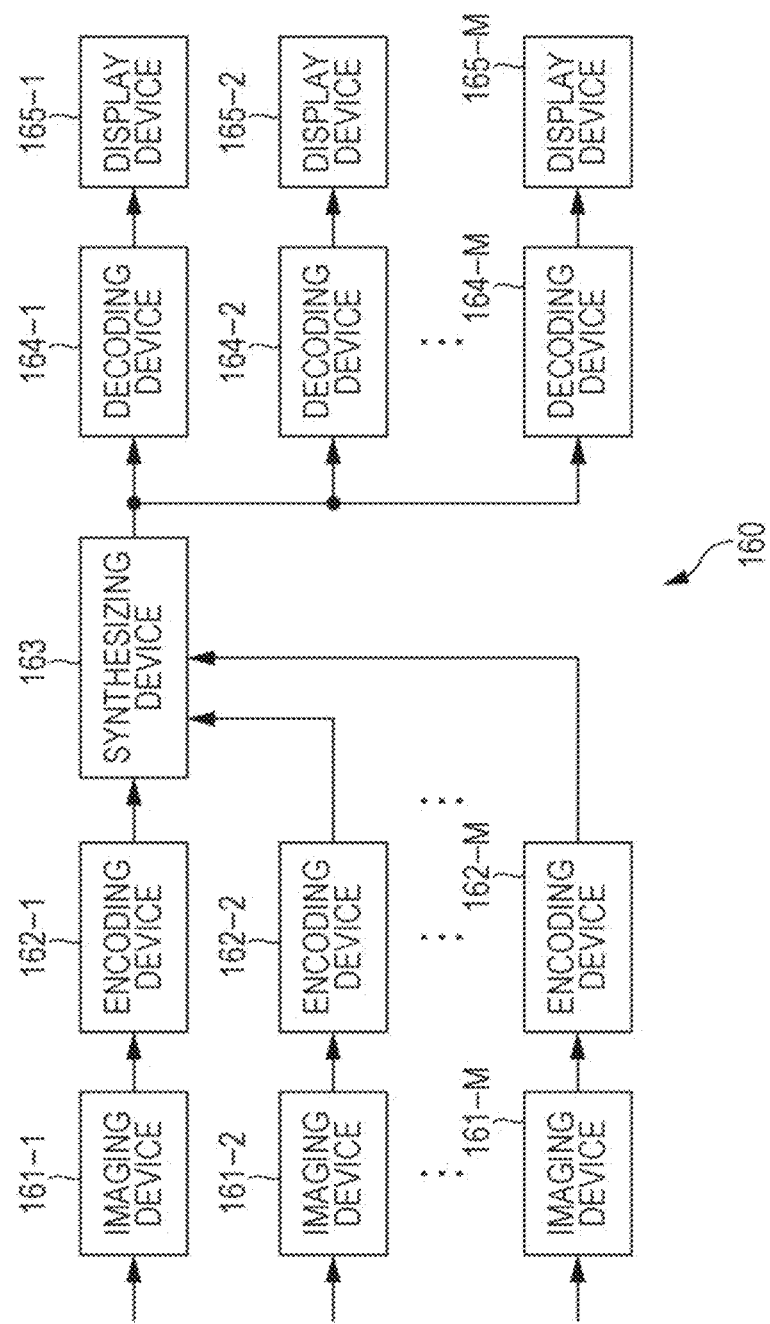
FIG. 23 is a block diagram showing a constitution example of a television conference system to which the present technique is applied according to an embodiment.

FIG. 23 is a block diagram showing a constitution example of a television conference system to which the present technique is applied according to an embodiment.

A television conference system 160 in FIG. 23 is constituted by imaging devices 161-1 through 161-M, encoding devices 162-1 through 162-M, a synthesizing device 163, decoding devices 164-1 through 164-M, and display devices 165-1 through 165-M. The television conference system 160 captures images of M participants of a conference positioned at different locations, encodes and synthesizes the images, and decodes and displays the images.

More specifically, the imaging devices 161-1 through 161-M of the television conference system 160 are positioned at the respective locations of the M participants of the conference. The imaging devices 161-1 through 161-M capture images of the corresponding participants of the conference, and supply the images to the encoding devices 162-1 through 162-M.

Each of the encoding devices 162-1 through 162-M has a constitution similar to the structure of the encoding device 50 in FIG. 3. The encoding devices 162-1 through 162-M compression-encode the images supplied by the imaging devices 161 independently for each tile by a system corresponding to HEVC system. Each of the encoding devices 162-1 through 162-M supplies an encoded stream obtained as a result of the compression encoding to the synthesizing device 163.

The synthesizing device 163 receives the encoded streams transmitted from the encoding devices 162-1 through 162-M. The synthesizing device 163 synthesizes each of encoded data contained in the synthesized streams as encoded data of different tiles. The synthesizing device 163 generates tile split information indicating the positions of the encoded data of the respective tiles and showing M as the number of splits from the encoded data obtained as a result of the synthesis. The synthesizing device 163 sets SPS containing tile split information and deblock filter information set to false (0). Moreover, the synthesizing device 163 sets VUI containing motion restriction information set to false (0), PPS containing deblock filter information set to false (0), and APS. The synthesizing device 163 generates a synthesized stream by adding SPS, PPS, VUI, APS and the like to the encoded data obtained as a result of the synthesis. The synthesizing device 163 transmits the synthesized stream to the decoding device 164-1 through 164-M.

Each of the decoding devices 164-1 through 164-M has a constitution similar to the structure of the decoding device 90 in FIG. 15. Each of the decoding devices 164-1 through 164-M receives the synthesized stream transmitted from the synthesizing device 163. Each of the decoding devices 164-1 through 164-M independently decodes the synthesized stream for each tile, and supplies the decoded image obtained as a result of the decoding to the corresponding one of the display devices 165-1 through 165-M.

The respective display devices 165-1 through 165-M are disposed at the corresponding locations of the M participants of the conference. The display devices 165-1 through 165-M display the decoded images supplied by the decoding devices 164-1 through 164-M.

Further, according to the television conference system 160, the display devices 165-1 through 165-M are disposed at the corresponding locations of the M participants of the conference. However, the display devices may be disposed at locations of a part of the M participants of the conference. In addition, the decoded images may be displayed on the display devices of the persons not participating in the conference.

As discussed above, according to the television conference system 160, the encoding device 162-1 through 162-M perform encoding independently for each tile. Accordingly, the motion vector in inter prediction always becomes a vector designating an image within a tile containing a prediction block as a reference image.

In this case, even when encoded data contained in encoded bit-streams supplied by the encoding devices 162-1 through 162-M is synthesized by the synthesizing device 163 as it is as a part of encoded data of one screen, a decoded image corresponding to the encoded data of a different encoding device after synthesis of the encoded data is not referred to at the time of decoding. In this case, normal decoding of the encoded data after synthesis allowed. Accordingly, the synthesizing device 163 can easily synthesize encoded bit-streams supplied by the encoding devices 162-1 through 162-M without changing layers of Video Coding Layer (VCL) and lower layers.

This point is particularly advantageous for a television conference system where the number of encoded bit-streams to be synthesized is dynamically changeable by addition of a new participant of the conference, or removal of a participant of the conference in the middle of the conference.

In addition, a decoded image of different encoded data is not referred to for each of the M encoded data contained in the synthesized stream. Accordingly, the synthesized stream can be again split into encoded streams containing the respective encoded data. As a result, processing associated with the synthesized stream is easily performed.

Further, according to the foregoing description, encoding and decoding are performed independently for each tile. However, encoding and decoding may be performed independently for each slice.

Further, according to the foregoing description, the tile splittable information is collectively set for all the tiles constituting a picture. However, the tile splittable information may be individually set for each tile.

<Another Example of VUI>

FIG. 24 is a diagram showing another example of syntax of VUI when the tile splittable information is set for each tile.

When the tile splittable information is set for each tile, tile splittable information (tile_splittable_flag) of respective tiles arranged in the line direction (horizontal direction) is set for each line in VUI as shown in lines 5 through 7 in FIG. 24.

In this case, encoding and decoding can be performed only for a predetermined tile for each unit of tiles contained in the tiles constituting a picture. For example, assuming that the number of tiles is 4, with the tile splittable information of the tile #1 set to true (1) and with the tile splittable information of the tiles #2 through #4 set to false (0), independent decoding of only the tile #1 is allowed.

Further, when bitstream_restriction_flag for line 1 is 0, the decoding side recognizes that all the tiles are not decodable for each tile based on the determination that the tile splittable information for all the tiles is set to false (0).

Fourth Embodiment (Applicability to Multi-View Image Encoding and Multi-View Image Decoding)

Figure 25:
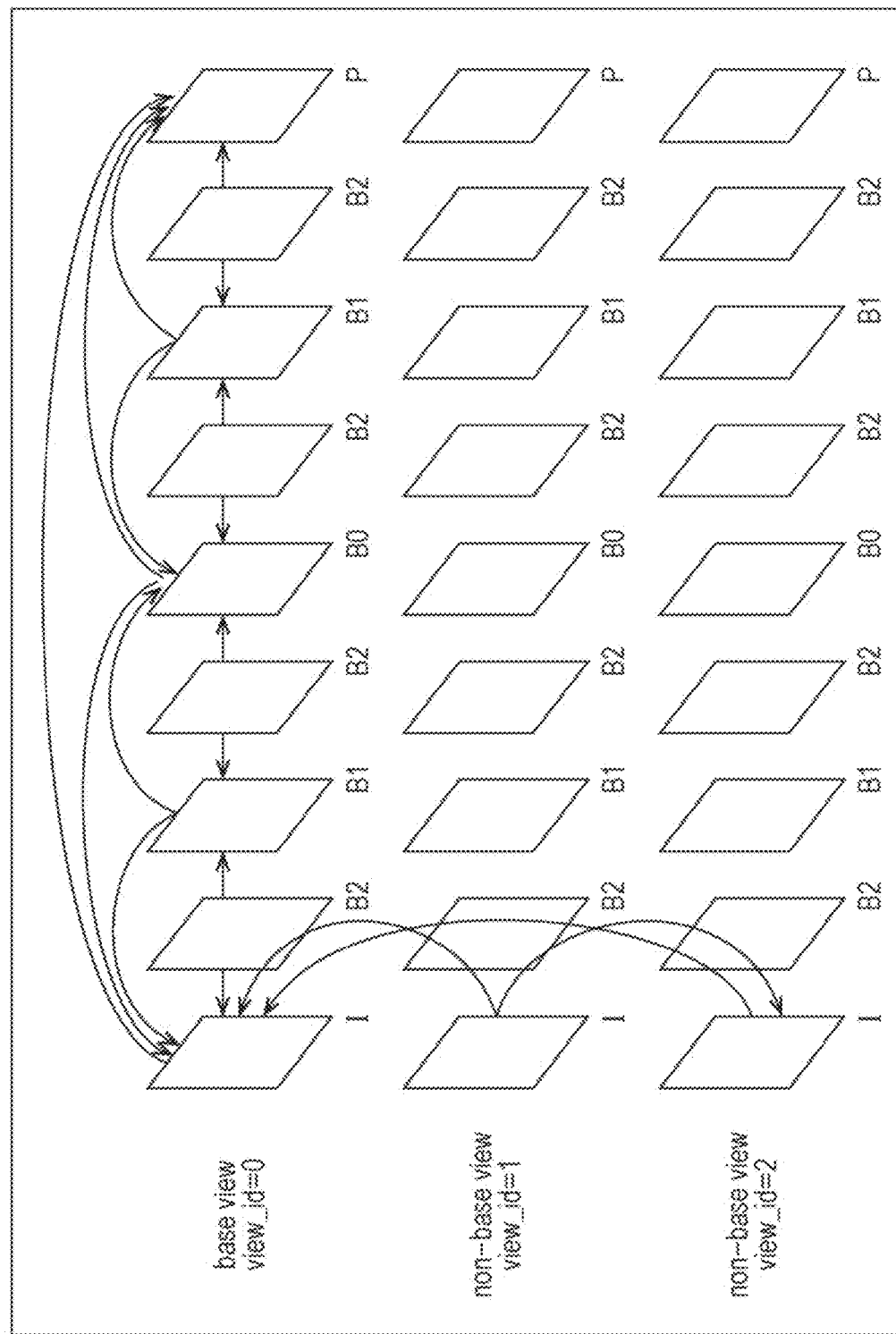
FIG. 25 is a diagram showing an example of a multi-view image encoding system.

A series of processes described above are applicable to multi-view image encoding and multi-view image decoding. FIG. 25 shows an example of multi-view image encoding system.

As shown in FIG. 25, a multi-view image contains images of a plurality of views (views). The plural views of the multi-view image are constituted by base views for encoding and decoding using only images of their own views without using images of other views, and non-base views for encoding and decoding using images of other views. The non-base views may use images of base views, or may use images of other non-base views.

For encoding and decoding a multi-view image as shown in FIG. 25, images of the respective views are encoded or decoded. In this case, the methods in the first through third embodiments described above may be applied to encoding and decoding of the respective views. When these methods are applied, independent encoding and decoding in the time direction for each tile is allowed.

Moreover, the flags and parameters used in the methods according to the first through third embodiments described above may be shared in encoding and decoding the respective views. More specifically, syntax elements or the like of SPS, PPS, VUI, and APS may be shared in encoding and decoding of the respective views, for example. Needless to say, necessary information other than these may be shared in encoding and decoding of the respective views.

When these are shared, suppression of redundant information transmission, and reduction of the amount of information (amount of codes) to be transmitted are achieved (that is, lowering of encoding efficiency is suppressed).

(Multi-View Image Encoding Device)

Figure 26:
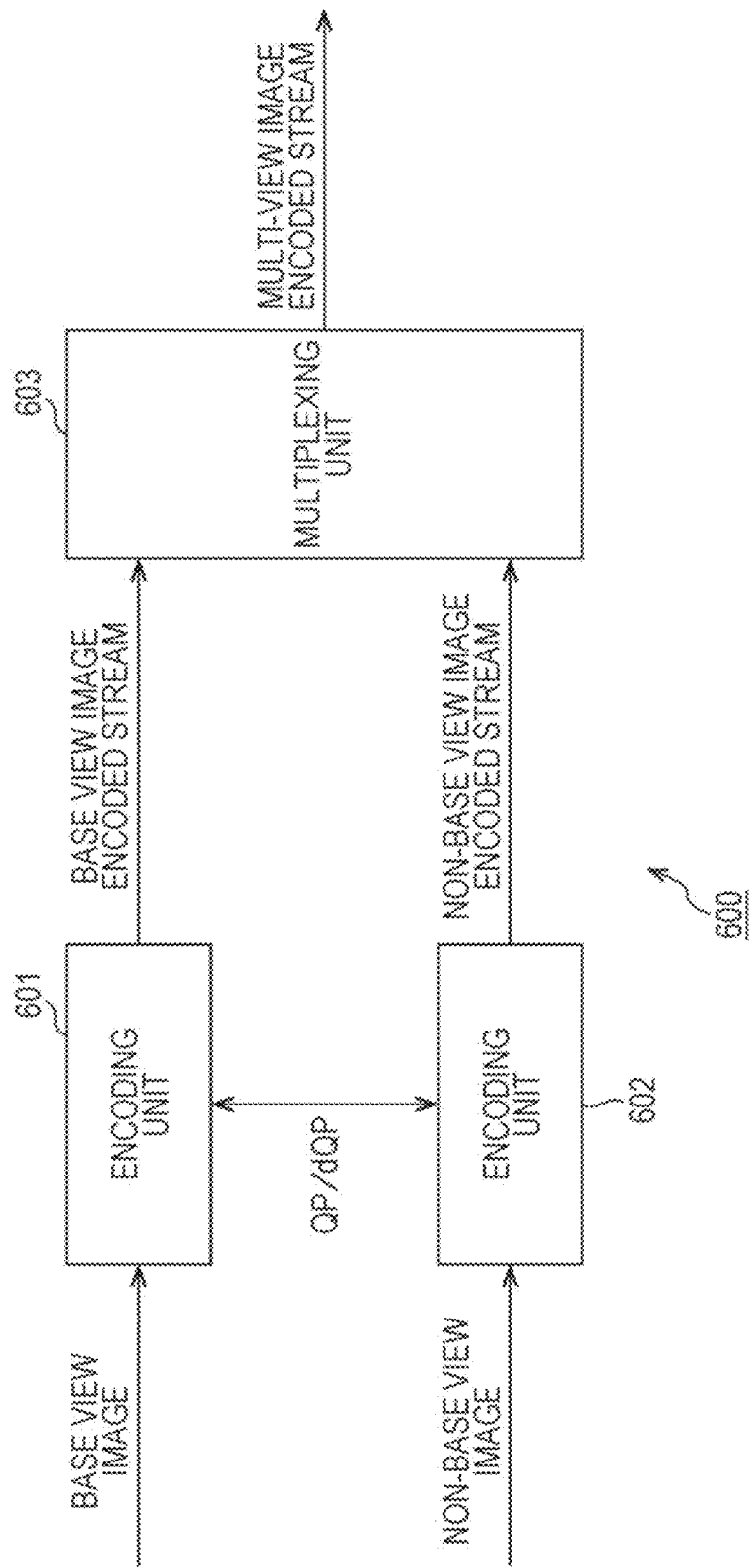
FIG. 26 is a diagram showing a constitution example of a multi-view image encoding device to which the present technique is applied.

FIG. 26 is a diagram showing a multi-view image encoding device which performs the foregoing multi-view image encoding. As shown in FIG. 26, a multi-view image encoding device 600 includes an encoding unit 601, an encoding unit 602, and a multiplexing unit 603.

The encoding unit 601 encodes base view images, and generates a base view image encoded stream. The encoding unit 602 encodes non-base view images, and generates a non-base view image encoded stream. The multiplexing unit 603 multiplexes the base view image encoded stream generated by the encoding unit 601 and the non-base view image encoded stream generated by the encoding unit 602, and generates a multi-view image encoded stream.

The encoding device 50 (FIG. 3), and the encoding devices 162-1 through 162-M (FIG. 23) are applicable to the encoding unit 601 and the encoding unit 602 of this multi-view image encoding device 600. In other words, in encoding the respective views, independent encoding in the time direction for each tile is allowed. Moreover, the encoding unit 601 and the encoding unit 602 can perform encoding using the same flags and parameters (e.g., syntax elements associated with processing between images) (that is, flags and parameters can be shared between the encoding units 601 and 602). Accordingly, lowering of the encoding efficiency can be suppressed.

(Multi-View Image Decoding Device)

Figure 27:
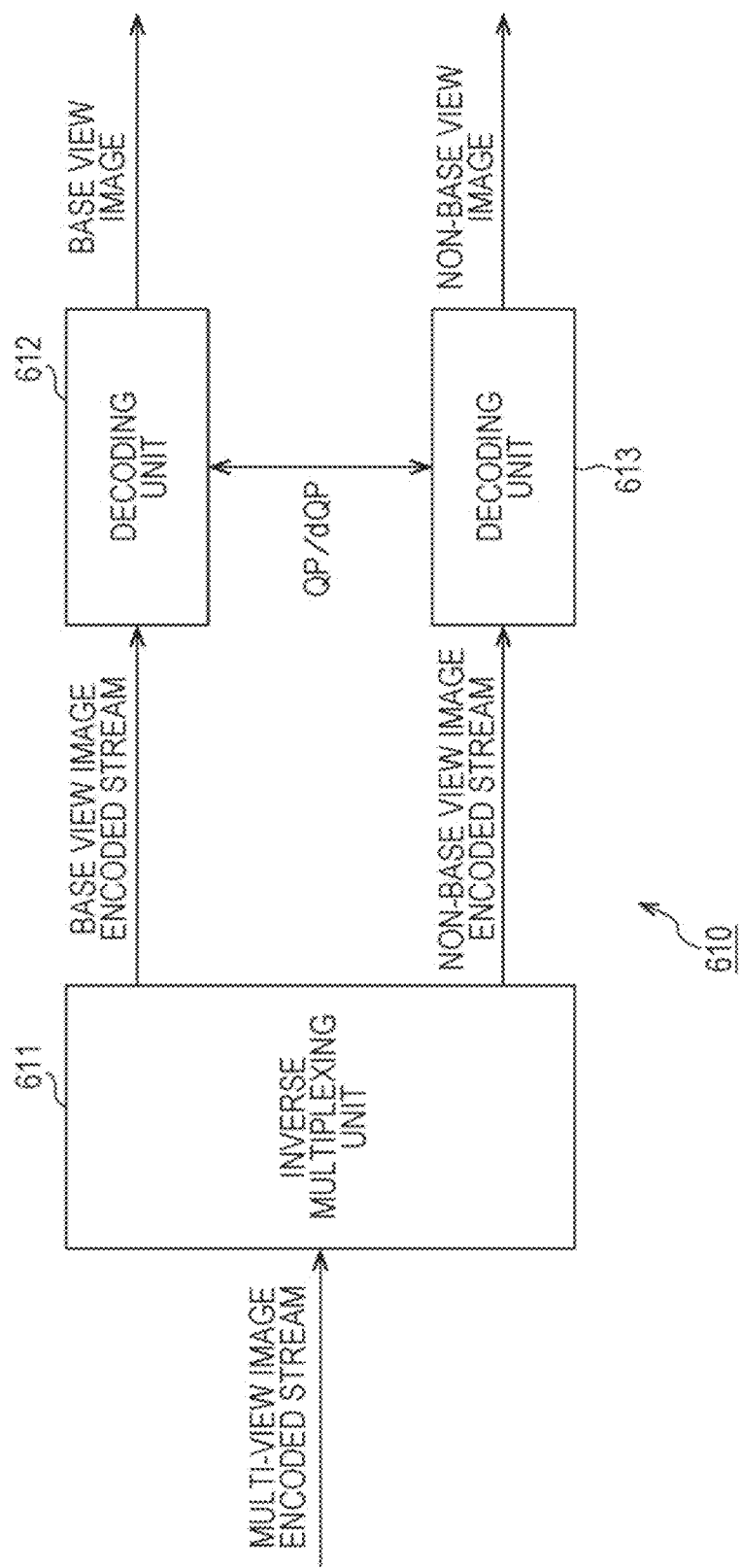
FIG. 27 is a diagram showing a constitution example of the multi-view image encoding device to which the present technique is applied.

FIG. 27 is a diagram showing a multi-view decoding device performing the foregoing multi-view image decoding. As shown in FIG. 27, a multi-view image decoding device 610 has an inverse multiplexing unit 611, a decoding unit 612, and a decoding unit 613.

The inverse multiplexing unit 611 performs inverse multiplexing of the multi-view image encoded stream generated by multiplexing of the base view image encoded stream and the non-base view image encoded stream, and extracts the base view image encoded stream and the non-base view image encoded stream. The decoding unit 612 decodes the base view image encoded stream extracted by the inverse multiplexing unit 611, and obtains base view images. The decoding unit 613 decodes the non-base view image encoded stream extracted by the inverse multiplexing unit 611, and obtains non-base view images.

The decoding device 90 (FIG. 15), and the decoding device 140 (FIG. 21) or the decoding devices 164-1 through 164-M (FIG. 23) are applicable to the decoding unit 612 and the decoding unit 613 of this multi-view image decoding device 610. In other words, in decoding the respective views, independent decoding in the time direction for each tile is allowed. Moreover, the decoding unit 612 and the decoding unit 613 can perform decoding using the same flags and parameters (e.g., syntax elements associated with processing between images) (that is, flags and parameters can be shared between the decoding units 612 and 613). Accordingly, lowering of the encoding efficiency can be suppressed.

Fifth Embodiment (Applicability to Hierarchical Image Encoding and Hierarchical Image Decoding)

Figure 28:
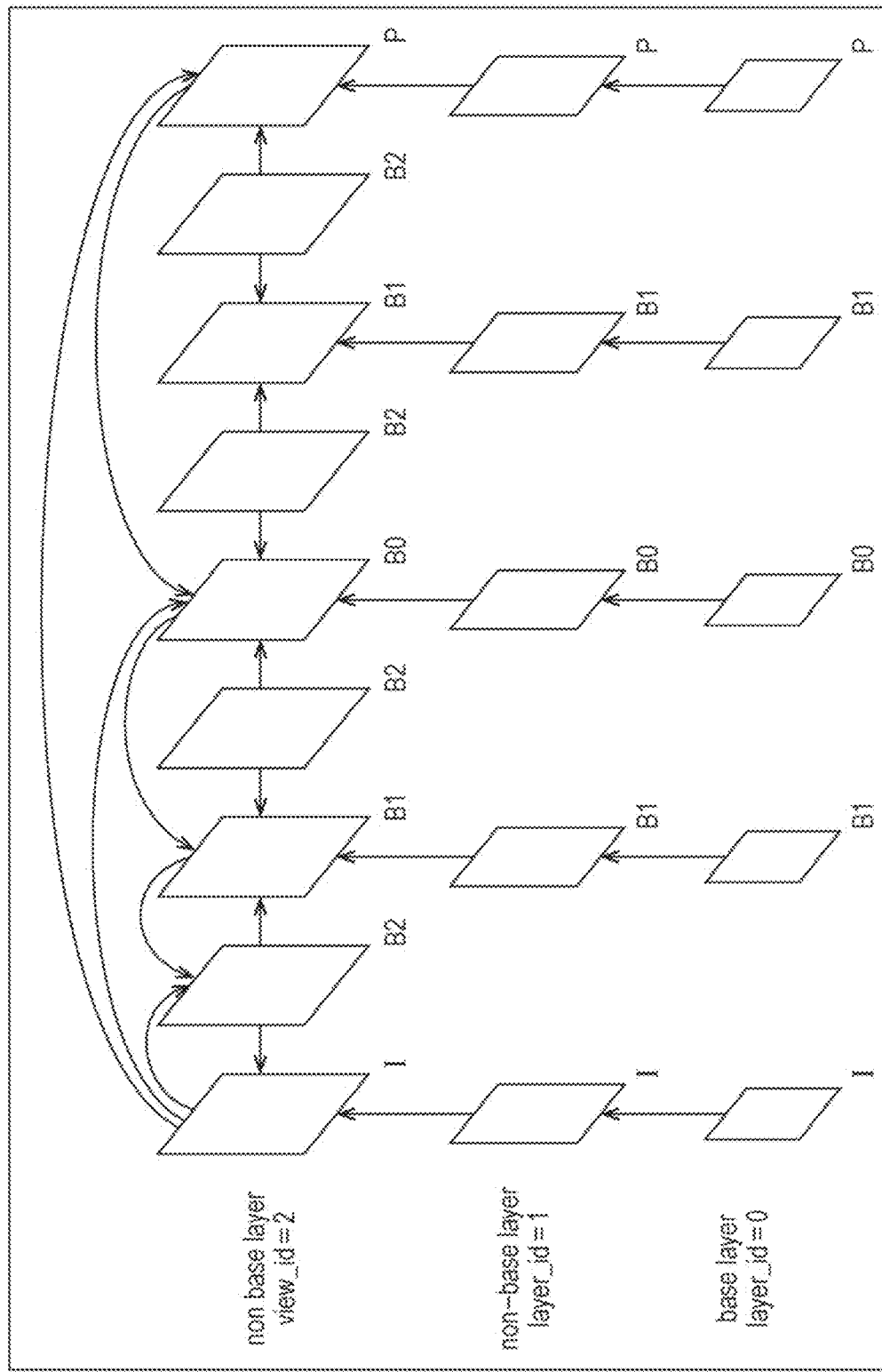
FIG. 28 is a diagram showing an example of a hierarchical image encoding system.

A series of processes described above are applicable to hierarchical image encoding and hierarchical image decoding (scalable encoding and scalable decoding). FIG. 28 shows an example of hierarchical image encoding system.

Hierarchical image encoding (scalable encoding) divides image data into a plurality of layers (hierarchies) such that a predetermined parameter has a scalability function, and encodes each layer. Hierarchical image decoding (scalable decoding) is decoding in correspondence with this hierarchical image encoding.

As shown in FIG. 28, in layering images, one image is divided into a plurality of images (layers) on the basis of a predetermined parameter having a scalability function. In other words, the hierarchized image (hierarchical image) contains a plurality of hierarchies (layers) of images each having a parameter value different from one another in view of the predetermined parameter. These plural layers of the hierarchical image are constituted by base layers for encoding and decoding using only images of their own layers without using images of other layers, and non-base layers (also called enhancement layers) for encoding and decoding using images of other layers. The non-base layers may use images of base layers, or may use images of other non-base layers.

In general, the non-base layers are constituted by data (difference data) of difference images between their own images and images of other layers for reduction of redundancy. For example, when one image is divided into two hierarchies of a base layer and a non-base layer (also called enhancement layer), an image having lower quality than that of the original image is formed based on only data of the base layer. On the other hand, the original image (i.e., high-quality image) can be formed when data of the base layer and data of the non-base layer are synthesized.

When an image is hierarchized in this way, the quality of the image can be easily varied depending on situations. For example, in case of a terminal having low processing ability such as a cellular phone, image compression information of only base layers is transmitted to form a dynamic image having low spatiotemporal resolution or having low image quality, for example. In case of a terminal having high processing ability such as a television and a personal computer, image compression information of enhancement layers in addition to base layers is transmitted to form a dynamic image having high spatiotemporal resolution or having high quality, for example. In this case, image compression information in accordance with the ability of the terminal or network can be transmitted from the server without executing transcode processing.

In encoding and decoding the hierarchical image as shown in the example in FIG. 28, the images of the respective layers are encoded and decoded. In this case, the methods according to the first through third embodiments are applicable to encoding and decoding of the respective layers. When these methods are applied, independent encoding and decoding in the time direction for each tile is allowed.

Moreover, the flags and parameters used in the methods according to the first through third embodiments described above may be shared in encoding and decoding of the respective layers. More specifically, syntax elements or the like of SPS, PPS, VUI, and APS may be shared in encoding and decoding of the respective layers, for example. Needless to say, necessary information other than these may be shared in encoding and decoding of the respective layers.

When these are shared, suppression of redundant information transmission, and reduction of the amount of information (amount of codes) to be transmitted can be achieved (that is, lowering of encoding efficiency can be suppressed).

(Scalable Parameter)

Figure 29:
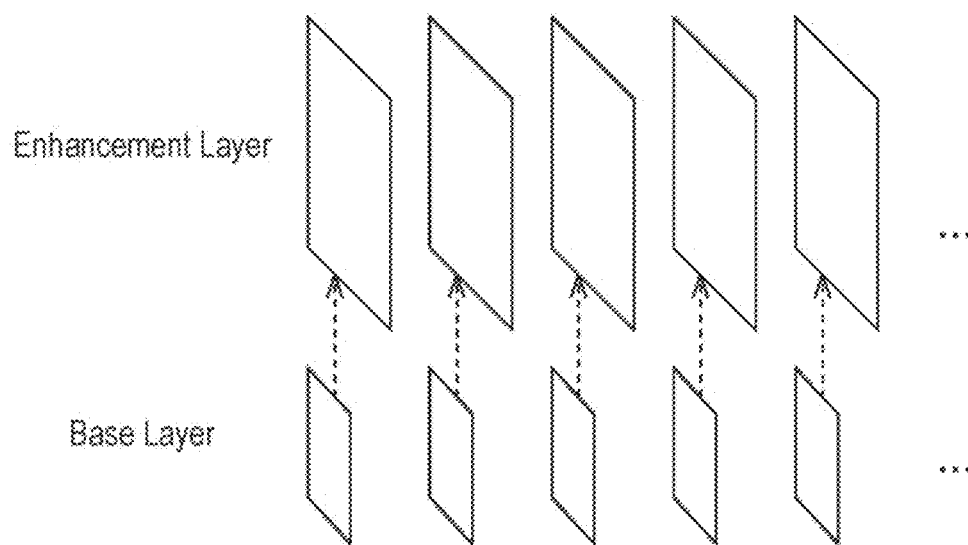
FIG. 29 is a diagram describing an example of spatial scalable encoding.

According to these hierarchical image encoding and hierarchical image decoding (scalable encoding and scalable decoding), the parameter having scalability (scalability) function is an arbitrary parameter. For example, the spatial resolution shown in FIG. 29 may be determined as the parameter (spatial scalability). In case of the spatial scalability (spatial scalability), the resolution of the image is variable for each layer. More specifically, in this case, each picture is divided into two types of hierarchies of base layers having lower spatial resolution than the resolution of the original image, and enhancement layers obtaining the original spatial resolution when synthesized with the base layers as shown in FIG. 29. Needless to say, this number of hierarchies is an example, and the number of hierarchies may be an arbitrary number.

Figure 30:
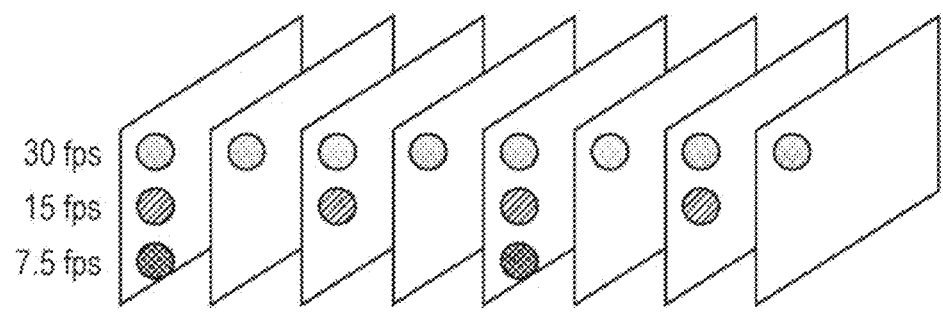
FIG. 30 is a diagram describing an example of temporal scalable encoding.

Alternatively, the parameter having this scalability may be temporal resolution (temporal scalability) as shown in FIG. 30, for example. In case of this temporal scalability (temporal scalability), the frame rate is variable for each layer. More specifically, in this case, each picture is divided into two types of hierarchies of base layers having a lower frame rate than the frame rate of the original image, and enhancement layers obtaining the original frame rate when synthesized with the base layers as shown in FIG. 30. Needless to say, this number of hierarchies is an example, and the number of hierarchies may be an arbitrary number.

Figure 31:
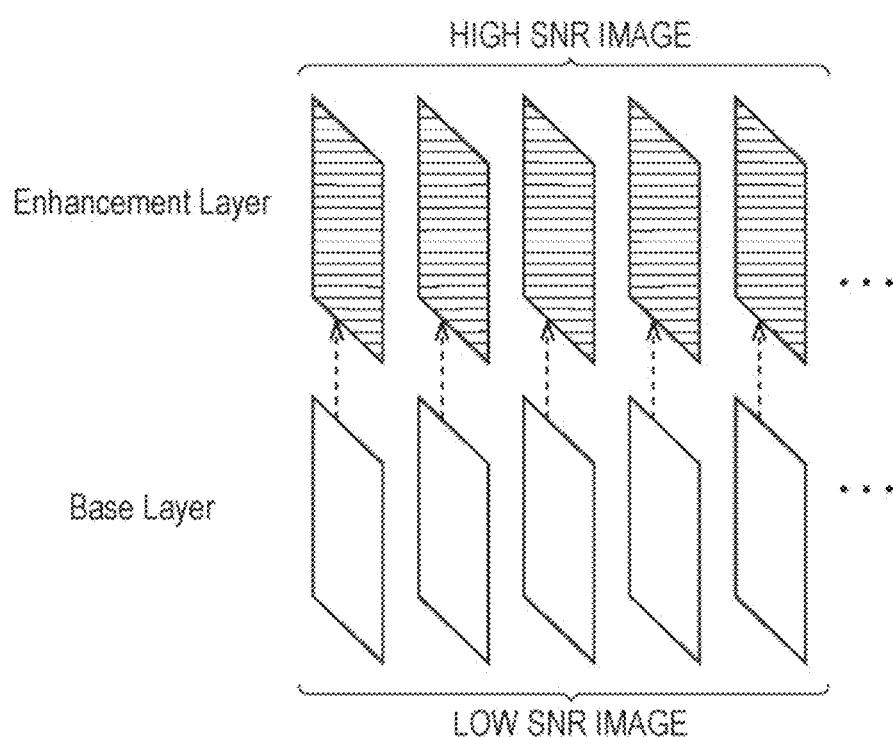
FIG. 31 is a diagram describing a signal to noise ratio scalable encoding.

Moreover, the parameter having this scalability may be a signal to noise ratio (Signal to Noise ratio (SNR)) (SNR scalability), for example. In case of this SNR scalability, the SNR ratio is variable for each layer. More specifically, in this case, each picture is divided into two types of hierarchies of base layers having a lower SNR than the SNR of the original image, and enhancement layers obtaining the original SNR when synthesized with the base layers as shown in FIG. 31. Needless to say, this number of hierarchies is an example, and the number of hierarchies may be an arbitrary number.

Obviously, the parameter having scalability may be a parameter other than the foregoing parameters. For example, the parameter having scalability may be a bit depth (bit-depth scalability). In case of this bit-depth scalability, the bit depth is variable for each layer. In this case, each of base layers is constituted by an 8-bit image, for example. An enhancement layer is added to this image so as to obtain a 10-bit (bit) image.

In addition, the parameter having scalability may be a chroma format (chroma scalability). In case of this chroma scalability, the chroma format is variable for each layer. In this case, each of base layers (base layers) is constituted by a component image having 4:2:0 format, for example. An enhancement layer is added to this layer so as to obtain a component image having 4:2:2 format.

(Hierarchical Image Encoding Device)

Figure 32:
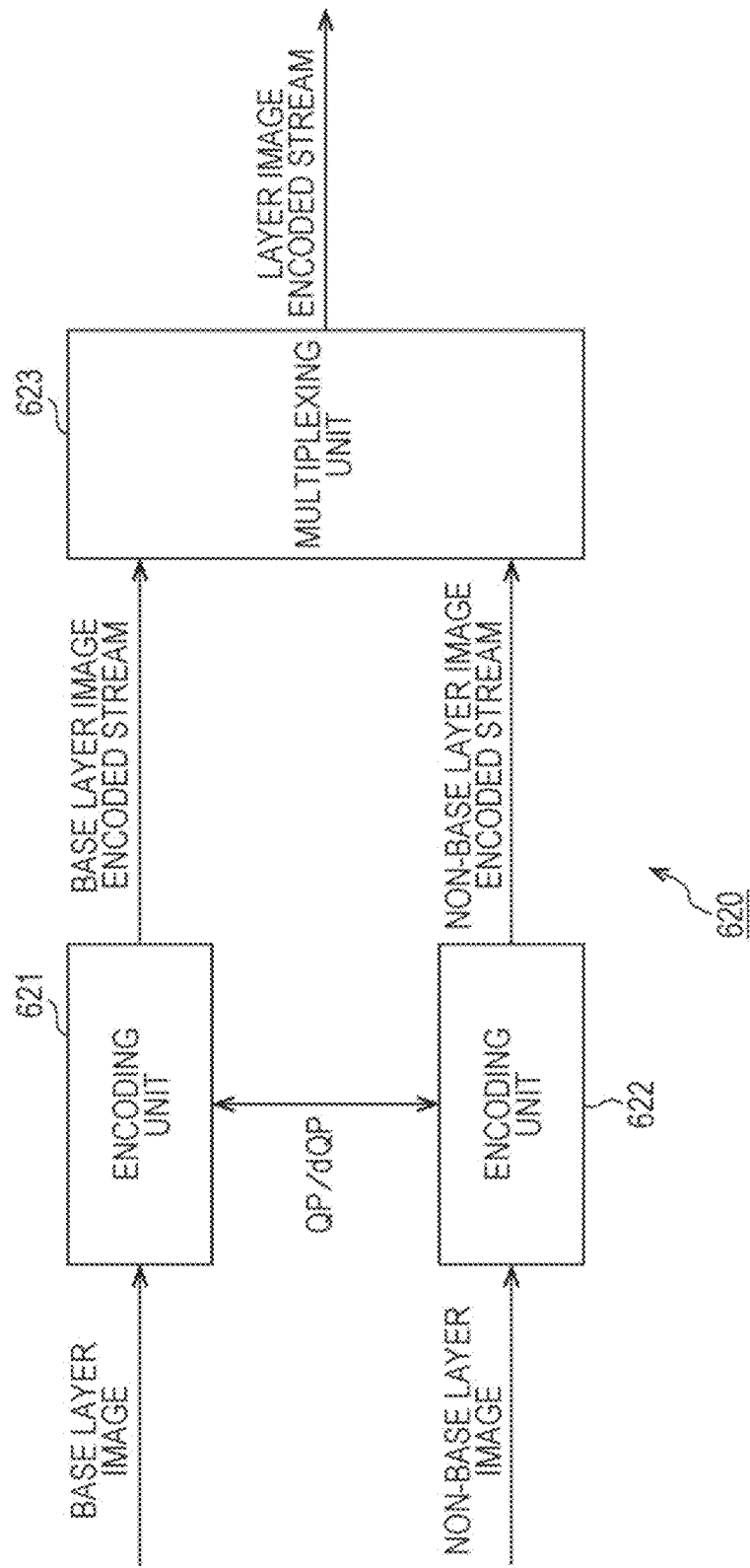
FIG. 32 is a diagram showing a constitution example of a hierarchical image encoding device to which the present technique is applied.

FIG. 32 shows a hierarchical image encoding device which performs the foregoing hierarchical image encoding.

As shown in FIG. 32, a hierarchical image encoding device 620 includes an encoding unit 621, an encoding unit 622, and a multiplexing unit 623.

The encoding unit 621 encodes base layer images, and generates a base layer image encoded stream. The encoding unit 622 encodes non-base layer images, and generates a non-base layer image encoded stream. The multiplexing unit 623 multiplexes the base layer image encoded stream generated by the encoding unit 621 and the non-base layer image encoded stream generated by the encoding unit 622, and generates a hierarchical image encoded stream.

The encoding device 50 (FIG. 3), and the encoding devices 162-1 through 162-M (FIG. 23) are applicable to the encoding unit 621 and the encoding unit 622 of this hierarchical image encoding device 620. In other words, in encoding the respective layers, independent encoding in the time direction for each tile is allowed. Moreover, the encoding unit 621 and the encoding unit 622 can perform control of filtering for intra prediction and the like using the same flags and parameters (e.g., syntax elements associated with processing between images) (that is, flags and parameters can be shared between the encoding units 621 and 622). Accordingly, lowering of the encoding efficiency can be suppressed.

(Hierarchical Image Decoding Device)

Figure 33:
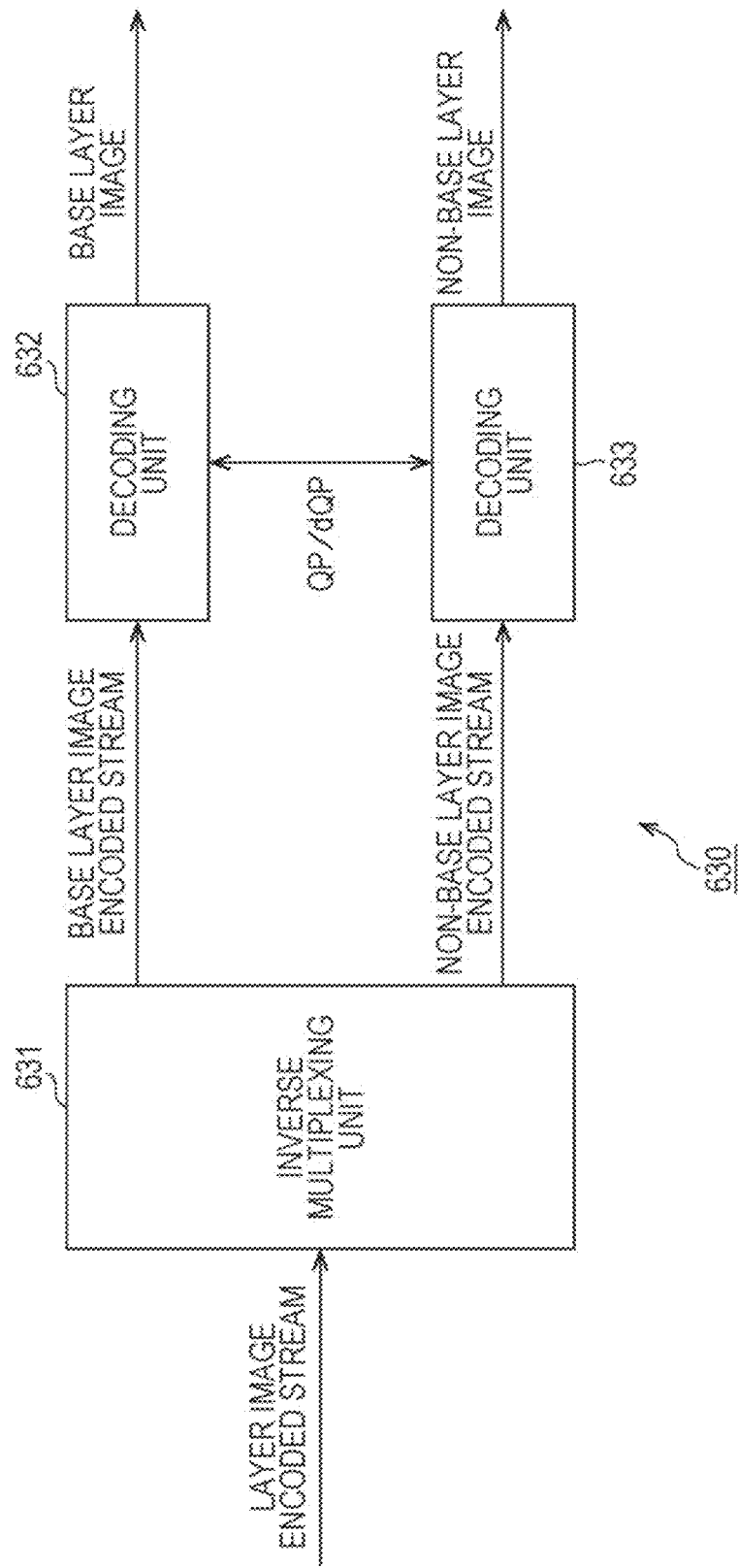
FIG. 33 is a diagram showing a constitution example of the hierarchical image encoding device to which the present technique is applied.

FIG. 33 is a diagram showing a hierarchical image decoding device which performs the foregoing hierarchical image decoding. As shown in FIG. 33, a hierarchical image decoding device 630 includes an inverse multiplexing unit 631, a decoding unit 632, and a decoding unit 633.

The inverse multiplexing unit 631 performs inverse multiplexing of the hierarchical image encoded stream generated by multiplexing of the base layer image encoded stream and the non-base layer image encoded stream, and extracts the base layer image encoded stream and the non-base layer image encoded stream. The decoding unit 632 decodes the base layer image encoded stream extracted by the inverse multiplexing unit 631, and obtains base layer images. The decoding unit 633 decodes the non-base layer image encoded stream extracted by the inverse multiplexing unit 631, and obtains non-base layer images.

The decoding device 90 (FIG. 15), the decoding device 140 (FIG. 21), or the decoding devices 164-1 through 164-M (FIG. 23) are applicable to the decoding unit 632 and the decoding unit 633 of this hierarchical image decoding device 630. In other words, in decoding the respective layers, independent decoding in the time direction for each tile is allowed. Moreover, the decoding unit 612 and the decoding unit 613 can perform decoding using the same flags and parameters (e.g., syntax elements associated with processing between images) (that is, flags and parameters can be shared between the decoding units 612 and 613). Accordingly, lowering of the encoding efficiency can be suppressed.

Sixth Embodiment (Description of Computer to which this Technique is Applied)

A series of the foregoing processes may be executed by hardware, or may be executed by software. When the series of the processes are executed by software, a program constituting the software is installed in a computer. Examples of this computer include a computer incorporated in dedicated hardware, and a general-purpose computer or the like capable of executing various types of functions under various types of programs installed therein.

Figure 34:
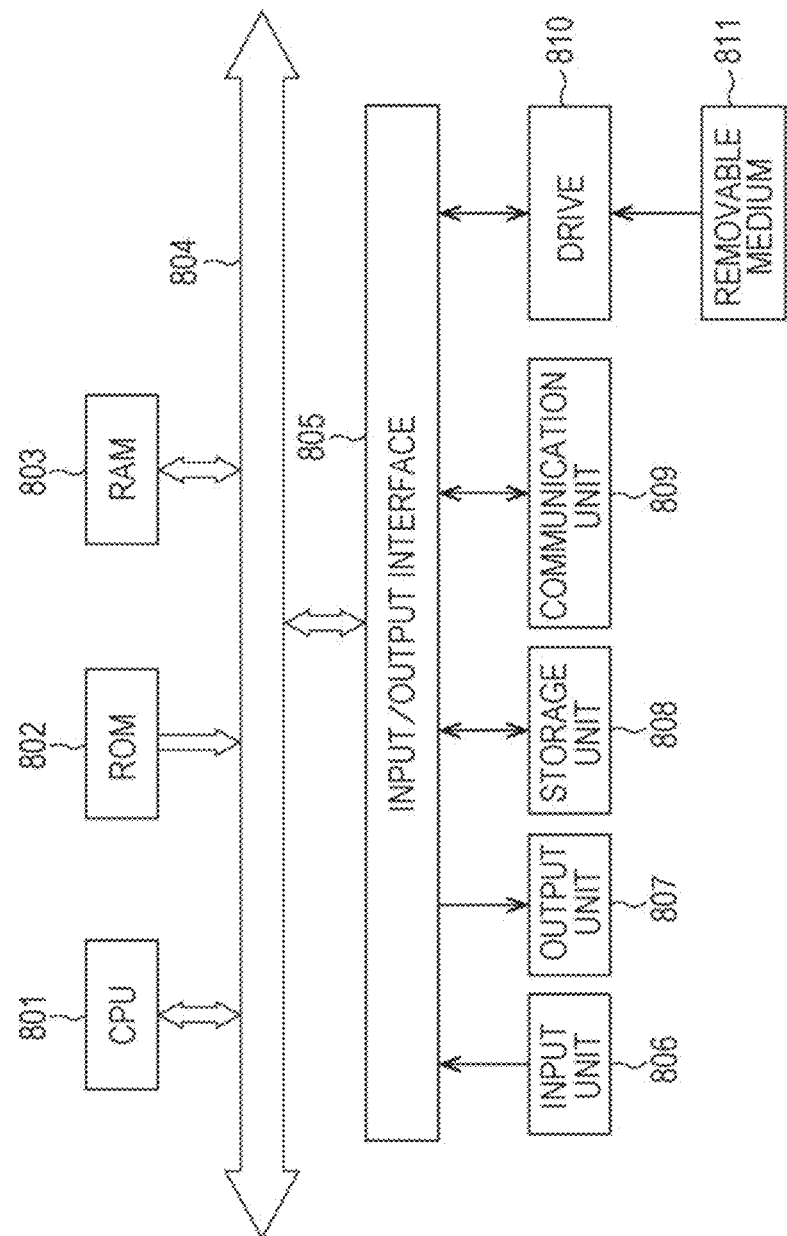
FIG. 34 is a block diagram showing a constitution example of hardware of a computer.

FIG. 34 is a block diagram showing a constitution example of hardware of a computer executing the series of the foregoing processes under a program.

In the computer, a Central Processing Unit (CPU) 801, a Read Only Memory (ROM) 802, and a Random Access Memory (RAM) 803 are connected with each other via a bus 804.

An input/output interface 805 is further connected with the bus 804. An input unit 806, an output unit 807, a storage unit 808, a communication unit 809, and a drive 810 are connected with the input/output interface 805.

The input unit 806 is constituted by a keyboard, a mouse, a microphone and the like. The output unit 807 is constituted by a display, a speaker and the like. The storage unit 808 is constituted by a hard disk, a non-volatile memory and the like. The communication unit 809 is constituted by a network interface and the like. The drive 810 drives a removable medium 811 in the form of a magnetic disk, an optical disk, a magneto-optical disk, a semiconductor memory or the like.

According to the computer thus constituted, the series of the foregoing processes are performed by the CPU 801 which loads the program stored in the storage unit 808 to the RAM 803 via the input/output interface 805 and the bus 804, and executes the program, for example.

The program executed by the computer (CPU 801) can be recorded on the removable medium 811 as a package medium or the like, and provided in the form of the removable medium 811, for example. In addition, the program can be provided via a wired or wireless transmission medium such as a local area network, the Internet, and digital satellite broadcasting.

According to the computer, the program can be installed into the storage unit 808 from the removable medium 811 attached to the drive 810 via the input/output interface 805. Alternatively, the program can be received by the communication unit 809 via a wired or wireless transmission medium, and installed into the storage unit 808. Instead, the program can be installed beforehand in the ROM 802 or the storage unit 808.

Further, the program to be executed by the computer may be a program under which processes are performed in time series in the order described in this specification, or performed in parallel, or at the time of necessity such as at the time of accesses.

Seventh Embodiment (Constitution Example of Television Set)

Figure 35:
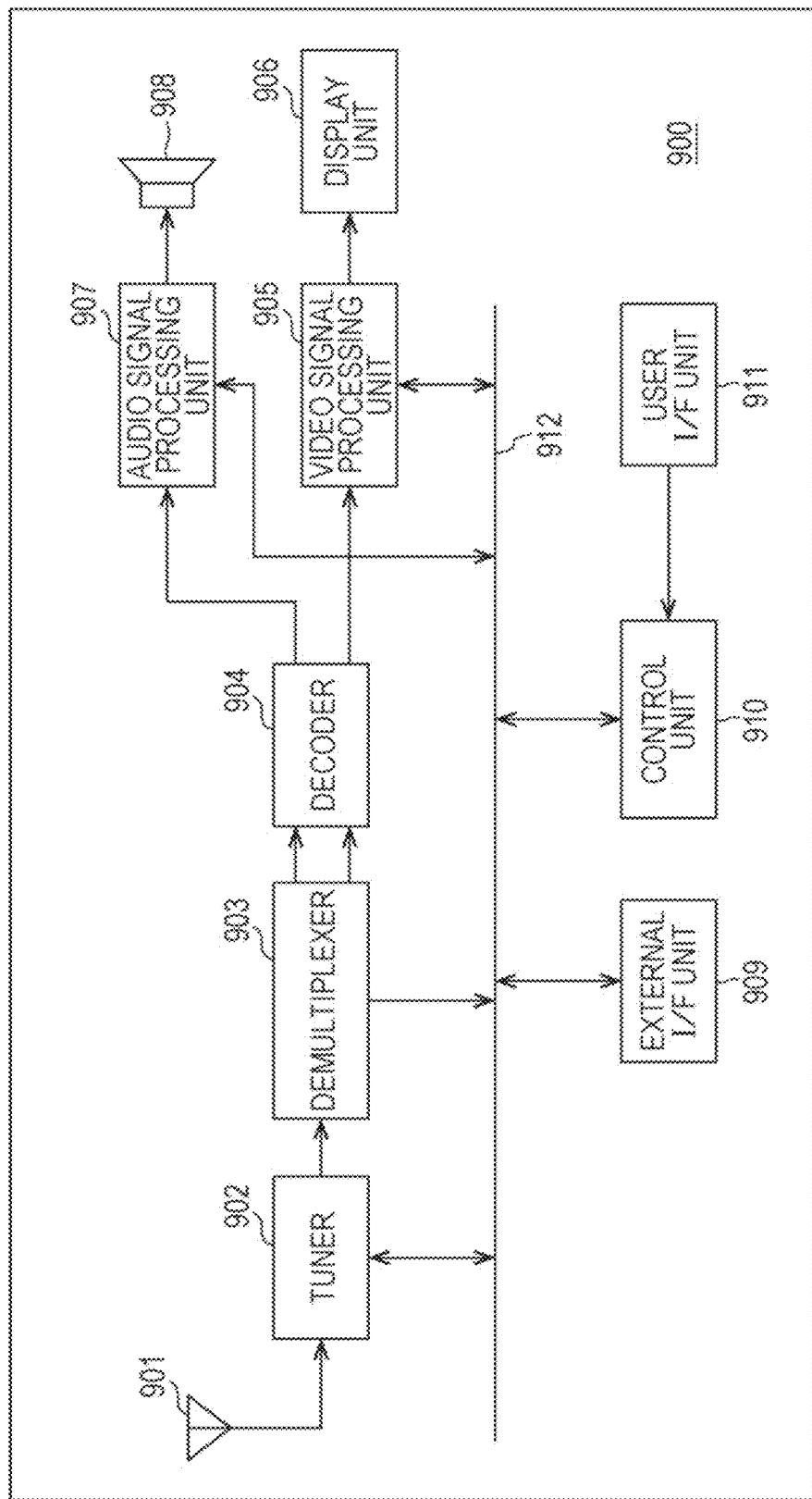
FIG. 35 is a diagram showing an example of the general structure of a television set to which the present technique is applied.

FIG. 35 shows an example of the general structure of a television set to which the present technique is applied. A television set 900 includes an antenna 901, a tuner 902, a demultiplexer 903, a decoder 904, a video signal processing unit 905, a display unit 906, an audio signal processing unit 907, a speaker 908, and an external interface unit 909. The television set 900 further includes a control unit 910, a user interface unit 911, and the like.

The tuner 902 selects a desired channel from broadcast wave signals received by the antenna 901, demodulates the selected channel, and outputs an encoded bit-stream thus obtained to the demultiplexer 903.

The demultiplexer 903 extracts a packet of pictures and voice of a program to be watched from the encoded bit-stream, and outputs the data of the extracted packet to the decoder 904. In addition, the demultiplexer 903 supplies a packet of data such as Electronic Program Guide (EPG) to the control unit 910. At the time of scrambling, scrambling is cancelled by using a demultiplexer or the like.

The decoder 904 performs decoding of the packet, and outputs video data generated by decoding to the video signal processing unit 905, and outputs audio data to the audio signal processing unit 907.

The video signal processing unit 905 performs processing of the video data such as noise removal, picture processing and the like in accordance with user settings. The video signal processing unit 905 generates image data of the program to be displayed on the display unit 906, image data produced by processing performed under an application supplied via a network, and the like. In addition, the video signal processing unit 905 generates video data for displaying a menu screen allowing selection of items or the like, and superimposes the generated video data on the video data of the program. The video signal processing unit 905 generates driving signals based on the video data thus generated, and drives the display unit 906.

The display unit 906 drives display devices (such as liquid crystal display elements) in accordance with the driving signals received from the video signal processing unit 905 to display pictures and the like of the program.

The audio signal processing unit 907 executes predetermined processing of audio data such as noise removal, performs D/A conversion and amplification of the audio data after the processing, and supplies the result to the speaker 908 to output voice.

The external interface unit 909 is an interface connecting with an external device or a network. The external interface unit 909 transmits and receives data such as video data and audio data.

The user interface unit 911 is connected with the control unit 910. The user interface unit 911 is constituted by an operation switch, a remote control signal receiving unit and the like, and supplies operation signals corresponding to user operation to the control unit 910.

The control unit 910 is constituted by a Central Processing Unit (CPU), a memory and the like. The memory stores a program executed by the CPU, various types of data necessary for processing performed by the CPU, EPG data, data obtained via a network, and the like. The program stored in the memory is read and executed by CPU at a predetermined time such as the start of the television set 900. The CPU controls the respective parts by executing the program such that the television set 900 operates in accordance with user operation.

Further, the television set 900 is provided with a bus 912 through which the control unit 910 connects with the tuner 902, the demultiplexer 903, the video signal processing unit 905, the audio signal processing unit 907, the external interface unit 909 and the like.

According to the television set thus constituted, the decoder 904 is provided with the function of the decoding device (decoding method) of the present application. Accordingly, independent decoding in the time direction for each tile is allowed.

Eighth Embodiment (Constitution Example of Cellular Phone)

Figure 36:
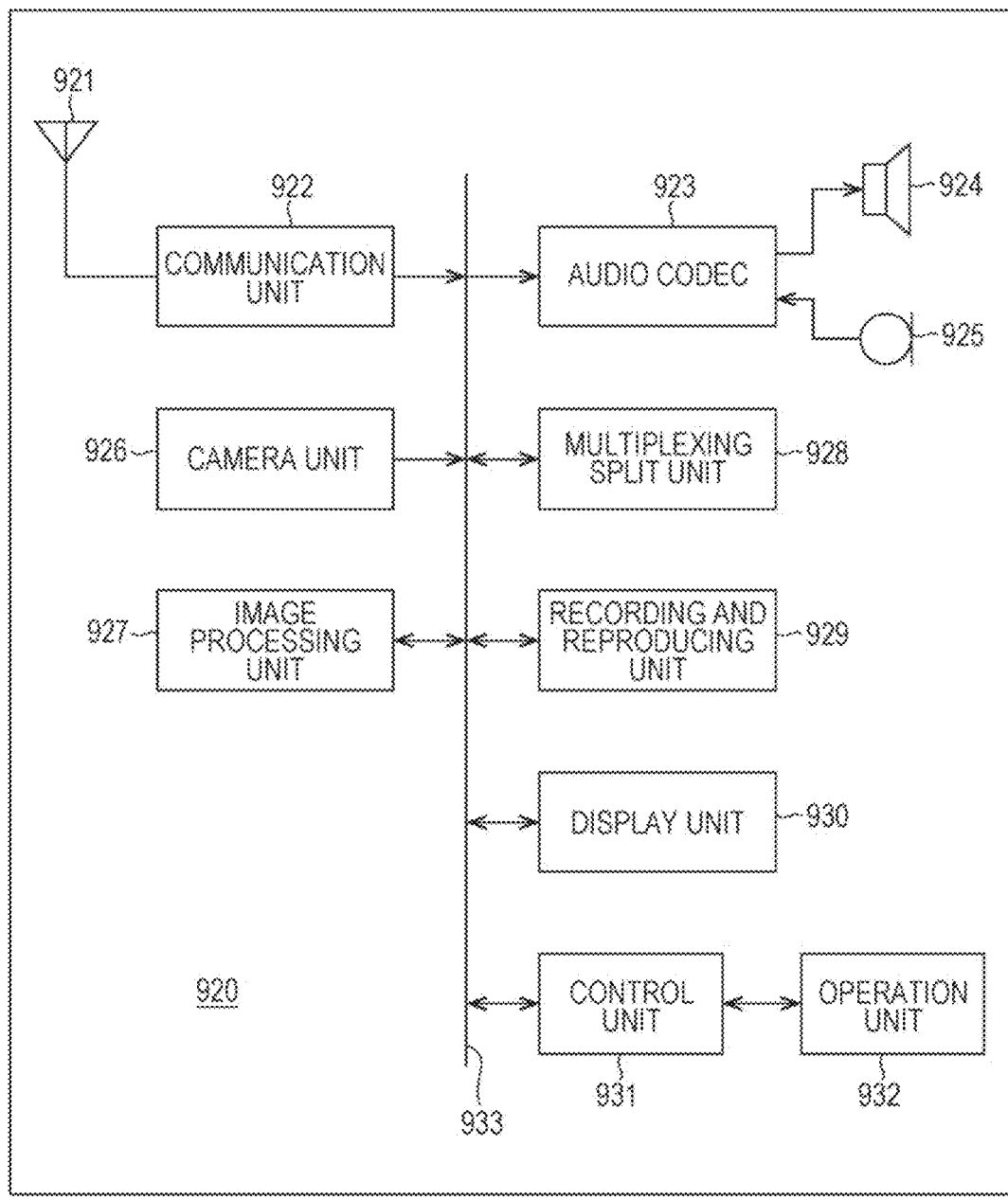
FIG. 36 is a diagram showing an example of the general structure of a cellular phone to which the present technique is applied.

FIG. 36 shows an example of the general structure of a cellular phone to which the present technique is applied. A cellular phone 920 includes a communication unit 922, an audio codec 923, a camera unit 926, an image processing unit 927, a multiplexing split unit 928, a recording and reproducing unit 929, a display unit 930, and a control unit 931. These are connected with each other via a bus 933.

An antenna 921 is connected with the communication unit 922, while a speaker 924 and a microphone 925 are connected with the audio codec 923. Moreover, an operation unit 932 is connected with the control unit 931.

The cellular phone 920 performs various types of operations such as transmission and reception of audio signals, transmission and reception of e-mails and image data, imaging, data recording and the like in various types of modes including audio communication mode and data communication mode.

In the audio communication mode, audio signals generated by the microphone 925 are converted into audio data and are subjected to data compression by the audio codec 923, and supplied to the communication unit 922. The communication unit 922 performs modulation, frequency transformation and other processing of the audio data, and generates transmission signals. In addition, the communication unit 922 supplies the transmission signals to the antenna 921 to transmit the transmission signals to a not-shown base station. Moreover, the communication unit 922 performs amplification, frequency transformation, demodulation and other processing of reception signals received by the antenna 921, and supplies audio data thus obtained to the audio codec 923. The audio codec 923 expands data of the audio data, and converts the audio data into analog audio signals, and outputs the result to the speaker 924.

In addition, for mail transmission in the data communication mode, the control unit 931 receives character data inputted by operation of the operation unit 932, and displays the inputted characters on the display unit 930. Moreover, the control unit 931 generates mail data based on user instructions or the like through the operation unit 932, and supplies the data to the communication unit 922. The communication unit 922 performs modulation, frequency transformation and the like of the mail data, and transmits transmission signal thus obtained via the antenna 921. Furthermore, the communication unit 922 performs amplification, frequency transformation, demodulation and the like of reception signals received by the antenna 921 to restore the mail data. The mail data thus obtained is supplied to the display unit 930 to display the contents of the mail.

Further, the cellular phone 920 can store the received mail data in a memory medium using the recording and reproducing unit 929. The memory medium is an arbitrary rewritable memory medium. For example, the memory medium is a removable medium such as a semiconductor memory including a RAM and a built-in flash memory, a hard disk, a magnetic disk, a magneto-optical disk, an optical disk, a USB memory, and a memory card.

For transmitting image data in the data communication mode, image data generated by the camera unit 926 is supplied to the image processing unit 927. The image processing unit 927 performs encoding of the image data to generate encoded data.

The multiplexing split unit 928 multiplexes the encoded data generated by the image processing unit 927, and the audio data supplied by the audio codec 923 by a predetermined system, and supplies the result to the communication unit 922. The communication unit 922 performs modulation, frequency transformation and the like of the multiplexed data, and transmits transmission signals thus obtained to the antenna 921. In addition, the communication unit 922 performs amplification, frequency transformation, demodulation and the like of reception signals received by the antenna 921 to restore the multiplexed data. This multiplexed data is supplied to the multiplexing split unit 928. The multiplexing split unit 928 splits the multiplexed data, and supplies the encoded data to the image processing unit 927, and supplies the audio data to the audio codec 923. The image processing unit 927 performs decoding of the encoded data to generate image data. This image data is supplied to the display unit 930 to display images thus received. The audio codec 923 converts the audio data into analog audio signals, and supplies the result to the speaker 924 to output voice thus received.

According to the cellular phone thus constituted, the image processing unit 927 is provided with the functions of the encoding device and the decoding device (encoding method and decoding method) according to the present application. Accordingly, independent encoding and decoding in the time direction for each tile are allowed.

Ninth Embodiment (Constitution Example of Recording and Reproducing Device)

Figure 37:
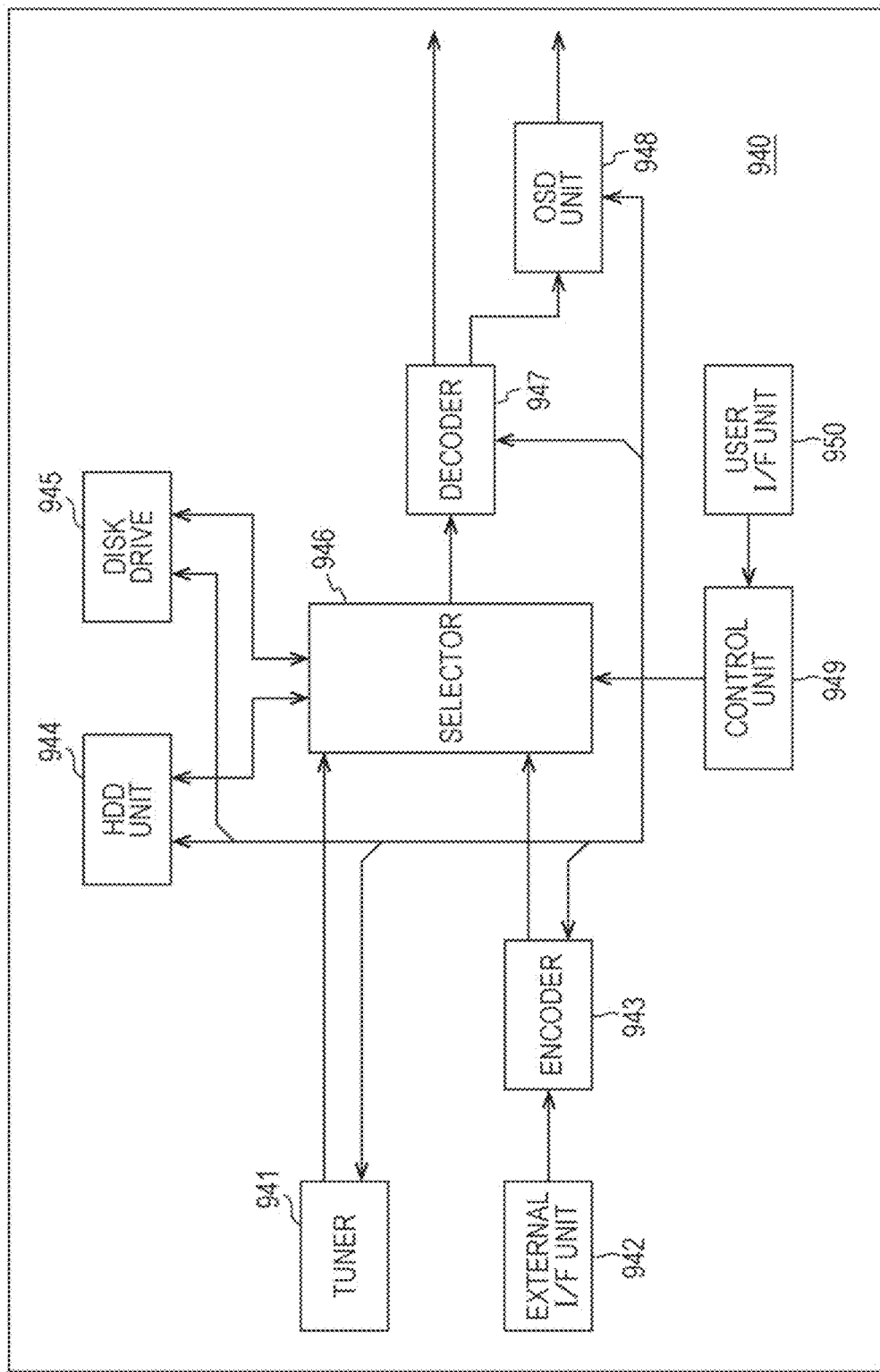
FIG. 37 is a diagram showing an example of the general structure of a recording and reproducing device to which the present technique is applied.

FIG. 37 shows an example of the general structure of a recording and reproducing device to which the present technique is applied. A recording and reproducing device 940 records audio data and video data of a received broadcast program on a recording medium, and provides the recorded data to a user at a time corresponding to instructions of the user, for example. In addition, the recording and reproducing device 940 can obtain audio data and video data from another device, and record these on a recording medium, for example. Furthermore, the recording and reproducing device 940 can achieve image display and voice output from a monitoring device or the like by decoding audio data and video data recorded on a recording medium and outputting the result.

The recording and reproducing device 940 includes a tuner 941, an external interface unit 942, an encoder 943, a Hard Disk Drive (HDD) unit 944, a disk drive 945, a selector 946, a decoder 947, an On-Screen Display (OSD) unit 948, a control unit 949, and a user interface unit 950.

The tuner 941 selects a desired channel from broadcast signals received by a not-shown antenna. The tuner 941 outputs an encoded bit-stream obtained by demodulating reception signals of the desired channel to the selector 946.

The external interface unit 942 is constituted by at least any of an IEEE 1394 interface, a network interface unit, a USB interface, a flash memory interface and the like. The external interface unit 942 is an interface for connection with an external device, a network, a memory card or the like, and receives data to be recorded such as video data and audio data.

The encoder 943 performs encoding by a predetermined system when the video data and audio data supplied by the external interface unit 942 are not encoded, and outputs an encoded bit-stream to the selector 946.

The HDD unit 944 records contents data such as pictures and voice, various types of programs, other data and the like on a built-in hard disk, and reads these from the corresponding hard disk at the time of reproduction, for example.

The disk drive 945 records signals on an attached optical disk, and reproduces signals from the optical disk. The optical disk is a DVD disk (DVD-Video, DVD-RAM, DVD-RW, DVD+R, DVD+RW, for example), Blu-ray (registered trademark) disk, or the like.

The selector 946 selects any of the encoded bit-streams from the tuner 941 or the encoder 943 at the time of recording of pictures or voice, and supplies the selected bit-stream to either the HDD unit 944 or the disk drive 945. In addition, the selector 946 supplies the encoded bit-stream outputted from the HDD unit 944 or the disk drive 945 to the decoder 947.

The decoder 947 performs decoding of the encoded bit-stream. The decoder 947 supplies video data generated by decoding to the OSD unit 948. In addition, the decoder 947 outputs audio data generated by decoding.

The OSD unit 948 generates video data for displaying a menu screen associated with selection of items or the like, superimposes the video data on video data outputted from the decoder 947, and outputs the result.

The user interface unit 950 is connected with the control unit 949. The user interface unit 950 is constituted by an operation switch, a remote control signal receiving unit and the like, and supplies operation signals corresponding to user operation to the control unit 949.

The control unit 949 is constituted by a CPU, a memory and the like. The memory stores a program executed by the CPU and various data necessary for processing performed by the CPU. The program stored in the memory is read and executed by the CPU at a predetermined time such as the start of the recording and reproducing device 940. The CPU controls the respective parts by executing the program such that the recording and reproducing device 940 operates in accordance with user operation.

According to the recording and reproducing device thus constituted, the decoder 947 is provided with the function of the decoding device (decoding method) according to the present application. Accordingly, independent decoding in the time direction for each tile is allowed.

Tenth Embodiment (Constitution Example of Imaging Device)

Figure 38:
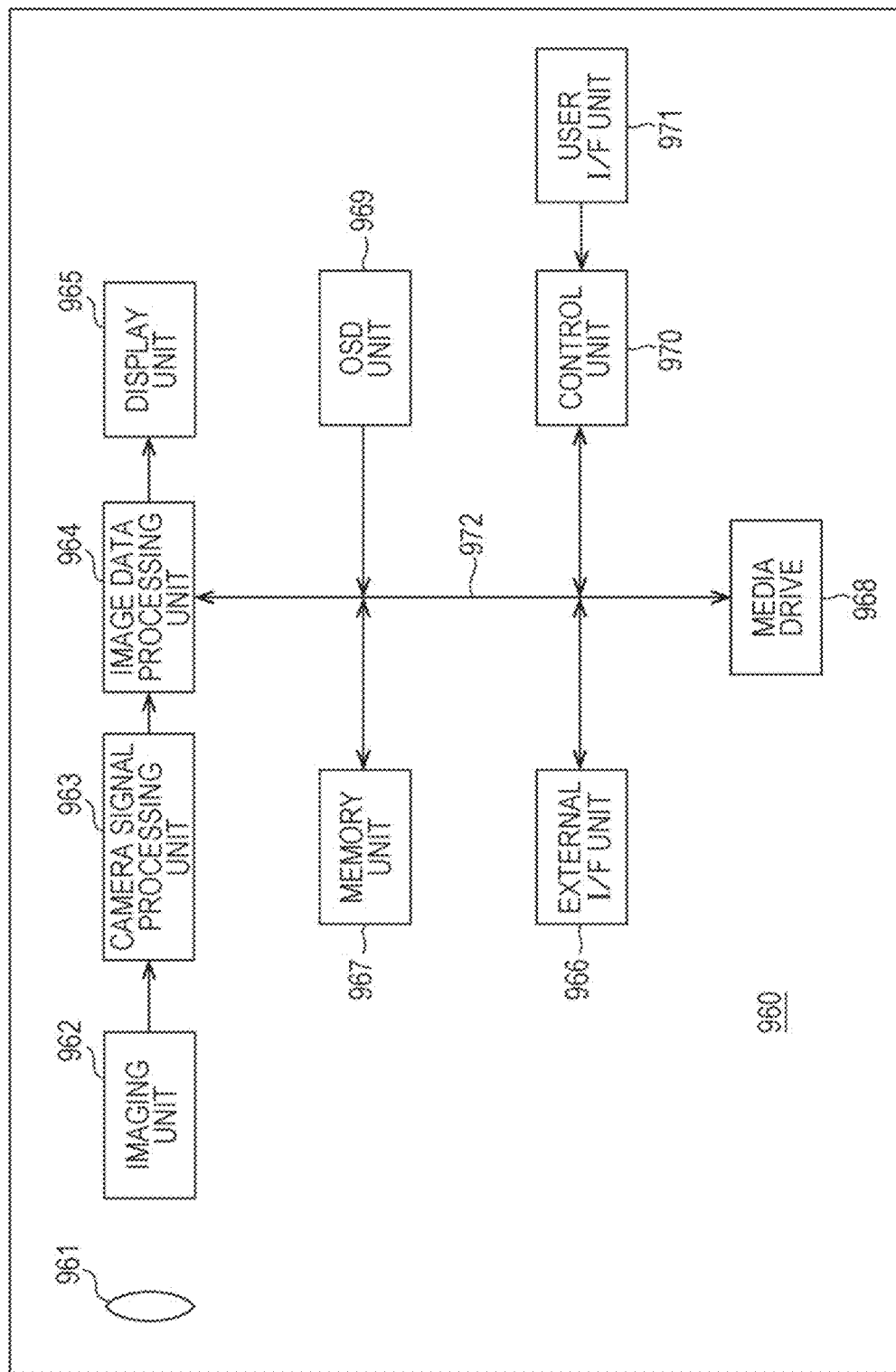
FIG. 38 is a diagram showing an example of the general structure of an imaging device to which the present technique is applied.

FIG. 38 shows an example of the general structure of an imaging device to which the present technique is applied. An imaging device 960 images an object, and displays an image of the object on a display unit, and records the image on a recording medium as image data.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Moreover, a user interface unit 971 is connected with the control unit 970. Furthermore, the image data processing unit 964, the external interface unit 966, the memory unit 967, the media drive 968, the OSD unit 969, the control unit 970 and the like are connected with one another via a bus 972.

The optical block 961 is constituted by a focus lens, a diaphragm mechanism and the like. The optical block 961 forms an optical image of an object on an imaging surface of the imaging unit 962. The imaging unit 962 is constituted by a CCD or CMOS image sensor. The imaging unit 962 generates electric signals in correspondence with the optical image by photoelectric conversion, and supplies the electric signals to the camera signal processing unit 963.

The camera signal processing unit 963 performs various types of camera signal processing, such as knee correction, gamma correction, and color correction, for the electric signals supplied by the imaging unit 962. The camera signal processing unit 963 supplies the image data after camera signal processing to the image data processing unit 964.

The image data processing unit 964 performs encoding of the image data supplied by the camera signal processing unit 963. The image data processing unit 964 supplies encoded data generated by encoding to the external interface unit 966 and the media drive 968. In addition, the image data processing unit 964 performs decoding of the encoded data supplied by the external interface unit 966 and the media drive 968. The image data processing unit 964 supplies image data generated by decoding to the display unit 965. Furthermore, the image data processing unit 964 supplies image data supplied by the camera signal processing unit 963 to the display unit 965. In addition, the image data processing unit 964 superimposes display data received from the OSD unit 969 on image data and supplies the result to the display unit 965.

The OSD unit 969 generates display data such as a menu screen and icons in the form of symbols, characters, or figures, and outputs the display data to the image data processing unit 964.

The external interface unit 966 is constituted by a USB input/output terminal and the like, and connected with a printer at the time of printing of images. In addition, a drive is connected with the external interface unit 966 as necessary. A computer program is read from a removable medium, such as a magnetic disk and an optical disk, appropriately attached to the drive, and the computer program read from the medium is installed as necessary. Moreover, the external interface unit 966 has a network interface connected with a predetermined network such as a LAN and the Internet. The control unit 970 can read encoded data from the memory unit 967 in accordance with instructions from the user interface unit 971, for example, and allow the external interface unit 966 to supply the data to another device connected via the network. Furthermore, the control unit 970 allows the external interface unit 966 to obtain encoded data and image data supplied by another device via the network, and supplies the data to the image data processing unit 964.

The recording medium driven by the media drive 968 is a magnetic disk, a magneto-optical disk, an optical disk, a semiconductor memory, or other arbitrary readable and writable removable medium, for example. In addition, the recording medium may be an arbitrary type of removable medium, such as a tape device, a disk, and a memory card. Needless to say, the recording medium may be a non-contact IC card or the like.

Moreover, the media drive 968 and the recording medium may be unified, and constituted by a non-portable recording medium such as a built-in hard disk drive and a Solid State Drive (SSD).

The control unit 970 is constituted by a CPU, a memory and the like. The memory stores a program executed by the CPU and various types of data necessary for processing performed by the CPU, for example. The program stored in the memory is read and executed by the CPU at a predetermined time such as the start of the imaging device 960. The CPU controls the respective parts by executing the program such that the imaging device 960 operates in accordance with user operations.

According to the imaging device thus constituted, the image data processing unit 964 is provided with the functions of the encoding device and the decoding device (encoding method and decoding method) according to the present application. Accordingly, independent encoding and decoding for each tile are allowed.

<Application Example of Scalable Encoding>
(First System)

A specific application example of scalable encoded data after scalable encoding (hierarchical encoding) is now described. For example, scalable encoding is used for selection of data to be transmitted as an example shown in FIG. 39.

Figure 39:
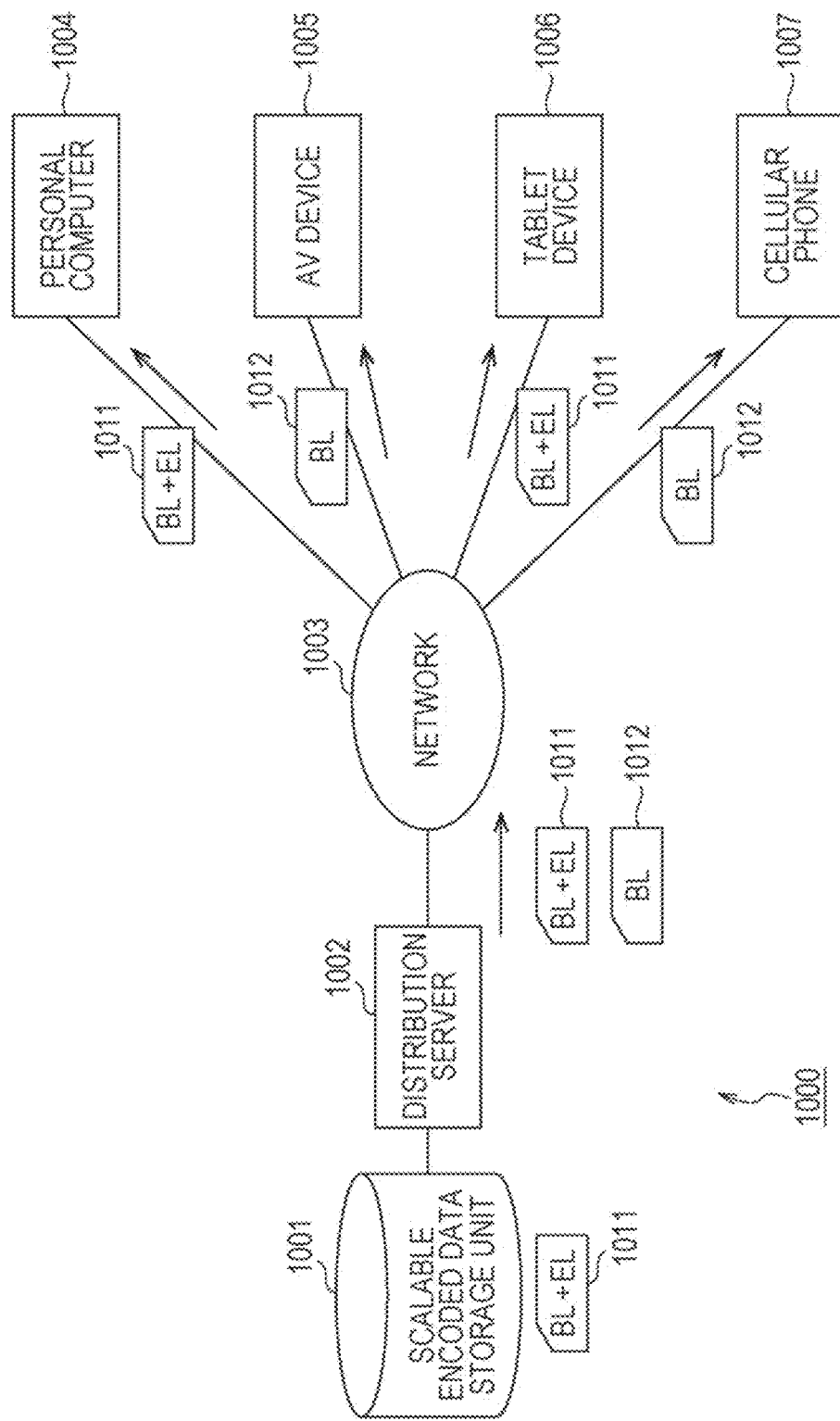
FIG. 39 is a block diagram showing an application example of scalable encoding.

In a data transmission system 1000 shown in FIG. 39, a distribution server 1002 reads scalable encoded data stored in a scalable encoded data memory unit 1001, and distributes the data to terminal devices such as a personal computer 1004, an AV device 1005, a tablet device 1006, and a cellular phone 1007 via a network 1003.

At this time, the distribution server 1002 selects and transmits encoded data having an appropriate quality in accordance with the capacities, communication environments and the like of the terminal devices. When the quality of the data transmitted from the distribution server 1002 is excessively high, high-quality images are not necessarily produced by the terminal devices. In this condition, there is a possibility of delay or overflow, and further a possibility of unnecessary occupation of the communication bands or unnecessary increase in loads on the terminal devices. In contrast, when the quality of the data transmitted from the distribution server 1002 is excessively low, images having sufficient quality may be difficult to be produced by the terminal devices. Accordingly, the distribution server 1002 reads scalable encoded data stored in the scalable encoded data memory unit 1001 as encoded data having quality appropriate for the capacities, environments and the like of the terminal devices, and transmits the data appropriately.

For example, it is assumed that the scalable encoded data memory unit 1001 stores scalable encoded data (BL+EL) 1011 obtained by scalable encoding. The scalable encoded data (BL+EL) 1011 is encoded data containing both base layers and enhancement layers, and produces both base layer images and enhancement layer images when decoded.

The distribution server 1002 selects appropriate layers in accordance with capacities, communication environments and the like of the terminal devices to which data is transmitted, and reads data of the selected layers. For example, the distribution server 1002 reads high-quality scalable encoded data (BL+EL) 1011 from the scalable encoded data memory unit 1001, and transmits the data as it is to the personal computer 1004 and the tablet device 1006 having high processing ability. On the other hand, for example, the distribution server 1002 extracts data of base layers from the scalable encoded data (BL+EL) 1011, and transmits the extracted data as scalable data (BL) 1012 having the same contents as the contents of the scalable encoded data (BL+EL) 1011 but having lower quality than the quality of the scalable encoded data (BL+EL) 1011 to the AV device 1005 and the cellular phone 1007 having lower processing ability.

As can be understood, the amount of data can be easily controlled by the use of the scalable encoded data. Accordingly, the possibility of delay and overflow, and further the possibility of unnecessary increase in loads on the terminal devices and communication media can be suppressed. Moreover, in case of the scalable encoded data (BL+EL) 1011, the redundancy between layers is reduced; therefore, the amount of data becomes smaller in comparison with the case when the encoded data of the respective layers is handled as discrete data. Accordingly, the memory area of the scalable encoded data memory unit 1001 can be more efficiently utilized.

Further, the terminal devices may be various types of devices including the personal computer 1004 through the cellular phone 1007. Thus, the performance of the hardware is variable according to the types of the devices. Moreover, the applications to be executed by the terminal devices are of various types; therefore, the capacity of the software is also variable. Furthermore, the network 1003 functioning as a communication medium may be various types of communication networks including wired, wireless, and both wired and wireless types such as the Internet and a Local Area Network (LAN). Thus, the data transmission capacity is variable. In addition, variations may be produced by other communications, for example.

Accordingly, the distribution server 1002 may communicate with the terminal devices corresponding to the data transmission destinations before starting data transmission so as to obtain information about the capacities of the terminal devices such as the hardware performance of the terminal devices, the capacity of the application (software) executed by the terminal devices, and information about the communication environments such as the usable band range of the network 1003. Then, the distribution server 1002 may select the appropriate layers based on the information thus obtained.

Further, extraction of layers may be performed by the terminal devices. For example, the personal computer 1004 may decode the transmitted scalable encoded data (BL+EL) 1011, and display images of base layers, or display images of enhancement layers. In addition, the personal computer 1004 may extract the scalable encoded data (BL) 1012 of base layers from the transmitted scalable encoded data (BL+EL) 1011, store the data 1012, transfer the data 1012 to another device, and decode the data 1012 to display images of base layers, for example.

Needless to say, each number of the scalable encoded data memory unit 1001, the distribution server 1002, the network 1003, and the terminals is an arbitrary number. In addition, while the example in which the distribution server 1002 transmits data to the terminal devices has been discussed herein, application examples are not limited to this example. The data transmission system 1000 is applicable to any system as long as the system selects appropriate layers in accordance with the capacities of the terminal devices, communication environment and the like and transmits the selected layers when transmitting encoded data after scalable encoding to the terminal devices.

(Second System)

Figure 40:
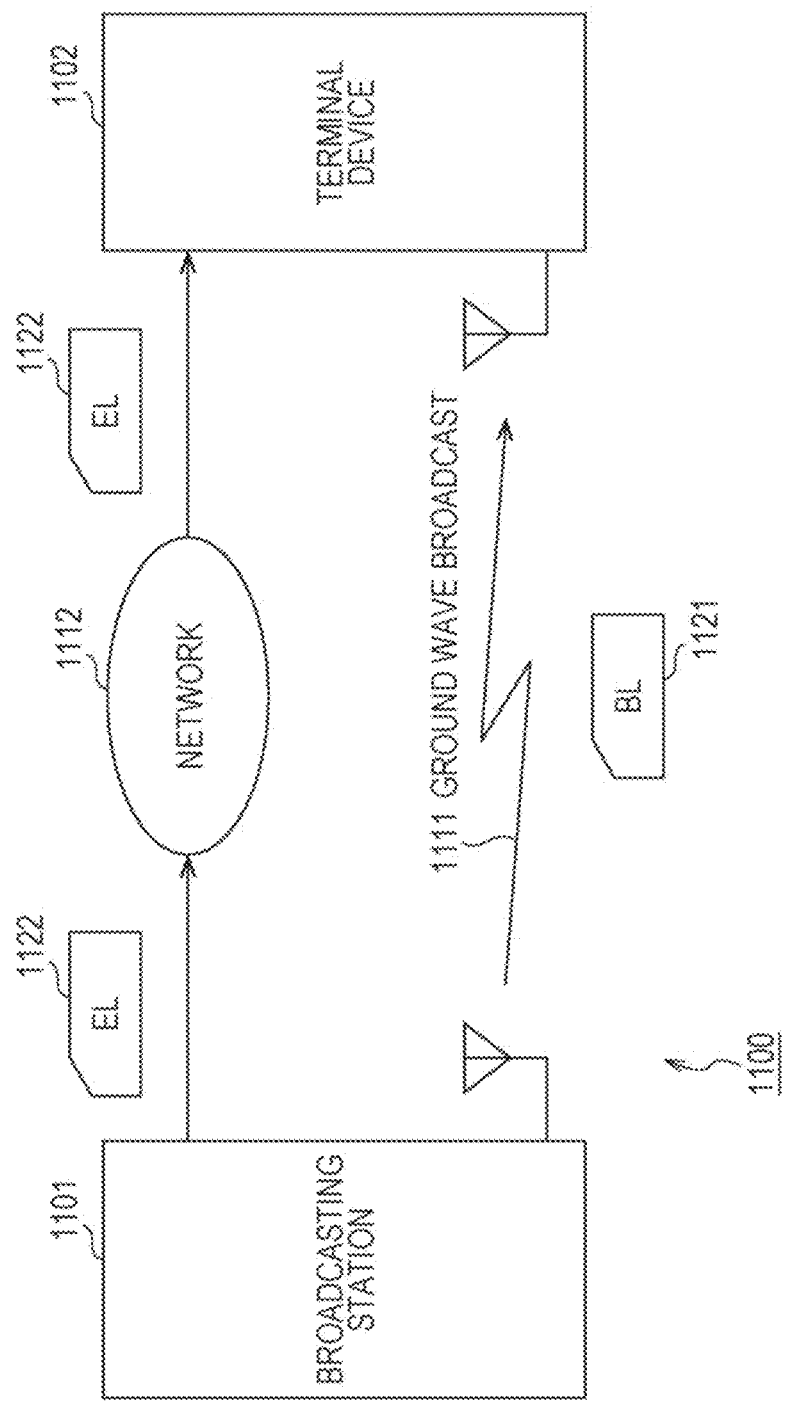
FIG. 40 is a block diagram showing another application example of scalable encoding.

Moreover, scalable encoding is applicable to transmission via a plurality of communication media as in an example shown in FIG. 40, for example.

In a data transmission system 1100 shown in FIG. 40, a broadcasting station 1101 transmits scalable encoded data (BL) 1121 of base layers 1121 through ground wave broadcast 1111. Moreover, the broadcasting station 1101 transmits (e.g., transmits in the form of packets) scalable encoded data (EL) 1122 of enhancement layers via an arbitrary network 1112 constituted by a wired, wireless, or both wired and wireless communication network.

A terminal device 1102 is provided with the function of receiving the ground wave broadcast 1111 broadcasted by the broadcasting station 1101, and receives the scalable encoded data (BL) 1121 of base layers transmitted via the ground wave broadcast 1111. In addition, the terminal device 1102 further has the communication function of providing communication via the network 1112, and receives the scalable encoded data (EL) 1122 of enhancement layers transmitted via the network 1112.

The terminal device 1102 decodes the scalable encoded data (BL) 1121 of base layers obtained via the ground wave broadcast 1111 in accordance with user instructions or the like, for example, and obtains images of base layers, stores the images, and transmits the images to another device.

Moreover, the terminal device 1102 synthesizes the scalable encoded data (BL) 1121 of base layers obtained via the ground wave broadcast 1111 and the scalable encoded data (EL) 1122 obtained via the network 1112 in accordance with user instructions or the like, for example, to obtain scalable encoded data (BL+EL), obtains images of enhancement layers by decoding of the data, stores the images, and transmits the images to another device.

As described above, the scalable encoded data can be transmitted via transmission media different for each layer, for example. Accordingly, loads can be dispersed, and the possibility of delay and overflow can be suppressed.

Furthermore, the communication medium to be used for transmission may be selected for each layer depending on situations. For example, the scalable encoded data (BL) 1121 of base layers having a relatively large amount of data may be transmitted via a communication medium having a wide band range, while the scalable encoded data (EL) 1122 of enhancement layers having a relatively small amount of data may be transmitted through a communication medium having a narrow band range. In addition, for example, the communication medium transmitting the scalable encoded data (EL) 1122 of enhancement layers may be switched between the network 1112 and the ground wave broadcast 1111 in accordance with the usable band range of the network 1112. Needless to say, this applies to data of arbitrary layers.

This control can further suppress increase in loads imposed on data transmission.

Obviously, the number of layers is an arbitrary number, and the number of the communication media to be used for transmission is also an arbitrary number. Moreover, the number of the terminal device 1102 as data distribution target is also an arbitrary number. Furthermore, while the example of broadcasting from the broadcasting station 1101 has been discussed, application examples are not limited to this example. The data transmission system 1100 is applicable to an arbitrary system as long as the system splits encoded data after scalable encoding into a plurality of parts of layer units and transmits the data via a plurality of lines.

(Third System)

Figure 41:
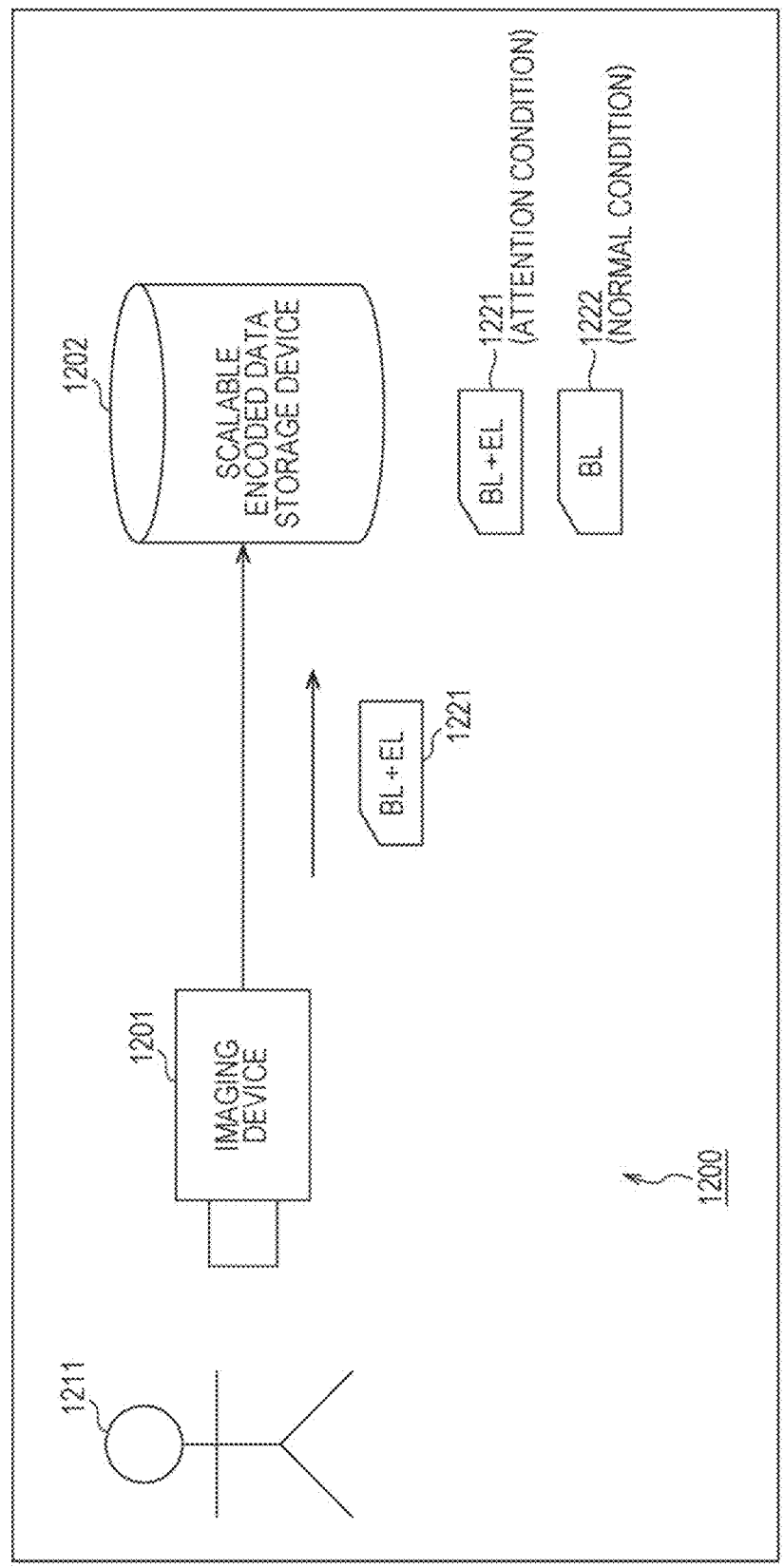
FIG. 41 is a block diagram showing a further application example of scalable encoding.

Moreover, scalable encoding is applicable to storage of encoded data as an example shown in FIG. 41.

In an imaging system 1200 shown in FIG. 41, an imaging device 1201 performs scalable-encoding of image data obtained by imaging an object 1211, and supplies the data to a scalable encoded data storage device 1202 as scalable encoded data (BL+EL) 1221.

The scalable encoded data storage device 1202 stores the scalable encoded data (BL+EL) 1221 supplied from the imaging device 1201 as data having quality in accordance with situations. For example, in the normal condition, the scalable encoded data storage device 1202 extracts data of base layers from the scalable encoded data (BL+EL) 1221, and stores the data as scalable encoded data (BL) 1222 of base layers having low quality and a small amount of data. On the other hand, in the attention condition, for example, the scalable encoded data storage device 1202 stores the scalable encoded data (BL+EL) 1221 as it is as data having high quality and a large amount of data.

By this method, the scalable encoded data storage device 1202 can store images having high quality only as necessary. Accordingly, this method suppresses increase in the amount of data while suppressing lowering of values of images caused by deterioration of image quality. As a result, the utilization efficiency of the memory area can improve.

For example, it is assumed herein that the imaging device 1201 is a monitoring camera. When a monitoring target (such as invader) is not present in a captured image (i.e., in the normal condition), the possibility that the contents of the captured image are not important is high. In this case, reduction of the amount of data has priority, and the image data (scalable encoded data) is stored as low quality data. On the other hand, when the monitoring target is present in a captured image as the object 1211 (i.e., in the attention condition), the possibility that the contents of the captured image are important is high. Accordingly, the quality of the image has priority, and the image data (scalable encoded data) is stored as high quality data.

Whether the condition is the normal condition or the attention condition may be determined based on analysis of the image by the scalable encoded data storage device 1202. Alternatively, the imaging device 1201 may determine the condition and transmit the determination result to the scalable encoded data storage device 1202.

Further, the basis for determination whether the condition is the normal condition or the attention condition is arbitrarily set, and the contents of the image corresponding to the basis for determination are arbitrarily established. Needless to say, conditions other than the contents of an image may be established as the basis for determination. For example, switching may be made in accordance with the level of recorded voice, waveforms or the like, may be made at predetermined time intervals, or may be made in correspondence with instructions from the outside such as user instructions.

Moreover, while the example in which the two conditions of the normal condition and the attention condition are switched has been discussed, the number of the conditions is an arbitrary number. For example, three or more conditions, such as normal condition, slight attention condition, attention condition, and extreme attention condition, may be switched. However, the maximum number of the conditions to be switched depends on the number of layers of scalable encoded data.

Furthermore, the imaging device 1201 may determine the number of layers of scalable encoding in accordance with conditions. For example, in the normal condition, the imaging device 1201 may generate the scalable encoded data (BL) 1222 of base layers having low quality and a small amount of data, and supply the generated data to the scalable encoded data storage device 1202. In addition, in the attention condition, for example, the imaging device 1201 may generate the scalable encoded data (BL+EL) 1221 of base layers having high quality and a large amount of data, and supply the generated data to the scalable encoded data storage device 1202.

According to the foregoing example, the monitoring camera has been discussed. However, the purpose of use of the imaging system 1200 is an arbitrary purpose, and is not limited to the monitoring camera.

Further, in this specification, the system refers to a group of plural constituent elements (devices, modules (parts) and the like), including both the structure which contains all the constituent elements in the same housing and the structure which contains not all the constituent elements in the same housing. Accordingly, a plurality of devices contained in separate housings and connected with one another via a network, and a device containing a plurality of modules within a housing are both defined as a system.

In addition, embodiments according to the present technique are not limited to the aforementioned embodiments. Various modifications may be made without departing from the scope of the subject matters of the present technique.

For example, the present technique may have a form of cloud computing which shares and jointly uses one function between a plurality of devices via a network to perform processing.

Moreover, the respective steps described in conjunction with the foregoing flowcharts can be executed by one device, or can be executed jointly with a plurality of devices.

Furthermore, when a plurality of processes is contained in one step, the plural processes contained in the one step can be executed by one device, or can be executed jointly with a plurality of devices.

In addition, the present technique can have the following constitutions.

(1)

A decoding device, including:

a motion compensation unit generating a prediction image by performing, for each of tiles, motion compensation of a reference image within a co-located tile based on tile splittable information indicating that decoding is allowed for each of the tiles and motion vector information representing a motion vector used for generating encoded data of a decoding target current image when a picture of the current image is split into the tiles and decoded; and a decoding unit decoding the encoded data using the prediction image generated by the motion compensation unit.

(2)

The decoding device according to (1) above, further including:

a vector generation unit generating the motion vector of the encoded data from the motion vector information using a motion vector of an image located adjacent to the current image and contained within the same tile as the tile of the current image, wherein the motion compensation unit performs motion compensation of the reference image for each of the tiles based on the tile splittable information and the motion vector generated by the motion vector generation unit.

(3)

The decoding device according to (1) or (2) above, further including:

a filter unit performing filtering of the reference image for each unit of the tiles, wherein the filter unit performs the filtering of the reference image for each of the tiles based on filter information representing that filtering of the reference image is not performed across the tiles, and the motion compensation unit performs, for each of the tiles, the motion compensation of the reference image obtained after the filtering by the filter unit based on the tile splittable information and the motion vector information.

(4)

The decoding device according to (3) above, wherein the filter unit performs, for each of the tiles, the filtering of the reference image using a parameter for the filtering associated with an image contained within the corresponding tile based on the filter information and parameter sharing information representing that the parameter is not shared between the tiles.

(5)

The decoding device according to any of (1) to (4) above, wherein tile split of a picture contained within the same sequence is the same split.

(6)

The decoding device according to any of (1) to (5) above, wherein each of the tiles includes one or more slices.

(7)

The decoding device according to any of (1) to (6) above, wherein the picture is split into two of the tiles and decoded, the image of one of the tiles is an image for left eye constituting a 3D image, and the image of the other tile is an image for right eye constituting a 3D image.

(8)

A decoding method, including:

a motion compensation step performed by a decoding device which generates a prediction image by performing, for each of tiles, motion compensation of a reference image within a co-located tile based on tile splittable information indicating that decoding is allowed for each of the tiles and motion vector information representing a motion vector used for generating encoded data of a decoding target current image when a picture of the current image is split into the tiles and decoded; and a decoding step performed by the decoding device which decodes the encoded data using the prediction image generated by the processing of the motion compensation step.

(9)

An encoding device, including:

a motion compensation unit generating a prediction image by performing motion compensation of a reference image at a time different from the time of an encoding target current image based on a motion vector detected within a tile when a picture of the current image is split into the tiles and encoded;

an encoding unit encoding the current image and generating encoded data using the prediction image generated by the motion compensation unit;

a setting unit setting tile splittable information indicating that decoding is allowed for each unit of the tiles; and a transmission unit transmitting the encoded data generated by the encoding unit, and the tile splittable information set by the setting unit.

(10)

The encoding device according to (9) above, further including:

a vector generation unit generating the motion vector information based on a motion vector of an image located adjacent to the current image and contained within the same tile as the tile of the current image, and a motion vector of the current image.

(11)

The encoding device according to (9) or (10) above, further including:

a filter unit performing filtering of the reference image for each unit of the tiles, wherein the motion compensation unit performs motion compensation of the reference image obtained after the filtering by the filter unit using the current image and the reference image obtained after filtering by the filter unit based on the motion vector detected within the tile, the setting unit sets filter information representing that filtering of the reference image is not performed across the tiles, and the transmission unit transmits the filter information set by the setting unit.

(12)

The encoding device according to any of (9) to (11) above, wherein the filter unit performs, for each of the tiles, the filtering of the reference image using a parameter of an image contained within the corresponding tile, the setting unit sets parameter sharing information representing that the parameter is not shared between the tiles, and the transmission unit transmits the parameter sharing information set by the setting unit.

(13)

The encoding device according to any of (9) to (12) above, wherein tile split of a picture contained within the same sequence is the same split.

(14)

The encoding device according to any of (9) to (13) above, wherein each of the tiles includes one or more slices.

(15)

The encoding device according to any of (9) to (14) above, wherein the picture is split into two of the tiles and encoded, the image of one of the tiles is an image for left eye constituting a 3D image, and the image of the other tile is an image for right eye constituting a 3D image.

(16)

An encoding method, including:

a motion compensation step performed by an encoding device which generates a prediction image by performing motion compensation of a reference image at a time different from the time of an encoding target current image based on a motion vector detected within a tile when a picture of the current image is split into the tiles and encoded;

an encoding step performed by the encoding device which encodes the current image and generating encoded data using the prediction image generated by the processing of the motion compensation step;

a setting step performed by the encoding device which sets tile splittable information indicating that decoding is allowed for each unit of the tiles; and a transmission step performed by the encoding device which transmits the encoded data generated by the processing of the encoding step, and the tile_splittable information set by the processing of the setting step.

REFERENCE SIGNS LIST

50 Encoding device
55 Setting unit
56 Transmission unit
71 Calculation unit
74 Lossless encoding unit
79 Deblock filter
83A Motion detection unit
83B Motion compensation unit
90 Decoding device
91 Reception unit
102 Lossless decoding unit
105 Addition unit
106 Deblock filter
110 Motion compensation unit
140 Decoding device
162-1 to 162-M Encoding device
164-1 to 164-M Decoding device

What is claimed is:

1. An encoding device, comprising:
    circuitry configured to:
        generate a prediction image by performing motion compensation to a reference image within a co-located tile based on a motion vector detected within the tiles as a condition that a tile split information is maintained within a sequence when a picture of a current image is split into tiles; and
        encode the current image using the prediction image generated by performing the motion compensation.

2. The encoding device of claim 1, wherein the circuitry is further configured to:
    generate an encoded stream by using the encoding.

3. The encoding device of claim 2, wherein the encoded stream includes a tile constraint information indicating that the reference image is constrained within the co-located tile.

4. The encoding device of claim 3, wherein the circuitry is further configured to:
    set the tile constraint information.

5. The encoding device of claim 2, wherein the circuitry is further configured to:
    transmit the encoded stream.

6. The encoding device according to claim 1, wherein the circuitry is further configured to:
    generate motion vector information based on a motion vector of an image located adjacent to the current image and contained within the same tile as the tile of the current image, and a motion vector of the current image.

7. The encoding device according to claim 1, wherein the circuitry is further configured to:
    perform filtering to the reference image for each unit of the tiles;
    perform motion compensation to the reference image obtained after the filtering based on the motion vector detected within the tile; and
    set filter information representing that filtering of the reference image is not performed across the tiles.

8. The encoding device according to claim 7, wherein the circuitry is further configured to:
    perform filtering of the reference image using a parameter of an image contained within a corresponding tile; and
    set parameter sharing information representing that the parameter is not shared between the tiles.

9. The encoding device according to claim 1, wherein the tile includes one or more slices.

10. The encoding device according to claim 1, wherein the circuitry is further configured to:
    set the tile split information in a Picture Parameter Set (PPS).

11. An encoding method, comprising:
    generating a prediction image by performing motion compensation to a reference image within a co-located tile based on a motion vector detected within the tiles as a condition that a tile split information is maintained within a sequence when a picture of a current image is split into tiles; and
    encoding the current image using the prediction image generated by performing the motion compensation.

12. The encoding method of claim 11, further comprising:
    generating an encoded stream by using the encoding.

13. The encoding method of claim 12, wherein the encoded stream includes a tile constraint information indicating that the reference image is constrained within the co-located tile.

14. The encoding method of claim 13, further comprising:
    setting the tile constraint information.

15. The encoding method of claim 12, further comprising:
    transmitting the encoded stream.

16. The encoding method according to claim 11, further comprising:
    generating motion vector information based on a motion vector of an image located adjacent to the current image and contained within the same tile as the tile of the current image, and a motion vector of the current image.

17. The encoding method according to claim 11, further comprising:
    performing filtering to the reference image for each unit of the tiles;
    performing motion compensation to the reference image obtained after the filtering based on the motion vector detected within the tile; and
    setting filter information representing that filtering of the reference image is not performed across the tiles.

18. The encoding method according to claim 17, further comprising:
    performing filtering of the reference image using a parameter of an image contained within a corresponding tile; and
    setting parameter sharing information representing that the parameter is not shared between the tiles.

19. The encoding method according to claim 11, wherein the tile includes one or more slices.

20. The encoding method according to claim 11, further comprising:
    setting the tile split information in a Picture Parameter Set (PPS).

* * * * *